(12) United States Patent
Morioka

(10) Patent No.: US 8,787,714 B2
(45) Date of Patent: Jul. 22, 2014

(54) LENS ARRAY AND OPTICAL MODULE PROVIDED THEREWITH

(75) Inventor: Shimpei Morioka, Saitama (JP)

(73) Assignee: Enplas Corporation, Kawaguchi (JP)

( * ) Notice: Subject to any disclaimer, the term of this patent is extended or adjusted under 35 U.S.C. 154(b) by 210 days.

(21) Appl. No.: 13/518,446

(22) PCT Filed: Dec. 22, 2010

(86) PCT No.: PCT/JP2010/007445
§ 371 (c)(1),
(2), (4) Date: Jun. 22, 2012

(87) PCT Pub. No.: WO2011/077723
PCT Pub. Date: Jun. 30, 2011

(65) Prior Publication Data
US 2012/0263416 A1    Oct. 18, 2012

(30) Foreign Application Priority Data

Dec. 22, 2009  (JP) .................. 2009-291067
Dec. 25, 2009  (JP) .................. 2009-295278
Jan. 8, 2010   (JP) .................. 2010-002928
Mar. 12, 2010  (JP) .................. 2010-055929
Sep. 1, 2010   (JP) .................. 2010-195737

(51) Int. Cl.
*G02B 6/32* (2006.01)

(52) U.S. Cl.
USPC .............. 385/33; 385/15; 385/31; 385/34; 385/35

(58) Field of Classification Search
CPC ...... G02B 6/32; G02B 6/4206; G02B 6/4204; G02B 6/4214; G02B 6/4249; G02B 6/34
USPC .................. 385/15, 31, 33, 34, 35
See application file for complete search history.

(56) References Cited

U.S. PATENT DOCUMENTS

| | | | |
|---|---|---|---|
| 6,941,047 B2 * | 9/2005 | Capewell et al. | 385/47 |
| 7,349,602 B2 * | 3/2008 | Panotopoulos | 385/47 |
| 7,856,159 B2 | 12/2010 | Morioka | |
| 2004/0096152 A1 | 5/2004 | Nakama et al. | |
| 2004/0175072 A1 | 9/2004 | Lam et al. | |
| 2004/0179784 A1 | 9/2004 | Vancoille et al. | |

(Continued)

FOREIGN PATENT DOCUMENTS

| | | |
|---|---|---|
| JP | 2004-085913 A | 3/2004 |
| JP | 2005-018006 A | 1/2005 |

(Continued)

OTHER PUBLICATIONS

Annex A6, InfriniBand Architecture Specification vol. 2, Release 1.2.1., Sep. 2009.

*Primary Examiner* — Jennifer Doan
(74) *Attorney, Agent, or Firm* — Washida & Associates

(57) ABSTRACT

Provided is a lens array that can reliably obtain monitor light and is easy to manufacture. In the provided lens array, light incident on a first lens surface (11) from light-emitting elements is split by a reflective/transmissive layer (17) between a first optical surface (14*a*) and a first prism surface (16*a*) and sent, respectively, towards a second lens surface (12) and a third lens surface (13). Monitor light included in the light sent towards the third lens surface (13) is sent by the third lens surface (13) towards a light-receiving element (8). The path of light incident on the first optical surface (14*a*) is collinear with the path of light outgoing from the second optical surface (14*b*).

24 Claims, 41 Drawing Sheets

(56) References Cited

U.S. PATENT DOCUMENTS

| | | |
|---|---|---|
| 2004/0264881 A1 | 12/2004 | Posamentier |
| 2005/0147353 A1 | 7/2005 | Vancoill et al. |
| 2005/0238279 A1 | 10/2005 | Fukuyama et al. |
| 2006/0002651 A1 | 1/2006 | Shimizu et al. |
| 2006/0198573 A1 | 9/2006 | Iwasaki et al. |
| 2008/0226228 A1 | 9/2008 | Tamura et al. |
| 2010/0295063 A1 | 11/2010 | Morioka |

FOREIGN PATENT DOCUMENTS

| | | |
|---|---|---|
| JP | 2005-275286 A | 10/2005 |
| JP | 2006-017885 A | 1/2006 |
| JP | 2006-517675 A | 7/2006 |
| JP | 2006-520491 A | 9/2006 |
| JP | 2006-344915 A | 12/2006 |
| JP | 2007-132983 A | 5/2007 |
| JP | 2007-279443 A | 10/2007 |
| JP | 2008-151894 A | 7/2008 |
| JP | 2008-180799 A | 8/2008 |
| JP | 2008-225339 A | 9/2008 |
| JP | 2009-014858 A | 1/2009 |
| JP | 2009-058747 A | 3/2009 |
| JP | 2010-262222 A | 11/2010 |
| WO | 2005-045940 A | 5/2005 |

* cited by examiner

LENS ARRAY AND OPTICAL MODULE PROVIDED THEREWITH

TECHNICAL FIELD

The present invention relates to a lens array and an optical module provided therewith, and relates particularly to a lens array and an optical module provided therewith that are suitable for optically coupling light emitting elements and end faces of optical transmission members.

BACKGROUND ART

In recent years, the so-called optical interconnection, a technique for transmitting signals within a system device, or between devices or between optical modules at high speed, has found a wide variety of applications. Here, the optical interconnection refers to a technique in which optical components are used as if they were electric components, and the components are mounted on a mother board or a circuit board for use in a personal computer, a vehicle, an optical transceiver or the like.

Optical modules used for such optical interconnection have a variety of applications, such as intra-device and inter-device connection of components for internal connections of a media converter or a switching hub, an optical transceiver, medical equipment, a testing device, a video system, or a high speed computer cluster.

In such types of optical modules, light that contains communication information emitted from a light emitting element is coupled via a lens to an end face of an optical fiber, which is an example of an optical transmission member, to transmit the communication information via the optical fiber.

To support bidirectional communication, some optical modules include, together with a light emitting element, a light receiving element for receiving the light that contains communication information propagated through an optical fiber and emitted from an end face of the optical fiber.

Conventionally, in such an optical module, variations in output characteristics of light from an light emitting element due to adverse effects of temperature may hinder appropriate transmission of communication information.

Thus, in such types of optical modules, various techniques have been proposed for monitoring light (in particular, an intensity or amount of light) emitted from a light emitting element to stabilize output characteristics of the light emitting element.

For instance, PTL 1 discloses an optical element that includes a reflecting surface (reflecting surface part) around a lens surface (transmitting surface part), the reflecting surface reflecting a part of light emitted from a light emitting element toward a light receiving element, as monitor light.

Furthermore, PTL 2 discloses an optical unit that has an optical surface and includes a total reflecting mirror that totally reflects laser light emitted from a surface emitting laser toward an optical fiber side, and a groove that reflects a part of the laser light emitted from the surface emitting laser as monitor light toward a PD side, in a connecting manner.

CITATION LIST

Patent Literature

PTL 1
Japanese Patent Application Laid-Open No. 2008-151894

PTL 2
Japanese Patent Application Laid-Open No. 2006-344915 (in particular, see FIGS. 16A and 16B)

SUMMARY OF INVENTION

Technical Problem

Unfortunately, PTL 1 has a problem of difficulty against effective application in the case where multichannel optical communication is to be realized in a compact configuration. That is, in recent years, there has been an increasing demand for a lens array that includes lenses arranged in a predetermined alignment direction, as a small optical component for realizing multichannel optical communication. As to such type of lens array, in a light emitting device including light emitting elements arranged in line, the light emitting elements are disposed so as to be opposed to respective lens surfaces on an incident side of the lens array, and optical fibers are arranged so as to be opposed to respective lens surfaces on an emitting side of the lens array. Light emitted from each light emitting element is optically coupled to end faces of the optical fibers by the respective lenses of the lens array, thereby allowing multichannel optical communication (transmission). In such a lens array, it is very important to monitor the light emitted from the light emitting elements in terms of securing stability and reliability of optical communication. In such a lens array, each of the lenses is formed in a significantly reduced diameter, and furthermore, the lenses adjacent to each other are arranged at a significantly narrow pitch. Accordingly, there is a problem in that it is difficult to apply the configuration described in PTL 1 to a lens array to form a reflecting surface for reflecting monitor light, around the lenses.

PTL 2 requires positional accuracy at the interface between the total reflecting mirror and the groove, which causes a problem of difficulty in manufacturing.

It is an object of the present invention to provide a lens array and an optical module provided therewith that can securely acquire monitor light and realize facilitation of manufacturing.

Solution to Problem

A lens array of the present invention adopts a configuration in which a lens array is disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array including: a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces; a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body; at least one third lens surface for emitting the monitor light incident from an inside of the lens array body toward the light receiving element, the third lens surface being formed on the first surface of the lens array body; a concave part formed in the lens array body in a reentrant manner so that optical paths connecting the first lens surfaces and the second lens surfaces pass through in the concave part; a first optical surface that is formed as a part of an inner surface of the concave part and formed to have a predetermined inclining angle to the second surface, the first optical surface receiving, in an incident direction perpendicular to the second surface, the light that is emitted from each of the plurality of light emitting elements and incident on the first lens surfaces; a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface; a prism that is disposed in a space formed by the concave part, formed to have a refractive index identical to that of the lens array body, and forms an optical path of the light from each of the plurality of light emitting elements having been incident on the first optical surface and subsequently moved forth toward the second lens surface side; a first prism surface that forms a part of a surface of the prism and is disposed at a position adjacent to the first optical surface; a second prism surface that is a part of the surface of the prism, forms a portion opposed to the first prism surface, and is disposed parallel to the second optical surface at a position facing the second optical surface; a reflecting/transmitting layer for reflecting the light that is emitted from each of the plurality of light emitting elements and incident on the first optical surface at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer intervening between the first optical surface and the first prism surface; and a filler that is inserted between the second optical surface and the second prism surface and has a predetermined refractive index.

A lens array of the present invention adopts a configuration in which a lens array is disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array including: a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces; a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body; at least one third lens surface for emitting the monitor light incident from an inside of the lens array body toward the light receiving element, the third lens surface being formed on the first surface of the lens array body; a concave part formed in the lens array body in a reentrant manner so that optical paths connecting the first lens surfaces and the second lens surfaces pass through in the concave part; a first optical surface that is formed as a part of an inner surface of the concave part and formed to be parallel to the second surface, the first optical surface receiving, in an incident direction perpendicular to the second surface, the light that is emitted from each of the plurality of light emitting elements and incident on the first lens surfaces; a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface; a prism that is disposed in a space formed by the concave part and forms an optical path of the light from each of the plurality of light emitting elements having been incident on the first optical surface and subsequently moved forth toward the second lens surface side; a first prism surface that forms a part of a surface of the prism and is disposed to have a predetermined inclining angle to the second surface at a position facing the first optical surface; a second prism surface that is a part of the surface of the prism, forms a portion opposed to the first prism surface, and is disposed parallel to the second surface at a position facing the second optical surface; a reflecting/transmitting layer for reflecting the light that is emitted from each of the plurality of light emitting elements and incident on the first optical surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being formed on the first prism surface; and a filler that is inserted between the first optical surface and the reflecting/transmitting layer, and has a refractive index identical to that of the prism.

A lens array of the present invention adopts a configuration in which a lens array is disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array including: a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces; a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body; at least one third lens surface for emitting the monitor light incident from an inside of the lens array body toward the light receiving element, the third lens surface being formed on the first surface of the lens array body; a concave part formed in the lens array body in a reentrant manner so that optical paths connecting the first lens surfaces and the second lens surfaces pass through in the concave part; a first optical surface that is formed as a part of an inner surface of the concave part and formed to be parallel to the second surface, the first optical surface receiving, in an incident direction perpendicular to the second surface, the light that is emitted from each of the plurality of light emitting elements and incident on the first lens surfaces; a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface; a prism that is disposed in a space formed by the concave part and forms an optical path of the light from each of the plurality of light emitting elements having been incident on the first optical surface and subsequently moved forth toward the second lens surface side; a first prism surface that forms a part of a surface of the prism and is disposed to have a predetermined inclining angle to the second surface at a position facing the first optical surface; a second prism surface that is a part of the surface of the prism, forms a portion opposed to the first prism surface, and is disposed to have a predetermined inclining angle to the second surface at a position facing the second optical surface; a reflecting/transmitting layer for reflecting the light that is emitted from each of the plurality of light emitting elements and incident on the first lens surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being formed on the first prism surface; and a filler that is inserted between the first optical surface and the reflecting/transmitting layer and between the second optical surface and the second prism surface, and has a refractive index identical to that of the prism.

A lens array of the present invention adopts a configuration in which a lens array is disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array including: a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces; a plurality of second lens surfaces for emitting light incident on each of the plurality of first lens surfaces from each of the plurality of light emitting elements toward the end face of the optical transmission member, the second lens surfaces being formed to be arranged in line along the alignment direction of the first lens surfaces on a second surface facing the end face of the optical transmission member in the lens array body; at least one third lens surface for emitting the monitor light incident from an inside of the lens array body toward the light receiving element, the third lens surface being formed on the first surface of the lens array body; a concave part formed in the lens array body in a reentrant manner so that optical paths connecting the first lens surfaces and the second lens surfaces pass through in the concave part; a first optical surface that is formed as a part of an inner surface of the concave part and formed to have a predetermined slight inclining angle to the second surface, the first optical surface receiving, in an incident direction perpendicular to the second surface, the light that is emitted from each of the plurality of light emitting elements and incident on the first lens surfaces; a second optical surface that is a part of the inner surface of the concave part, formed as a portion opposed to the first optical surface and formed to have a predetermined slight inclining angle to the second surface, the light from each of the plurality of light emitting elements having been incident on the first optical surface and subsequently moved forth toward the second lens surface side being incident on the second optical surface perpendicularly to the second surface; a prism that is disposed in a space formed by the concave part, formed to have a refractive index identical to that of the lens array body, and forms an optical path of the light from each of the plurality of light emitting elements having been incident on the first optical surface and subsequently moved forth toward the second lens surface side; a first prism surface that forms a part of a surface of the prism and is disposed to have a predetermined inclining angle to the second surface at a position facing the first optical surface; a second prism surface that is a part of the surface of the prism, forms a portion opposed to the first prism surface, and is disposed to have a predetermined inclining angle to the second surface at a position facing the second optical surface; a reflecting/transmitting layer for reflecting the light that is emitted from each of the plurality of light emitting elements and incident on the first lens surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being formed on the first prism surface; and a filler that is inserted between the first optical surface and the reflecting/transmitting layer and between the second optical surface and the second prism surface, and has a refractive index identical to that of the prism.

An optical module of the present invention adopts a configuration including the aforementioned lens array, and an optoelectric converting device corresponding thereto.

A lens array of the present invention adopts a configuration in which a lens array is disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array including: a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces; a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body; at least one third lens surface for emitting the monitor light incident from an inside of the lens array body toward the light receiving element, the third lens surface being formed on the first surface of the lens array body; a concave part formed in the lens array body in a reentrant manner so that optical paths connecting the first lens surfaces and the second lens surfaces pass through in the concave part; a first optical surface that is formed as a part of an inner surface of the concave part and formed to have a predetermined inclining angle to the second surface, the first optical surface receiving, in an incident direction perpendicular to the second surface, the light that is emitted from each of the plurality of light emitting elements and incident on the first lens surfaces; a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface; a prism that is disposed in a space formed by the concave part, formed to have a refractive index identical to that of the lens array body, and forms an optical path of the light from each of the plurality of light emitting elements having been incident on the first optical surface and subsequently moved forth toward the second lens surface side; a first prism surface that forms a part of a surface of the prism and is disposed parallel to the first optical surface at a position facing the first optical surface; a second prism surface that is a part of the surface of the prism, forms a portion opposed to the first prism surface, and is disposed parallel to the second optical surface at a position facing the second optical surface; a reflecting/transmitting layer for reflecting the light that is emitted from each of the plurality of light emitting elements and incident on the first optical surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being disposed on the first prism surface or the first optical surface; an adhesive sheet that is disposed between the reflecting/transmitting layer on the first prism surface and the first optical surface or between the first prism surface and the reflecting/transmitting layer on the first optical surface, and has a predetermined refractive index for bonding the prism on the lens array body; and a filler that is inserted between the second optical surface and the second prism surface and has a predetermined refractive index.

An optical module of the present invention adopts a configuration including the aforementioned lens array, and the aforementioned optoelectric converting device corresponding thereto.

A lens array of the present invention adopts a configuration in which a lens array is disposed between an optoelectric converting device and an optical transmission member, the optoelectric converting device including a plurality of light emitting elements formed therein in line and at least one first light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array including: a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces; a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body; at least one third lens surface for emitting the monitor light incident from an inside of the lens array body toward the first light receiving element, the third lens surface being formed on the first surface of the lens array body; a concave part formed in the lens array body in a reentrant manner so that optical paths connecting the first lens surfaces and the second lens surfaces pass through in the concave part; a first optical surface that is formed as a part of an inner surface of the concave part and formed to have a predetermined inclining angle to the second surface, the first optical surface receiving, in an incident direction perpendicular to the second surface, the light that is emitted from each of the plurality of light emitting elements and incident on the first lens surfaces; a second optical surface that is a part of the inner surface of the concave part, formed as a portion opposed to the first optical surface and formed to have a predetermined inclining angle to the second surface, the light from each of the plurality of light emitting elements having been incident on the first optical surface and subsequently moved forth toward the second lens surface side being incident on the second optical surface; a first reflecting/transmitting layer for reflecting the light that is emitted from each of the plurality of light emitting elements and incident on the first optical surfaces at a predetermined reflectance toward the third lens surface side and allowing the light to pass through at a predetermined transmittance toward the second optical surface side, while reflecting at least one beam of the light from the plurality of light emitting elements as the monitor light, the reflecting/transmitting layer being disposed on the first optical surface or adjacent thereto; and a filler that fills a space formed by the concave part and has a refractive index identical to that of the lens array body, wherein an optical path of the light emitted from each of the plurality of light emitting elements in an predetermined range on an incident side onto the first optical surface, and an optical path of the light emitted from each of the plurality of light emitting elements on an emitting side from the second optical surface are located on an identical line.

An optical module of the present invention adopts a configuration including the aforementioned lens array, and the aforementioned optoelectric converting device corresponding thereto.

Advantageous Effects of Invention

The present invention can securely acquire monitor light and realize facilitation of manufacturing.

DESCRIPTION OF EMBODIMENTS

Embodiment 1

Embodiment 1 of a lens array and an optical module provided therewith according to the present invention will now be described with reference to FIGS. 1 to 6.

Figure 1:
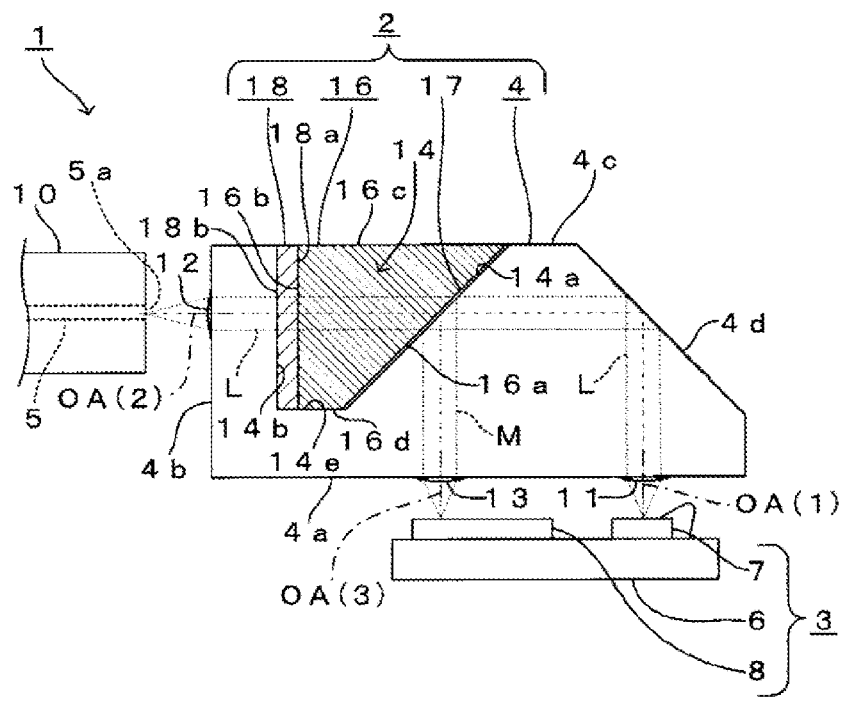
FIG. 1 is a configurational diagram schematically showing an overview of an optical module together with a longitudinal sectional view of a lens array in Embodiment 1 of the lens array and the optical module provided therewith according to the present invention.
Figure 2:
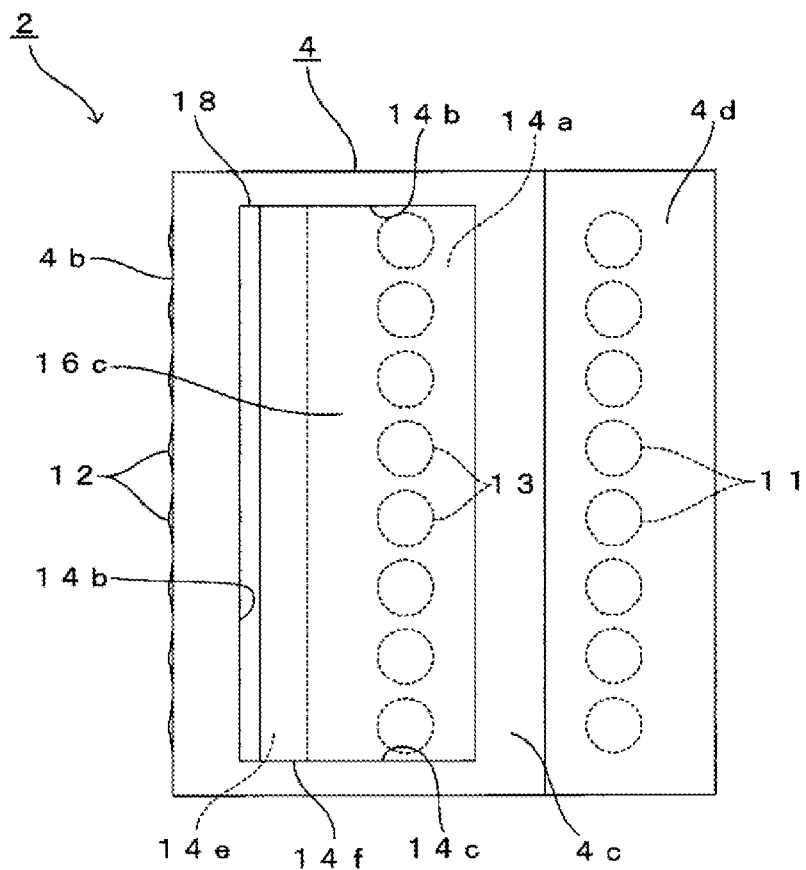
FIG. 2 is a plan view of the lens array shown in FIG. 1.
Figure 3:
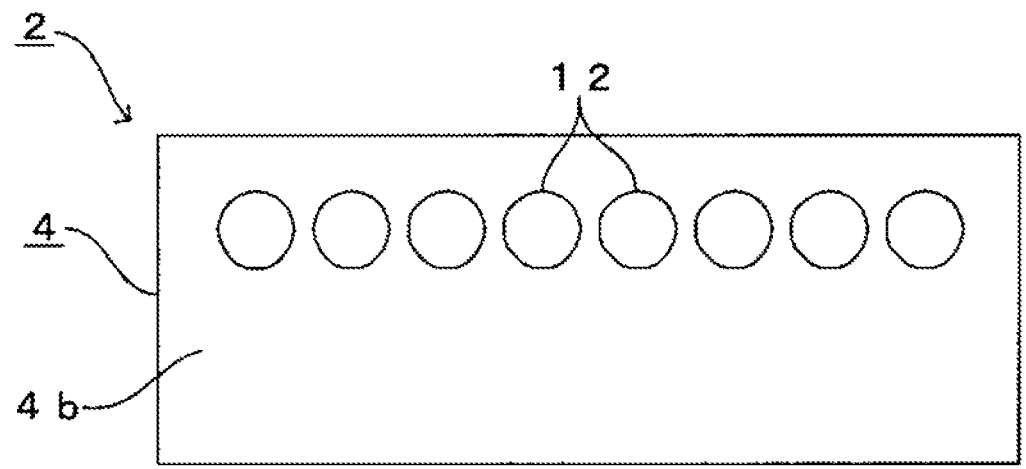
FIG. 3 is a left side view of the lens array shown in FIG. 1.
Figure 4:
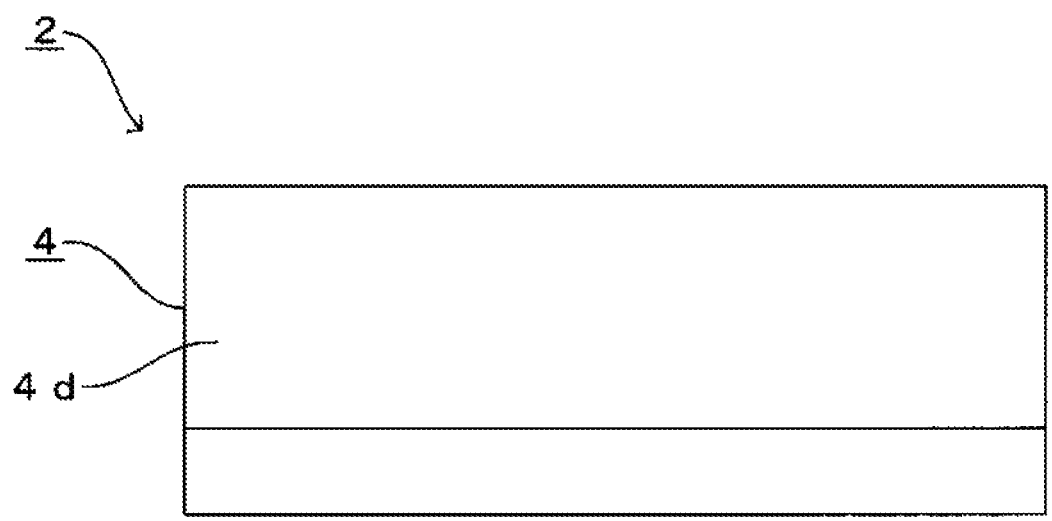
FIG. 4 is a right side view of the lens array shown in FIG. 1.
Figure 5:
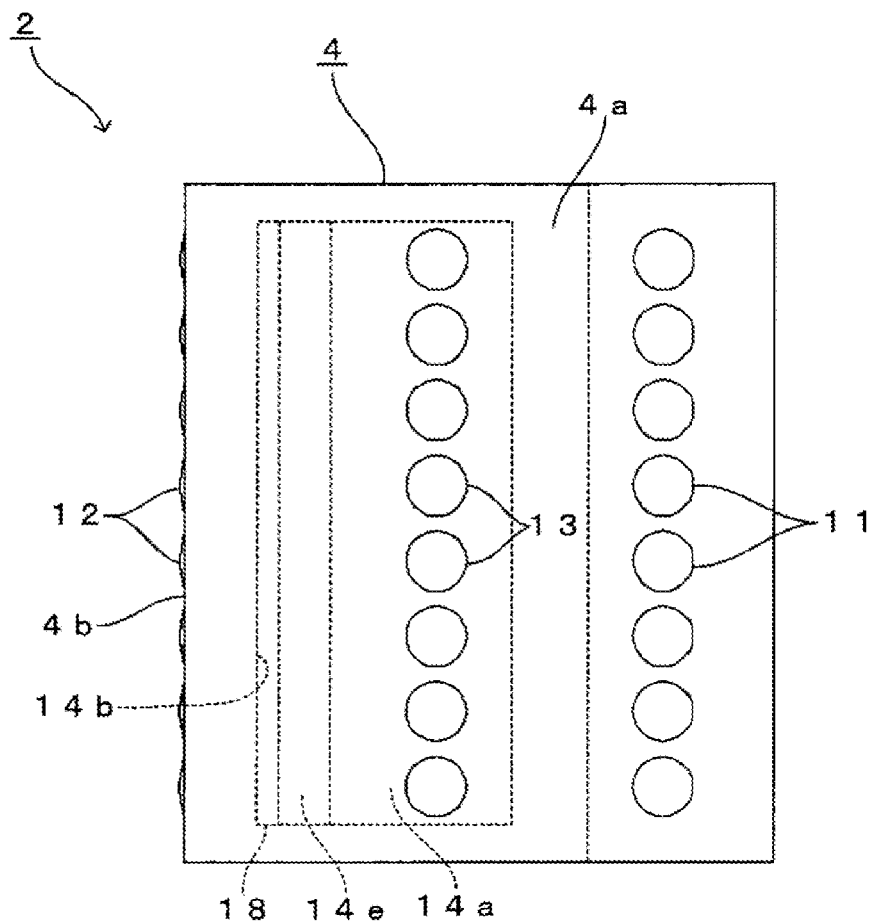
FIG. 5 is a bottom view of the lens array shown in FIG. 1.

FIG. 1 is a configurational diagram schematically showing an overview of optical module 1 in this embodiment together with a longitudinal sectional view of lens array 2 in this embodiment. FIG. 2 is a plan view of lens array 2 shown in FIG. 1. FIG. 3 is a left side view of lens array 2 shown in FIG. 1. FIG. 4 is a right side view of lens array 2 shown in FIG. 1. FIG. 5 is a bottom view of lens array 2 shown in FIG. 1.

As shown in FIG. 1, lens array 2 in this embodiment is disposed between optoelectric converting device 3 and optical fiber 5.

Here, optoelectric converting device 3 includes a plurality of light emitting elements 7 that emit laser light L toward a surface of semiconductor substrate 6 facing lens array 2 in the direction perpendicular to this surface (upper direction in FIG. 1). Light emitting elements 7 constitute a vertical cavity surface emitting laser (VCSEL). In FIG. 1, light emitting elements 7 are arranged in line along the direction perpendicular to the sheet of FIG. 1. Furthermore, optoelectric converting device 3 includes a plurality of light receiving elements 8 at left adjacent positions of FIG. 1 to the respective light emitting elements 7, on a surface of semiconductor substrate 6 facing lens array 2. Light receiving elements 8 receive monitor light M for monitoring of an output of laser light L (e.g. intensity and amount of light) emitted from respective light emitting elements 7, and are provided equal in number to light emitting elements 7. Light receiving elements 8 are arranged in line along the direction identical to the alignment direction of light emitting elements 7 disposed in arrangement in line. The positions of light emitting elements 7 and light receiving elements 8, which correspond to each other, in the alignment direction match with each other. That is, light receiving elements 8 are arranged at the same pitch as light emitting elements 7. Light receiving elements 8 may be photo-detectors. Furthermore, although not shown, optoelectric converting device 3 is connected with a control circuit that controls an output of laser light L emitted from light emitting elements 7 on the basis of the intensity or amount of monitor light M received by light receiving elements 8. For instance, such optoelectric converting device 3 is disposed opposite to lens array 2 such that a contact part (not shown) with lens array 2 is in contact with lens array 2. Optoelectric converting device 3 is attached to lens array 2 by publicly known fixation means.

Optical fibers 5 in this embodiment are provided equal in number to light emitting elements 7 and light receiving elements 8. In FIG. 1, optical fibers 5 are arranged in line along the direction perpendicular to the sheet of FIG. 1. Optical fibers 5 are arranged at the same pitch as light emitting elements 7. Each optical fiber 5 is attached to lens array 2 by publicly known fixation means in the state where a part of the fiber on a side of end face 5a is held in bulk multicore connector 10.

Lens array 2 optically couples light emitting elements 7 and end faces 5a of respective optical fibers 5 to each other in the state of being disposed between optoelectric converting device 3 and optical fibers 5.

Lens array 2 is further described; as shown in FIG. 1, lens array 2 includes lens array body 4. Lens array body 4 is formed to have a substantially trapezoidal external shape in a longitudinal sectional view, a substantially rectangular shape in a plan view as shown in FIG. 2, and a rectangular shape in a side view as shown in FIGS. 3 and 4.

As shown in FIGS. 1 and 5, lens array 2 has a plurality of (eight) first lens surfaces (convex lens surfaces) 11 that are plano-convex and equal in number to light emitting elements 7, on bottom face 4a (plane) as a first surface of lens array body 4 in FIG. 1 facing optoelectric converting device 3. The plurality of first lens surfaces 11 are arranged in line along the predetermined alignment direction (direction perpendicular to the sheet of FIG. 1, longitudinal direction in FIG. 5) corresponding to light emitting elements 7. First lens surfaces 11 are arranged at the same pitch as light emitting elements 7. Furthermore, as shown in FIG. 1, optical axis OA(1) on each first lens surface 11 coincides with the central axis of laser light L emitted from light emitting element 7 corresponding to first lens surface 11.

As shown in FIG. 1, laser light L emitted from each light emitting element 7 corresponding to first lens surface 11 is incident on first lens surface 11. Each first lens surface 11 collimates incident laser light L from light emitting element 7, and causes the collimated light to move forth into lens array body 4.

As shown in FIGS. 1 and 3, lens array 2 has a plurality of second lens surfaces (convex lens surfaces) 12 equal in number to first lens surfaces 11, on left end face 4b (plane) in FIG. 1 as a second surface of lens array body 4 facing the end faces of optical fibers 5. The plurality of second lens surfaces 12 are arranged in line along the same direction as the alignment direction of first lens surfaces 11. Second lens surfaces 12 are arranged at the same pitch as first lens surfaces 11. Optical axis OA(2) on each second lens surface 12 is preferably located on the same axis as the central axis of end face 5a of optical fiber 5 corresponding to second lens surface 12.

As shown in FIG. 1, laser light L from each light emitting element 7, having been incident on first lens surface 11 corresponding to second lens surface 12 and traveled moved forth through an optical path in lens array body 4, is incident on second lens surface 12 in the state where the central axis of the laser light coincides with optical axis OA(2) on second lens surface 12. Each second lens surface 12 emits incident laser light L from light emitting element 7 toward end face 5a of optical fiber 5 corresponding to second lens surface 12.

Thus, light emitting elements 7 and respective end faces 5a of optical fibers 5 are optically coupled to each other via first lens surfaces 11 and second lens surfaces 12.

Furthermore, as shown in FIGS. 1 and 5, third lens surfaces 13 equal in number to light receiving elements 8 (also equal in number to light emitting elements 7, optical fibers 5, first lens surfaces 11 and second lens surfaces 12 in this embodiment) are formed at left adjacent positions of FIG. 1 to first lens surfaces 11, on bottom face 4a of lens array body 4. Third lens surfaces 13 are arranged in line along the predetermined alignment direction corresponding to light receiving elements 8, that is, the same direction as the alignment direction of first lens surface 11. Third lens surfaces 13 are arranged at the same pitch as light receiving elements 8. Optical axis OA(3) on each third lens surface 13 preferably coincides with the central axis of light receiving surface of light receiving element 8 corresponding to third lens surface 13.

As shown in FIG. 1, monitor light M from each light emitting element 7 corresponding to third lens surface 13 is incident on third lens surface 13 from the inside of lens array body 4. Each third lens surface 13 emits incident monitor light M from light emitting element 7 toward light receiving element 8 corresponding to third lens surface 13.

Furthermore, as shown in FIGS. 1 and 4, lens array body 4 includes total reflection surface 4d at the right upper end in FIG. 1. Total reflection surface 4d is formed into an inclining surface where the upper end is located left to the bottom end in FIG. 1 (i.e. on a side of after-mentioned concave part 14). Total reflection surface 4d lies in the optical path of laser light L emitted from each light emitting element 7, between first lens surface 11 and after-mentioned first optical surface 14a of concave part 14.

As shown in FIG. 1, laser light L from each light emitting element 7, having been incident on first lens surface 11, is incident on such total reflection surface 4d from the bottom in FIG. 1 at an incident angle of at least a critical angle. Total reflection surface 4d totally reflects incident laser light L from each light emitting element 7 toward the left in FIG. 1.

Note that a reflection film made of Au, Ag, Al or the like may be coated onto total reflection surface 4d.

As shown in FIGS. 1 and 2, concave part 14 is formed on top face 4c (plane) of lens array body 4 in FIG. 1 as a third surface. Concave part 14 is formed in a reentrant manner so that the optical paths connecting first lens surfaces 11 and second lens surfaces 12 pass through therein. Top face 4c is formed parallel to bottom face 4a.

Here, as shown in FIG. 1, concave part 14 has first optical surface 14a forming a part of the inner surface (right side face of concave part 14 in FIG. 1). First optical surface 14a is formed into an inclining surface having a predetermined inclining angle to left end face 4b where the upper end is located right to the bottom end in FIG. 1 (i.e. on a side of total reflection surface 4d).

As shown in FIG. 1, laser light L from each light emitting element 7, having been totally reflected by total reflection surface 4d, is incident on such first optical surface 14a at a predetermined incident angle. This incident angle (i.e. incident direction) is perpendicular to left end face 4b.

As shown in FIG. 1, concave part 14 has second optical surface 14b, which is a part of the inner surface and opposite to first optical surface 14a at the left in FIG. 1 (left side face of concave part 14 in FIG. 1). Second optical surface 14b is formed parallel to left end face 4b.

As shown in FIG. 1, laser light L from each light emitting element 7, having been incident on first optical surface 14a and subsequently moved forth toward second lens surface 12 side, is incident on such second optical surface 14b perpendicularly to second optical surface 14b. Second optical surface 14b allows incident laser light L from each light emitting element 7 to pass perpendicularly to the surface.

Furthermore, as shown in FIG. 1, prism 16 having a trapezoidal longitudinal section is disposed in a space formed by concave part 14. Prism 16 is formed to have the same refractive index as that of lens array body 4. Prism 16 may be made of the same material as that of lens array body 4 (e.g. resin material, such as polyetherimide). For instance, in the case where lens array body 4 and prism 16 are made of Ultem made by SABIC as a polyetherimide, the refractive indices of lens array body 4 and prism 16 are 1.64 for light with a wavelength of 850 nm. In the case where lens array body 4 and prism 16 are made of ARTON made by JSR as an annular olefin resin, the refractive index is 1.50 for light with a wavelength of 850 nm.

Here, as shown in FIG. 1, prism 16 has first prism surface 16a forming a part of the surface of this prism (right side face of prism 16 in FIG. 1). First prism surface 16a is disposed at a position adjacent to first optical surface 14a. First prism surface 16a may be disposed parallel to first optical surface 14a.

Furthermore, as shown in FIG. 1, prism 16 has second prism surface 16b forming a part of the surface of this prism (left side face of prism 16 in FIG. 1). Second prism surface 16b is disposed parallel to second optical surface 14b at a position facing second optical surface 14b at a predetermined interval from second optical surface 14b in the right direction in FIG. 1.

Prism 16 forms the optical path of laser light L from each light emitting element 7, having been incident on first optical surface 14a and subsequently moved forth toward second lens surface 12 side.

Furthermore as shown in FIG. 1, lens array body 4 includes reflecting/transmitting layer 17 that intervenes between first optical surface 14a and first prism surface 16a and has a small thickness. The surface of reflecting/transmitting layer 17 on the side of first optical surface 14a is closely contact with first optical surface 14a. The surface of reflecting/transmitting layer 17 on the side of first prism surface 16a is closely contact with first prism surface 16a.

Here, as shown in FIG. 1, laser light L from each light emitting element 7, having been incident on first optical surface 14a, is directly incident on reflecting/transmitting layer 17. Note that the incident angle of laser light L from each light emitting element 7 onto reflecting/transmitting layer 17 is identical to the incident angle of laser light L from each light emitting element 7 onto first optical surface 14a. Reflecting/transmitting layer 17 reflects incident laser light L from each light emitting element 7 at a predetermined reflectance toward third lens surface 13 side while allowing the light to pass through at a predetermined transmittance toward prism 16 side. Reflectance and transmittance of reflecting/transmitting layer 17 can be set to desired values in accordance with the material, thickness and the like of reflecting/transmitting layer 17 within a limit where an amount of monitor light M that is considered sufficient for monitoring the output of laser light L can be acquired. For instance, in the case where reflecting/transmitting layer 17 is formed of a single film made of a single metal, such as Ni, Cr or Al, the reflectance of reflecting/transmitting layer 17 may be 20% and the transmittance thereof may be 60% (absorptance of 20%), which, however, depends on the thickness. For instance, in the case where reflecting/transmitting layer 17 is formed of a dielectric multilayer film made by alternately stacking dielectrics with different permittivities (e.g. $TiO_2$ and $SiO_2$), the reflectance of reflecting/transmitting layer 17 may be 10% and the transmittance thereof may be 90%, which, however, depends on the thickness and the number of layers.

As shown in FIG. 1, in such reflection or transmission, reflecting/transmitting layer 17 reflects a part of laser light L from each light emitting element 7 (light of the amount of reflectance), having been incident on reflecting/transmitting layer 17, as monitor light M from light emitting element 7 that corresponds to each light emitting element 7, toward third lens surface 13 side corresponding to monitor light M.

Monitor light M from each light emitting element 7 thus reflected by reflecting/transmitting layer 17 moves forth in lens array body 4 toward third lens surface 13 side and is subsequently emitted from third lens surface 13 toward corresponding light receiving element 8.

Meanwhile, laser light L from each light emitting element 7, having passed through reflecting/transmitting layer 17, is incident on first prism surface 16a immediately after passing. The incident direction of laser light L from each light emitting element 7 onto first prism surface 16a can be regarded as the same as the incident direction of laser light L from each light emitting element 7 onto first optical surface 14a. This is because reflecting/transmitting layer 17 is significantly thin and refraction of laser light L at reflecting/transmitting layer 17 can almost be neglected. Laser light L from each light emitting element 7, having been incident on first prism surface 16a moves forth through the optical path in prism 16 toward second lens surface 12 side.

At this time, prism 16 is formed to have the same refractive index as that of lens array body 4. Accordingly, when laser light L from each light emitting element 7 is incident on first prism surface 16a, laser light L is not refracted. Laser light L from each light emitting element 7, having moved forth through the optical path in prism 16, is perpendicularly incident on second prism surface 16b, and emitted from second prism surface 16b to the outside of prism 16 perpendicularly to second prism surface 16b.

As shown in FIG. 1, lens array body 4 includes filler 18 that has a predetermined refractive index and is inserted between second optical surface 14b and second prism surface 16b. Here, as shown in FIG. 1, laser light L from each light emitting element 7, having been emitted from second prism surface 16b, is incident on surface (hereinafter, referred to as incident side surface) 18a of filler 18 on the side of second prism surface 16b perpendicularly to second prism surface 16b. Laser light L from each light emitting element 7, having been incident on incident side surface 18a, moves forth through the optical path in filler 18 without refraction toward second lens surface 12 side. Further, laser light L from each light emitting element 7, having moved forth through the optical path in filler 18, is perpendicularly incident on surface (hereinafter, referred to as emitting side surface) 18b of filler 18 on the side of second optical surface 14b, and emitted from emitting side surface 18b to the outside of filler 18 perpendicularly to emitting side surface 18b.

Laser light L from each light emitting element 7, having thus emitted from filler 18 perpendicularly to emitting side surface 18b, is incident on second optical surface 14b immediately after emission as described above. Laser light L from each light emitting element 7, having been perpendicularly incident on second optical surface 14b, moves forth through the optical path in lens array body 4 after second optical surface 14b toward each second lens surface 12 side and is subsequently emitted from second lens surface 12 toward the end face of corresponding optical fiber 5.

The aforementioned configuration allows reflecting/transmitting layer 17 between first optical surface 14a and first prism surface 16a to split laser light L from each light emitting element 7, having been incident on first lens surface 11, toward second lens surface 12 side and third lens surface 13 side. Monitor light M split toward third lens surface 13 side is emitted from each third lens surface 13 toward light receiving element 8 side. As a result, monitor light M can be securely acquired. Adoption of reflecting/transmitting layer 17 capable of being easily formed to have a certain extent of area, as a configuration of acquiring such monitor light M, facilitates manufacturing of lens array 2.

According to this embodiment, prism 16 is formed to have the same refractive index as that of lens array body 4, thereby allowing the optical path of laser light L from each light emitting element 7 in prism 16 to be maintained perpendicular to left end face 4b. Furthermore, laser light L from each light emitting element 7, having thus moved forth through the optical path in prism 16 can sequentially be incident perpendicularly to second prism surface 16b and second optical surface 14b. This allows the optical path of laser light L from each light emitting element 7 in lens array body 4 to be aligned on the same line between an incident side onto first optical surface 14a (between total reflection surface 4d and first optical surface 14a in FIG. 1) and an emitting side from second optical surface 14b. As a result, for instance, in the case of product inspection, this can reduce the number of spots required to be adjusted in measurements (modification of a mold shape etc.) for canceling a deviation from the center of each second lens surface 12 concerning laser light L, which has been from each light emitting element 7 and incident on each second lens surface 12, if such a deviation is confirmed. In the case of a configuration incapable of aligning the optical path on the incident side onto first optical surface 14a and the optical path on the emitting side from second optical surface 14b on the same line, the measurements of optical surfaces 14a and 14b of concave part 14 and prism surfaces 16a and 16b of prism 16 (including the inclining angle) are sometimes required to be adjusted for correcting the axial deviation of incident light on second lens surface 12. In contrast, according to this embodiment, if only accuracy in measuring is secured such that the total reflection direction at total reflection surface 4d is perpendicular to left end face 4b and further second optical surface 14b and second prism surface 16b are parallel to left end face 4b, complicated measurement adjustment to reset optimal inclining angles relative to respective surfaces 14a, 14b, 16a and 16b is not required. This can contribute to further facilitation of manufacturing lens array 2.

Furthermore, according to this embodiment, second optical surface 14b is formed parallel to left end face 4b, thereby allowing design of second optical surface 14b and determination of accuracy in measuring thereof to be simplified.

Moreover, according to this embodiment, filler 18 is inserted between second optical surface 14b and second prism surface 16b. Accordingly, even if a scratch is formed on second optical surface 14b, reflection or scattering of laser light L on second optical surface 14b caused by the scratch can be suppressed. The effect of suppressing reflected/scattered light owing to filler 18 is based on the same principle as a principle that drops of water applied onto a surface of frosted glass cover irregularities thereat and the frosted glass becomes transparent. Here, reflection and scattering of laser light L cause occurrence of stray light or reduction in coupling efficiency with an end face of the optical fiber. Accordingly, suppression thereof is significantly important in terms of securing optical performance. In particular, such an effect of suppressing reflected light or scattered light is effective in the case where lens array body 4 is acquired by injection molding of resin material (polyetherimide, etc.) using a mold. More specifically, in the case of forming lens array body 4 by injection molding, a molded piece having a shape transferred from concave part 14 is released from the mold. According to this embodiment, as described above, in terms of simplifying design and determination of accuracy in measuring, second optical surface 14b is formed parallel to left end face 4b (i.e. perpendicular to top face 4c). In demolding, the piece is demolded such that the mold slides in the direction of the surface of second optical surface 14b. In this case, second optical surface 14b is susceptible to damage. Accordingly, with the configuration of second optical surface 14b having high frequency of occurrence of a scratch, it is significantly important to provide filler 18 that avoids malfunction on optical performance due to the scratch. As a result, manufacturing and handling (e.g. determination of accuracy in measuring) are facilitated by forming second optical surface 14b parallel to left end face 4b, as well as occurrence of stray light and reduction in coupling efficiency is suppressed, i.e. optical performance is secured, by suppressing reflected light or scattered light on second optical surface 14b.

In addition to the configuration, reflecting/transmitting layer 17 may be formed by coating first prism surface 16a or first optical surface 14a with the aforementioned metal single layer film or dielectric multilayer film. A publicly known coating technique, such as Inconel deposition, can be adopted as the coating. This allows the configuration of reflecting/transmitting layer 17 to be simplified, thereby enabling further facilitation of manufacturing to be realized. Furthermore, reflecting/transmitting layer 17 can be formed significantly thinly (e.g. 1 μm or less). This allows refraction of laser light L from each light emitting element 7 passing through reflecting/transmitting layer 17 to be significantly small to such an extent that it can be neglected, and enables straightness of light before and after incident on prism 16 to be secured. Moreover, the optical path on the incident side onto first optical surface 14a and the optical path on the emitting side from second optical surface 14b can be securely aligned on the same line, thereby contributing to further facilitation of manufacturing. However, the present invention is not limited to such a configuration. Instead, for instance, reflecting/transmitting layer 17 may be made of a glass filter.

In addition to the configuration, light-transmitting adhesive may be used as filler 18, and prism 16 may be bonded to concave part 14 with filler 18. This allows filler 18 to also serve as adhesive for bonding prism 16 to lens array body 4. As a result, cost can be reduced. For instance, thermosetting resin or ultraviolet-setting resin may be adopted as such filler 18 that also serves as light-transmitting adhesive.

In addition to the configuration, it is preferred that the difference of refractive indices between filler 18 and lens array body 4 be a predetermined value of 0.35 or less. According to this configuration, Fresnel reflection at the interface between second prism surface 16b and filler 18 and Fresnel reflection at the interface between filler 18 and left end face 4b can be suppressed, thereby occurrence of stray light and reduction in coupling efficiency to be suppressed more securely. In the case of forming lens array body 4 using the aforementioned Ultem made by SABIC, for instance LPC1101 made by Mitsubishi Gas Chemical Company can be used as filler 18. As to this product, the refractive index of light with wavelength of 850 nm, which is calculated on the basis of the refractive index and Abbe number for d line and disclosed by the manufacturer, is 1.66. Furthermore, use of LPJ1104 made by the same manufacturer allows a refractive index of 1.64 for wavelength of 850 nm to be acquired.

Besides that, in the case of forming lens array body 4 using the aforementioned ARTON made by JSR, suitable filler 18 may be A1754B made by TECS, which is UV-curable resin. The refractive index of this product for light with a wavelength of 850 nm is 1.50. In this case, the difference of refractive indices between lens array body 4 and filler 18 is 0.

In addition to the configuration, the inclining angle of total reflection surface 4d is preferably within a range from 40° to 50° (more preferably, 45°) in the clockwise direction in FIG. 1 with reference to bottom face 4a(0°). The inclining angle of first optical surface 14a is preferably within a range from 40° to 50° (more preferably, 45°) in the counterclockwise direction in FIG. 1 with reference to bottom face 4a(0°). In the case of adopting left end face 4b as a reference (0°), a preferable range of such an inclining angle of first optical surface 14a is from 40° to 50° (more preferably, 45°) in the clockwise direction in this diagram. This configuration allows a reasonable design for totally reflecting incident laser light L from each light emitting element 7 on total reflection surface 4d toward concave part 14 side and for splitting laser light L incident on first optical surface 14a toward second lens surface 12 side and third lens surface 13 side. In particular, in the case where the inclining angles of total reflection surface 4d and first optical surface 14a are 45°, the design of total reflection surface 4d and first optical surface 14a and determination of accuracy in measuring thereof are more simplified.

In addition to the configuration, bottom face 4a and left end face 4b may be formed perpendicular to each other. Optical axis OA(1) on first lens surface 11 and optical axis OA(3) on third lens surface 13 may be formed perpendicular to bottom face 4a. Optical axis OA(2) on second lens surface 12 may be formed perpendicular to left end face 4b. This configuration can relax accuracy in measuring that is required for lens array 2 to secure the optical path connecting light emitting element 7 and light receiving element 8 and the optical path connecting light emitting element 7 and the end face of optical fiber 5, thereby allowing further facilitation of manufacturing to be realized. More specifically, for instance, in the case where optical axis OA(3) on third lens surface 13 is configured to be inclined at an acute angle to optical axis OA(1) on first lens surface 11, there is a possibility that a slight measurement error in the longitudinal direction in FIG. 1 prevents monitor light M, having been emitted from third lens surface 13, from being coupled to light receiving element 8. In contrast, in this embodiment, optical axis OA(1) on first lens surface 11 and optical axis OA(3) on third lens surface 13 are parallel to each other. By this means, even if lens array 2 causes a slight measurement error in the longitudinal direction in FIG. 1, the beam diameter of monitor light M emitted from third lens surface 13 merely becomes larger or smaller with respect to a designed value, thus allowing the monitor light M to be appropriately received by each light receiving element 8. If optical axis OA(2) on second lens surface 12 has an angle other than a right angle to optical axis OA(1) on first lens surface 11, there is a possibility that a slight measurement error in the lateral direction in FIG. 1 prevents laser light L, having been emitted from second lens surface 12, from being coupled to the end face of optical fiber 5. In contrast, in this embodiment, optical axis OA(1) on first lens surface 11 and optical axis OA(2) on second lens surface 12 are formed to be perpendicular to each other. By this means, even if lens array 2 causes a slight measurement error in the lateral direction in FIG. 1, the beam diameter of laser light L emitted from second lens surface 12 merely becomes slightly larger or smaller with respect to a designed value, thus allowing the laser light L to be appropriately coupled to the end face of optical fiber 5

In addition to the configuration, in this embodiment, as shown in FIGS. 1 and 2, concave part 14 is formed into a shape accommodating bottom surface (bottom face in FIG. 1) 14e and all sides 14a to 14d of concave part 14 within a range indicated by the external shape of opening 14f of concave part 14 in the case of being viewed in the plane normal direction of top face 4c (from the top in FIG. 1). In other words, concave part 14 is formed so as to accommodate projected surfaces of bottom surface 14e and all sides 14a to 14d in the plane normal direction of top face 4c within the range indicated by the external shape of opening 14f. As shown in FIG. 2, opening 14f is formed into a rectangular shape elongated in the longitudinal direction in FIG. 2 and encompassed therearound by top face 4c. Sides 14b to 14d other than first optical surface 14a are formed perpendicular to top face 4c. This allows concave part 14 to be formed into a shape capable of securing demoldability from the mold. This can realize effective manufacturing of lens array 2 using the mold.

Third lens surfaces 13 and light receiving elements 8 corresponding thereto are not necessarily provided so as to be equal in number to light emitting elements 7. It is sufficient that at least one set is provided. In this case, at reflecting/transmitting layer 17, in laser light L from each light emitting element 7 incident on each first lens surface 11, only a part of laser light L to which third lens surfaces 13 correspond is reflected as monitor light M. The other part of laser light L is reflected but is not used as monitor light M.

Figure 6:
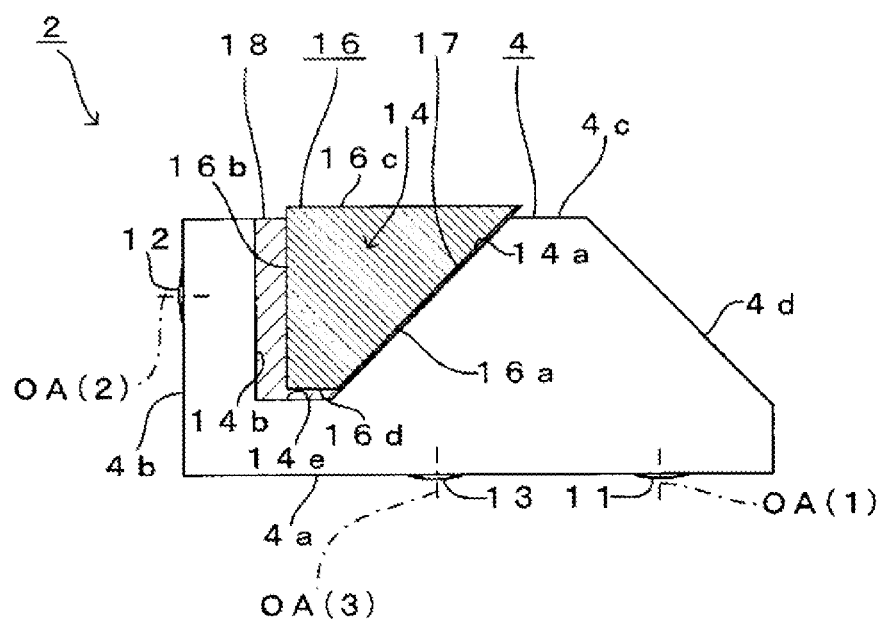
FIG. 6 is a configurational diagram schematically showing a variation of Embodiment 1.

In the configuration in FIG. 1, top face 16c of prism 16 is at the same plane as top face 4c of lens array body 4, and bottom face 16d of prism 16 is in contact with bottom surface 14e of concave part 14. However, as shown in FIG. 6, even if prism 16 is bonded in the state where top face 16c of prism 16 protrudes upward from top face 4c of lens array body 4, optical performance is not affected.

A counter-bore part having a bottom surface parallel to bottom face 4a may be provided with a dent in a portion on bottom face 4a facing optoelectric converting device 3. First lens surfaces 11 and third lens surfaces 13 may be formed on bottom surfaces of the counter-bore part. In this case, optoelectric converting device 3 is fixed to lens array 2 in the state where semiconductor substrate 6 is in contact with the inner circumference of the counter-bore part at bottom face 4a.

Embodiment 2

Embodiment 2 of a lens array and an optical module provided therewith according to the present invention will now be described mainly on difference from Embodiment 1 with reference to FIGS. 7 to 12.

In this embodiment, elements having configurations identical or similar to those in FIGS. 1 to 6 will be described using the same reference signs as those of FIGS. 1 to 6.

Figure 7:
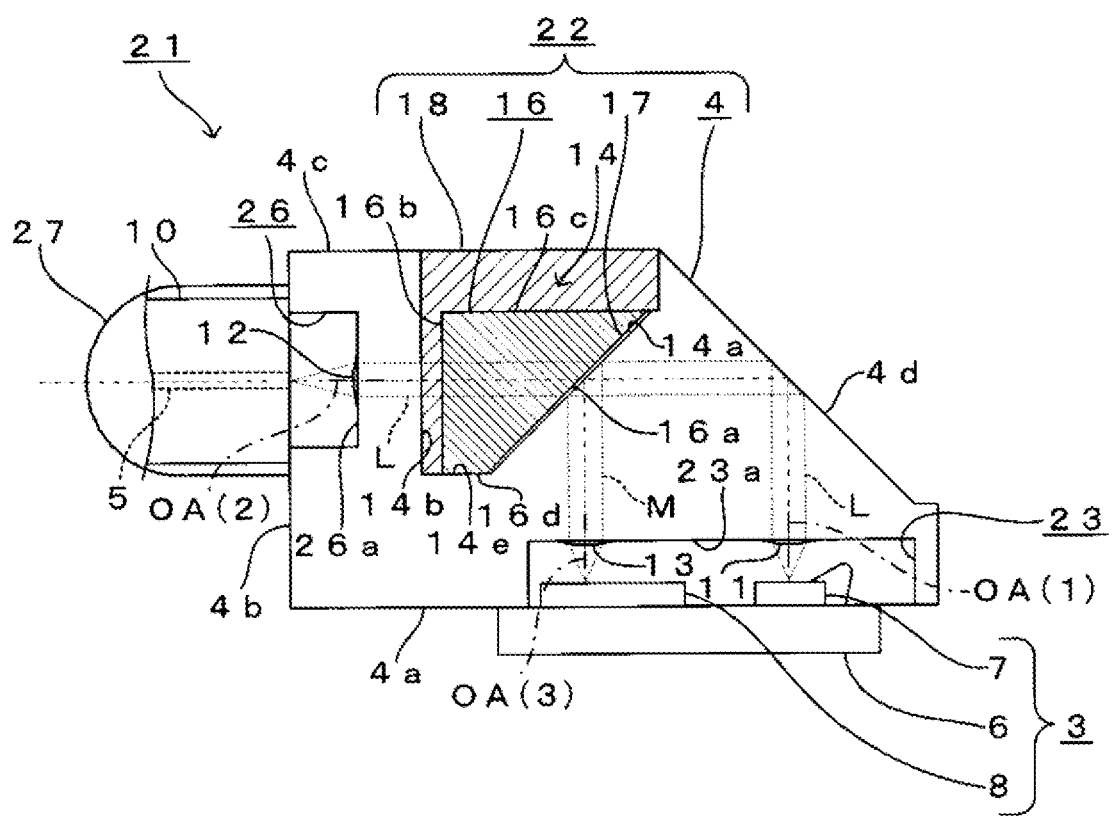
FIG. 7 is a configurational diagram schematically showing an overview of an optical module together with a longitudinal sectional view of a lens array in Embodiment 2 of the lens array and the optical module provided therewith according to the present invention.
Figure 8:
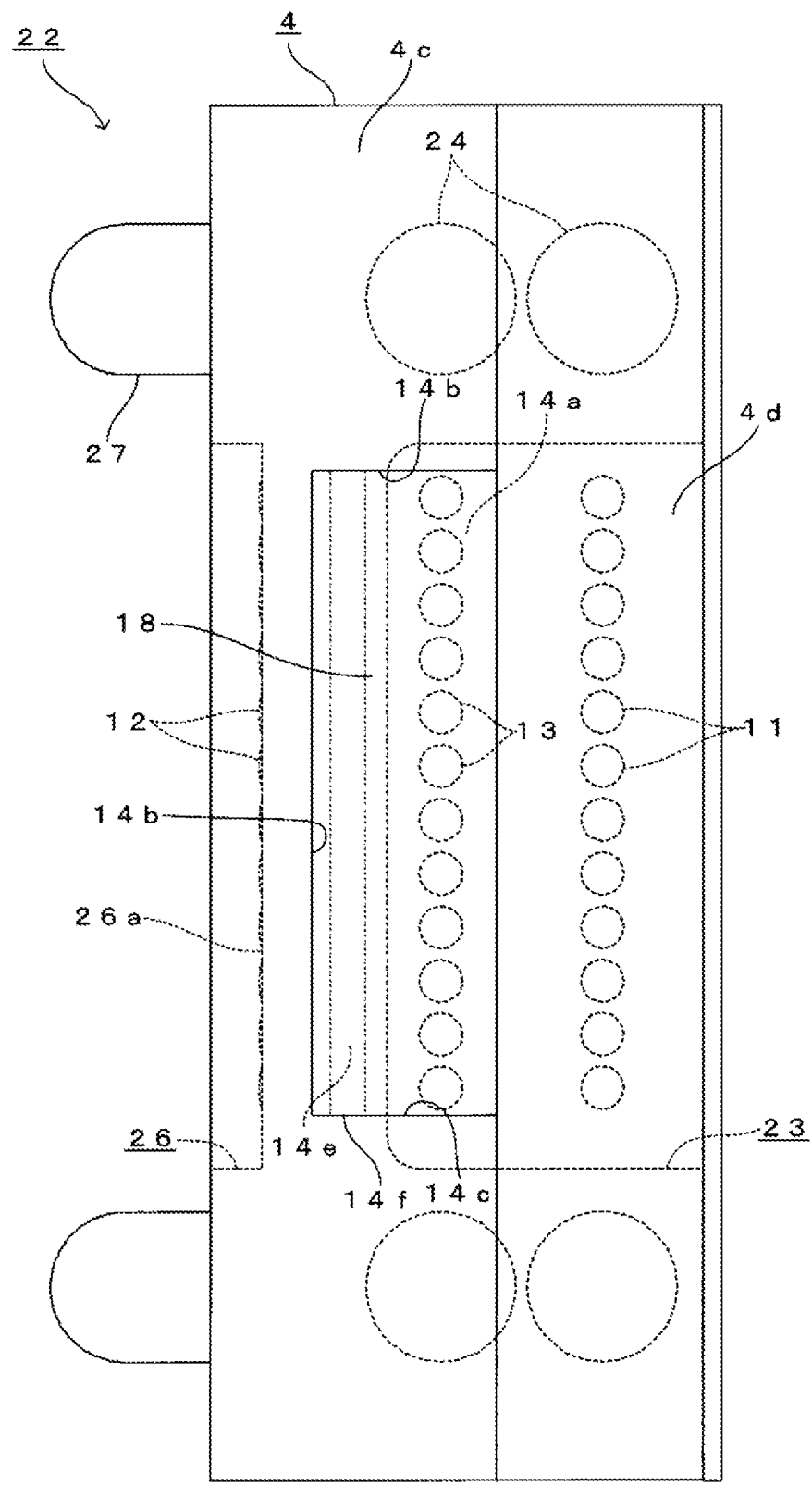
FIG. 8 is a plan view of the lens array shown in FIG. 7.
Figure 9:
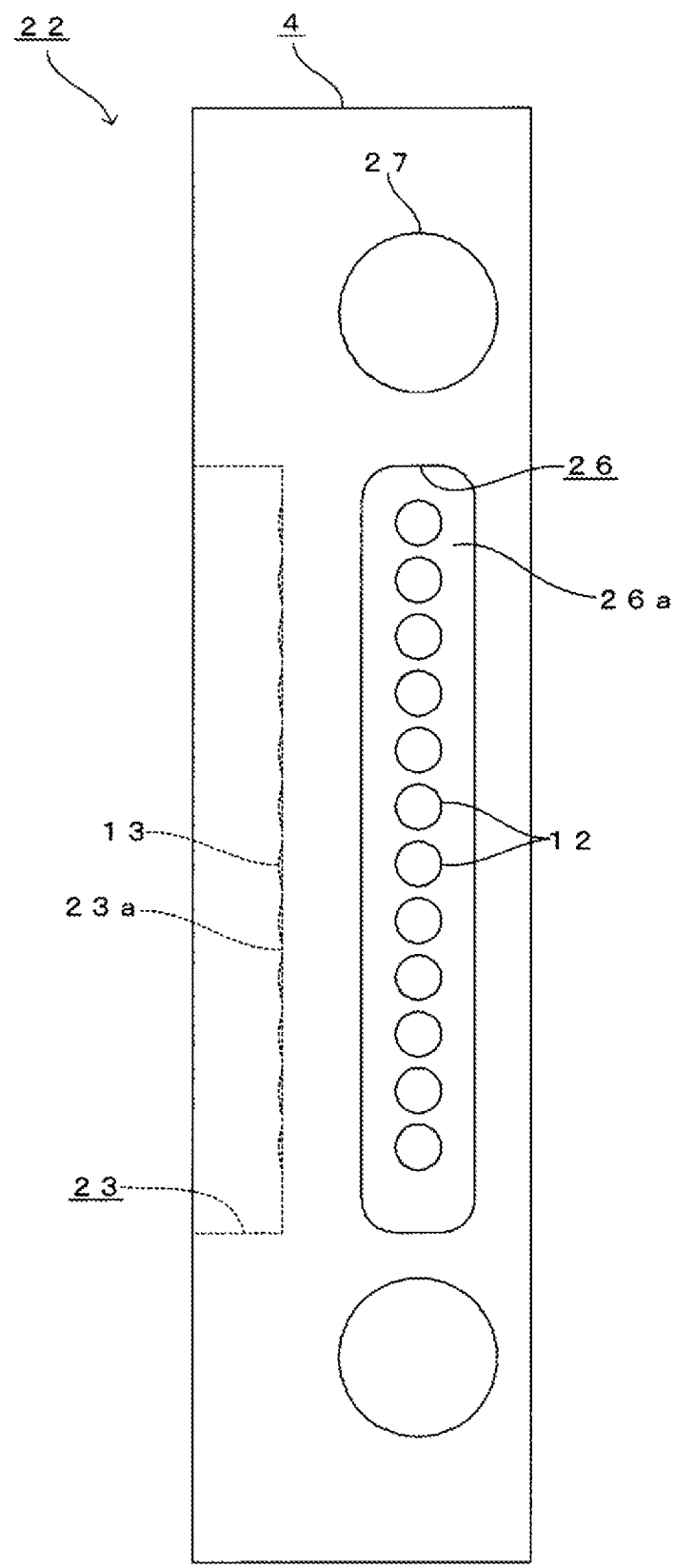
FIG. 9 is a left side view of FIG. 8.
Figure 10:
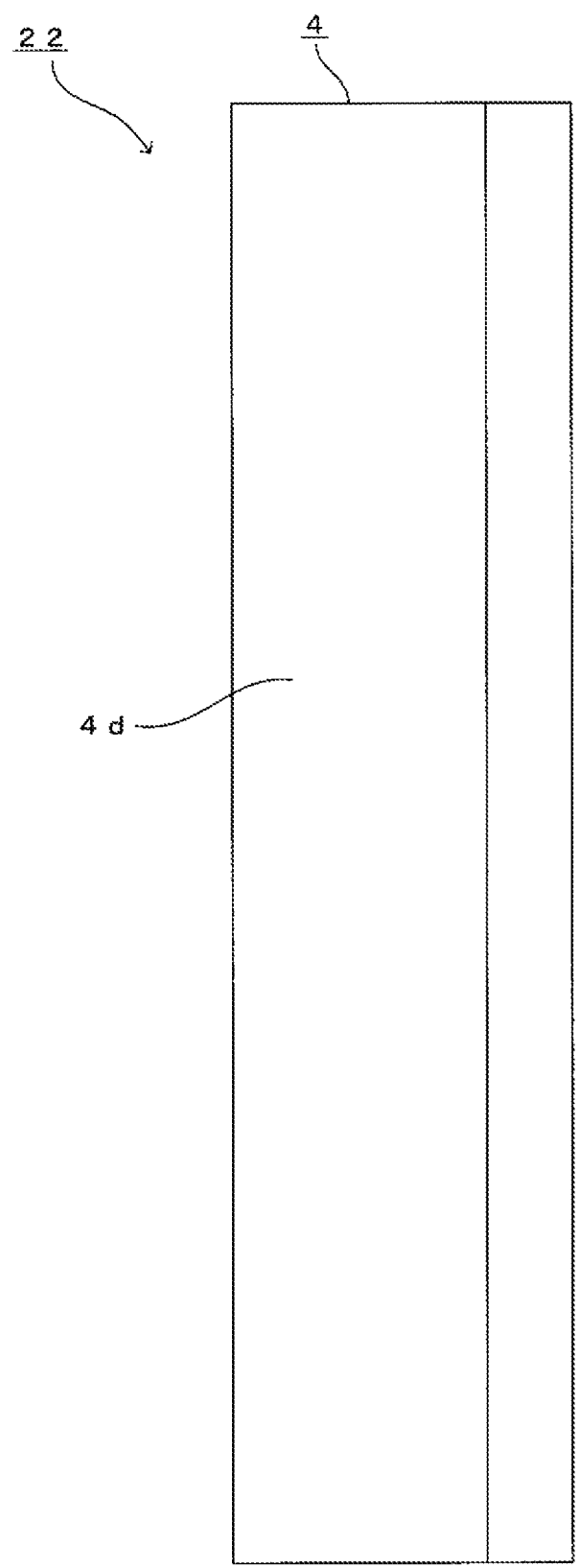
FIG. 10 is a right side view of FIG. 8.
Figure 11:
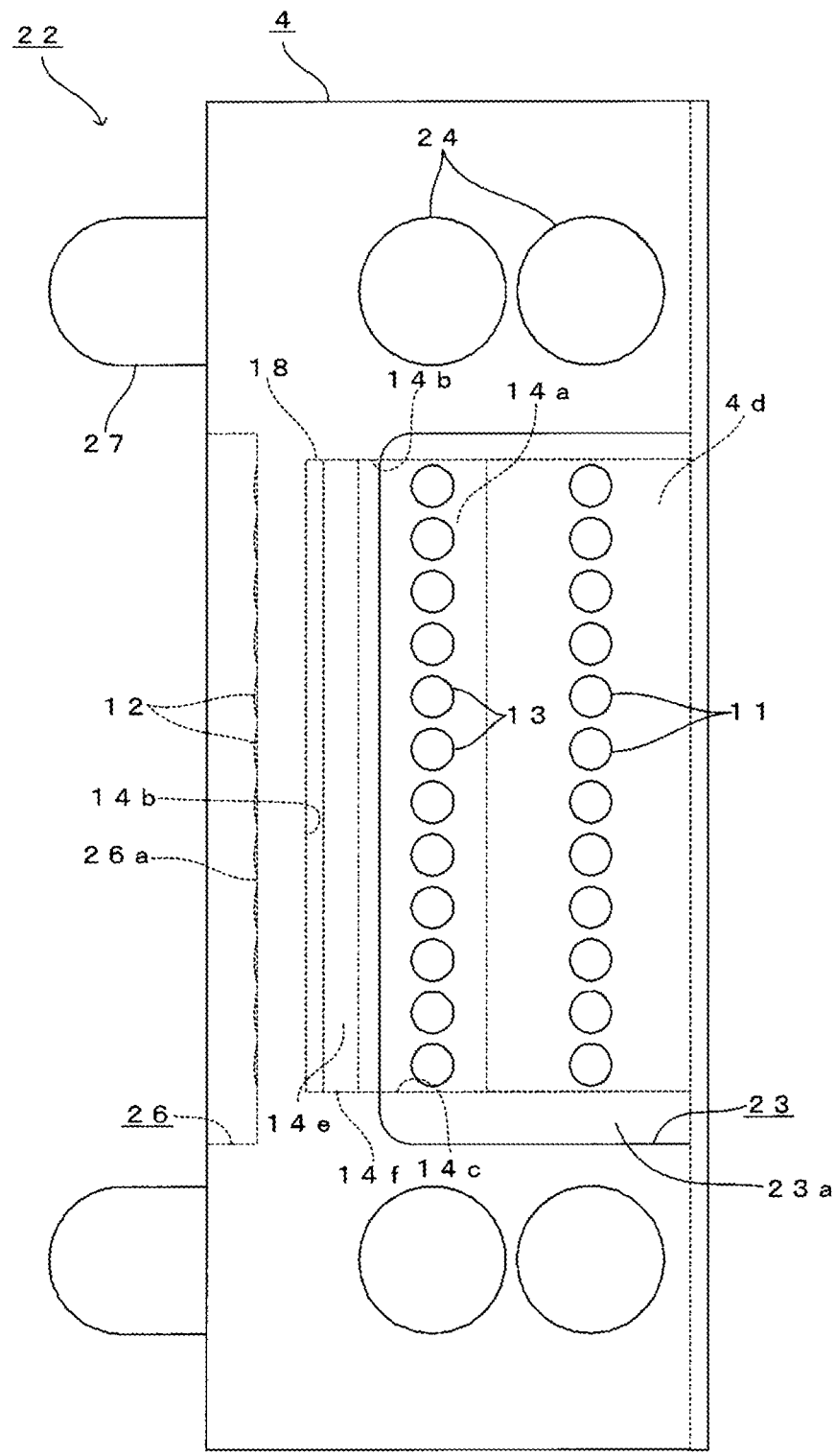
FIG. 11 is a bottom view of FIG. 8.

FIG. 7 is a configurational diagram schematically showing an overview of optical module 21 in this embodiment together with a longitudinal sectional view of lens array 22 in this embodiment. FIG. 8 is a plan view of lens array 22 shown in FIG. 7. FIG. 9 is a left side view of FIG. 8. FIG. 10 is a right side view of FIG. 8. FIG. 11 is a bottom view of FIG. 8.

In this embodiment, as a difference from Embodiment 1, means is provided for mechanically positioning optoelectric converting device 3 and optical fiber 5 when optoelectric converting device 3 and optical fiber 5 are fixed to lens array 22.

More specifically, as shown in FIGS. 7 and 11, in this embodiment, first lens surfaces 11 and second lens surfaces 12 are formed on bottom surface 23a of first counter-bore part 23 (first surface in this embodiment) provided with a dent in bottom face 4a of lens array body 4. Bottom surface 23a of first counter-bore part 23 is formed parallel to bottom face 4a. As shown in FIG. 11, first counter-bore part 23 is formed to have such a width in the longitudinal direction in FIG. 11 (hereinafter, referred to as the lens alignment direction) that the widthwise edges of first counter-bore part 23 are disposed slightly outwardly from lens surfaces 11 and 13 that are arranged outermost in the lens alignment direction. In this embodiment, lens array body 4 is formed wider in the lens alignment direction than the width of first counter-bore part 23 in the lens alignment direction. In accordance with this, as shown in FIG. 11, bottom face 4a includes portions that extend outwardly in the lens alignment direction from both ends of first counter-bore part 23. As shown in FIG. 11, at the both extended portions of bottom face 4a extending outwardly in the lens alignment direction from both ends of first counter-bore part 23, two pairs, four in total, of plano-convex fitting holes 24 are formed so as to be disposed across first counter-bore part 23 for positioning optoelectric converting device 3. Fitting holes 24 are fitted with fitting pins, not shown, penetrating through semiconductor substrate 6 in the state where semiconductor substrate 6 is in contact with extended portions of bottom face 4a. This allows optoelectric converting device 3 to be mechanically positioned when optoelectric converting device 3 is fixed to lens array 22.

As shown in FIGS. 7 and 9, in this embodiment, second lens surfaces 12 are formed on bottom surface 26a (second surface in this embodiment) of second counter-bore part 26 provided with a dent in left end face 4b of lens array 4. Bottom surface 26a of second counter-bore part 26 is formed parallel to left end face 4b. As shown in FIG. 9, second counter-bore part 26 is formed to have such a width in lens alignment direction that the widthwise edges of second counter-bore part 26 are disposed slightly outwardly from lens surfaces 12 arranged outermost in the lens alignment direction. As shown in FIG. 9, in this embodiment, left end face 4b includes portions that extend outwardly in the lens alignment direction from both ends of second counter-bore part 26. As shown in FIG. 9, at the both extended portions of left end face 4b, a pair, two in total, of fitting pins 27 are formed so as to be disposed across second counter-bore part 26 in a protruding manner as a structure for positioning optical fiber 5. Fitting pins 27 are fitted into fitting holes, not shown, formed in connector 10 in the state where connector 10 is in contact with the extended portions of left end face 4b. This allows optical fibers 5 to be mechanically positioned when optical fibers 5 are fixed to lens array 22.

As shown in FIG. 7, in this embodiment, as to a difference from Embodiment 1, concave part 14 is formed to extend upwardly from first optical surface 14a and second optical surface 14b. In accordance with this, the upper end of lens array body 4 is located upwardly from top face 16c of prism 16.

In FIG. 7, the upper end of lens array body 4 is a plane, or top face 4c, at the left of concave part 14. The upper end of lens array body 4 forms a ridge line at the right of concave part 14 by intersection of a portion extending upwardly from first optical surface 14a of the inner surface of concave part 14 and an extension of total reflection surface 4d.

Furthermore, as shown in FIG. 7, in this embodiment, filler 18 fills not only a space between second prism surface 16b and second optical surface 14b but also a space above top face 16c of prism 16, thereby filling a step between the upper end of lens array body 4 and top face 16c of prism 16.

The configuration of this embodiment can also exert excellent working-effect similar to those of Embodiment 1. Furthermore, in this embodiment, optoelectric converting device 3 and optical fiber 5 can be simply positioned with respect to lens array 22 using positioning structures 24 and 27. This allows optoelectric converting device 3 and optical fiber 5 to be simply fixed to lens array 22. Moreover, in this embodiment, the amount of filler 18 is larger and the adhesive area between prism 16 and concave part 14 is increased in comparison with Embodiment 1. This allows prism 16 to be bonded further firmly to concave part 14.

Instead of aforementioned fitting holes 24, through holes each having the same diameter as that of fitting hole 24 and penetrating lens array body 4 may be formed. As the structure for positioning optical fiber 5, fitting holes or through holes may be formed on the side of lens array body 4 and fitting pins may be formed on the side of optical fiber 5. Likewise, as the structure for positioning optoelectric converting device 3, fitting pins may be formed on the side of lens array body 4 and fitting holes or through holes may be formed on the side of optoelectric converting device 3. The positioning of optical fiber 5 and optoelectric converting device 3 is not limited to mechanical positioning. Instead, for instance, the positioning may be performed according to an optical method by optically recognizing a mark formed on lens array body 4.

(Variation)

Figure 12:
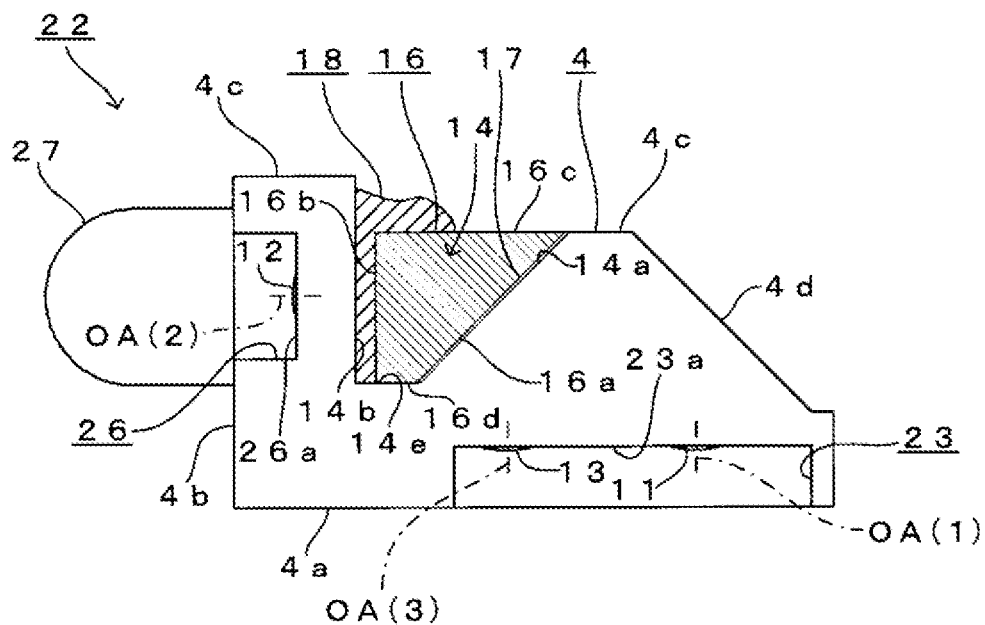
FIG. 12 is a configurational diagram schematically showing a variation of Embodiment 2.

Next, FIG. 12 shows a variation of this embodiment. Lens array 22 in this variation extends upwardly from top face 16c of prism 16 only at left side face of the array in FIG. 12 including second optical surface 14b among the sides of concave part 14. The other portions are formed to the same height as top face 16c of prism 16. In this variation, filler 18 fills not only a space between second prism surface 16b and second optical surface 14b but also the space in a manner flowing upwardly therefrom. More specifically, filler 18 fills the space up to the extension upward from second optical surface 14b on the left side face of concave part 14 and a predetermined range at the left end side of top face 16c of prism 16.

Embodiment 3

Embodiment 3 of a lens array and an optical module provided therewith according to the present invention will now be described mainly on difference from Embodiments 1 and 2 with reference to FIGS. 13 to 16.

In this embodiment, elements having configurations identical or similar to those in FIGS. 1 to 12 will be described using the same reference signs as those of FIGS. 1 to 12.

Figure 13:
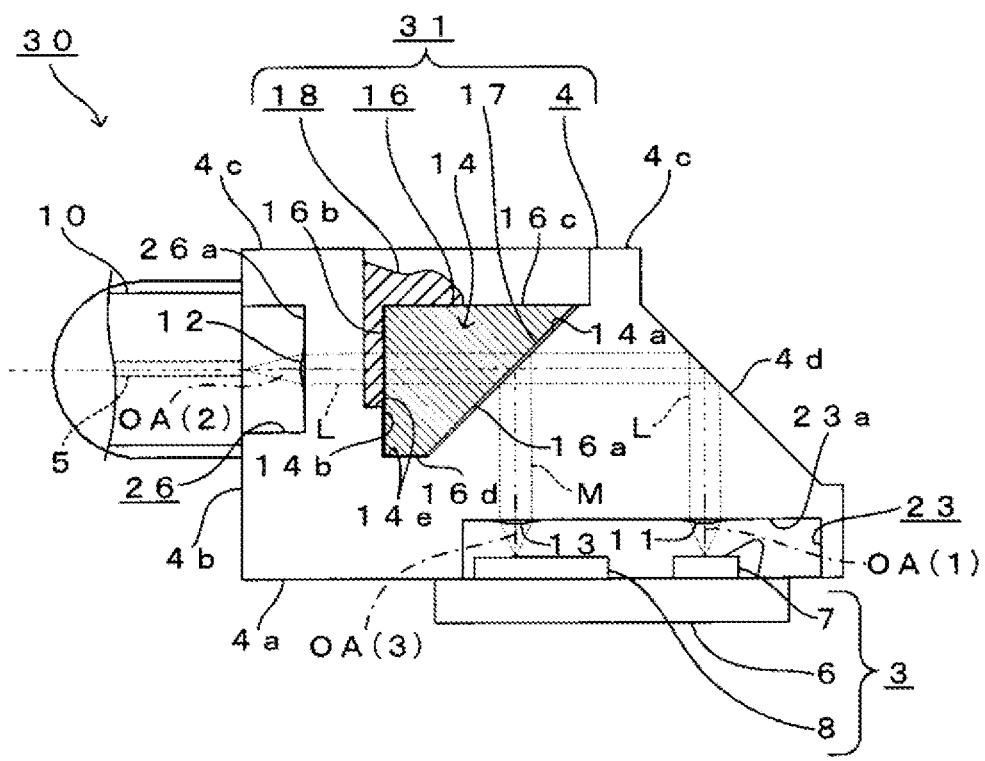
FIG. 13 is a configurational diagram schematically showing an overview of an optical module together with a longitudinal sectional view of a lens array in Embodiment 3 of the lens array and the optical module provided therewith according to the present invention.
Figure 14:
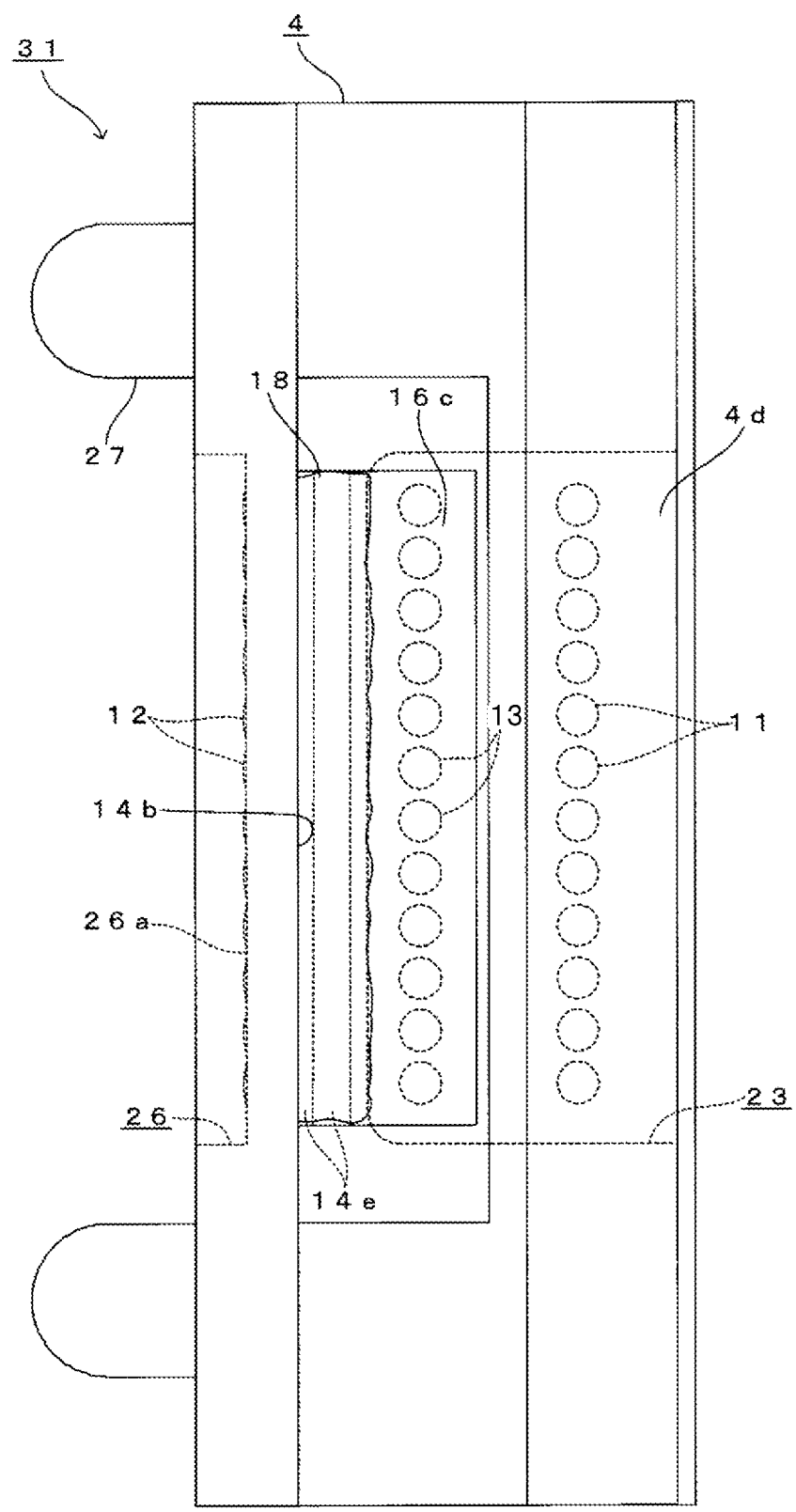
FIG. 14 is a plan view of the lens array shown in FIG. 13.
Figure 15:
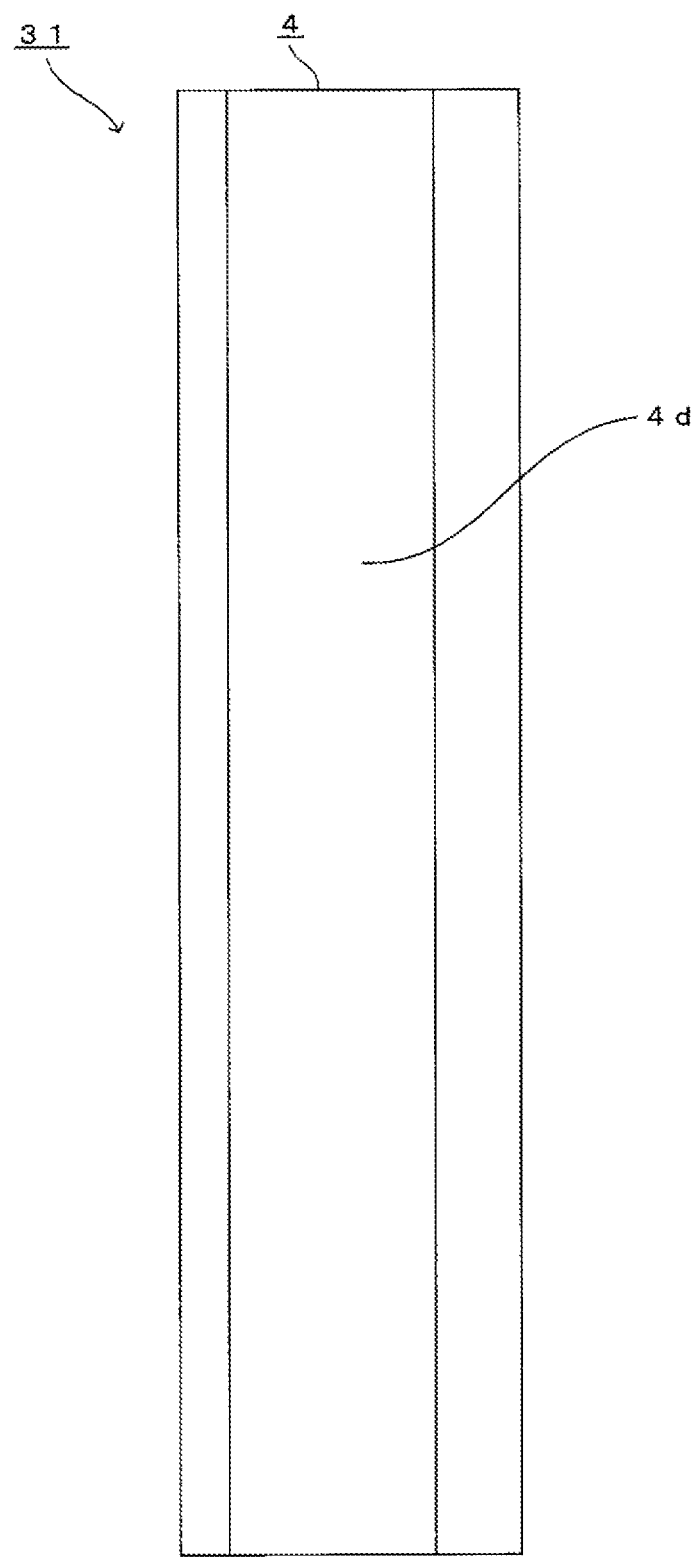
FIG. 15 is a right side view of FIG. 14.

FIG. 13 is a configurational diagram schematically showing an overview of optical module 30 in this embodiment together with a longitudinal sectional view of lens array 31 in this embodiment. FIG. 14 is a plan view of lens array 31 shown in FIG. 13. FIG. 15 is a right side view in FIG. 14.

As shown in FIG. 13, the configuration in this embodiment is similar to those in Embodiment 2 in that the side surfaces of concave part 14 extend upwardly from first optical surface 14a and second optical surface 14b, and filler 18 fills a space over top face 16c of prism 16.

However, this embodiment is different from Embodiment 2 in that concave part 14 has a characteristic shape in a part of the inner surface thereof to assist installation of prism 16 into concave part 14. More specifically, as shown in FIG. 13, in this embodiment, bottom surface 14e of concave part 14 has a two-step structure. The portion located to the left of prism 16 in FIG. 13 protrudes upwardly from the remaining portions (a portion in contact with bottom face 16d of prism 16). The measurements of the remaining portions of bottom surface 14e in the lateral direction in FIG. 13 match with the measurements of bottom face 16d of prism 16 in the same direction.

Bottom surface 14e of concave part 14 having such two-step structure can regulate backlash of prism 16 in the lateral direction in FIG. 13 by means of the step of bottom surface 14e in the case where prism 16 is installed in concave part 14 while securing a filling space with filler 18. This allows bottom surface 14e to assist installation of prism 16 into concave part 14.

Accordingly, this embodiment can exert advantageous working-effects of Embodiment 1, facilitate installation of prism 16 when prism 16 is bonded to concave part 14, and further facilitate manufacturing of lens array 31.

(First Variation)

Figure 16:
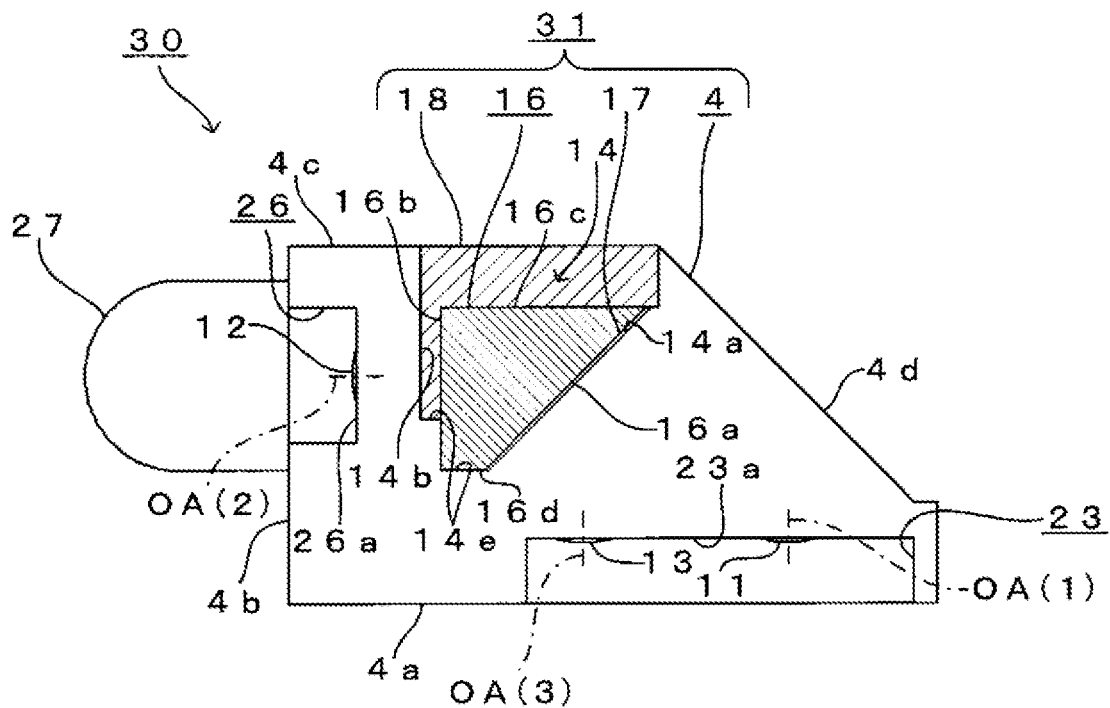
FIG. 16 is a configurational diagram schematically showing a first variation of Embodiment 3.

Next, FIG. 16 shows a first variation of this embodiment. Lens array 31 in this variation corresponds to a configuration where bottom surface 14e of concave part 14 of lens array 22 in Embodiment 2 shown in FIGS. 7 to 11 is formed into the two-step structure as with FIG. 13.

Lens array 31 in this variation can regulate the backlash of prism 16 in the lateral direction in FIG. 16 by means of the step of bottom surface 14e when prism 16 is installed in concave part 14 while securing the filling space with filler 18, as with lens array 31 shown in FIGS. 13 to 15. This allows bottom surface 14e to assist installation of prism 16 into concave part 14.

(Second Variation)

Figure 17:
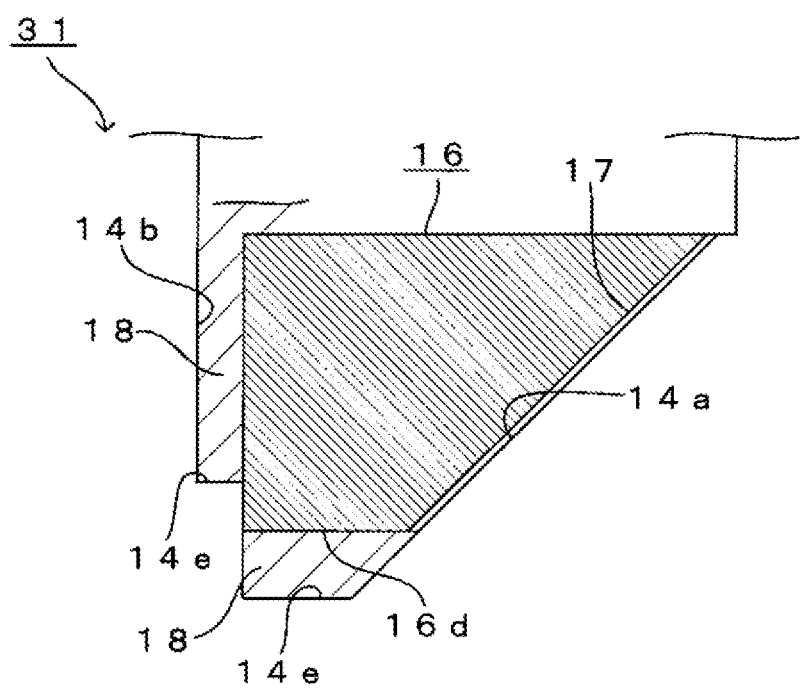
FIG. 17 is a configurational diagram schematically showing a second variation of Embodiment 3.

Next, FIG. 17 shows a second variation of this embodiment. Lens array 31 in this variation has a configuration shown in FIG. 13 or 16 wherein the measurements of bottom surface 16d of prism 16 in the lateral direction in FIG. 17 are larger than those of the portion at the lower step of the two-step structure of bottom surface 14e of concave part 14 in the same direction. Accordingly, in lens array 31 of this variation, a space can intentionally be formed between bottom surface 16d of prism 16 and the portion at the lower step of bottom surface 14e of concave part 14. Therefore, according to lens array 31 in this variation, as shown in FIG. 17, filler 18 can be inserted between bottom surface 16d of prism 16 and the portion at the lower step of bottom surface 14e of concave part 14, thereby allowing prism 16 to be fixed further firmly to lens array body 4. Lens array 31 in this variation allows lens array body 4 to support prism 16 via first optical surface 14a and the steps of bottom surface 14e such that prism 16 is laterally sandwiched, thereby enabling prism 16 to be stably disposed in concave part 14. Lens array 31 in this variation can facilitate an operation of fixing prism 16 using filler 18.

Embodiment 4

Embodiment 4 of a lens array and an optical module provided therewith according to the present invention will now be described mainly on difference from Embodiments 1 to 3 with reference to FIGS. 18 and 19.

In this embodiment, elements having configurations identical or similar to those in FIGS. 1 to 17 will be described using the same reference signs as those of FIGS. 1 to 17.

Figure 18:
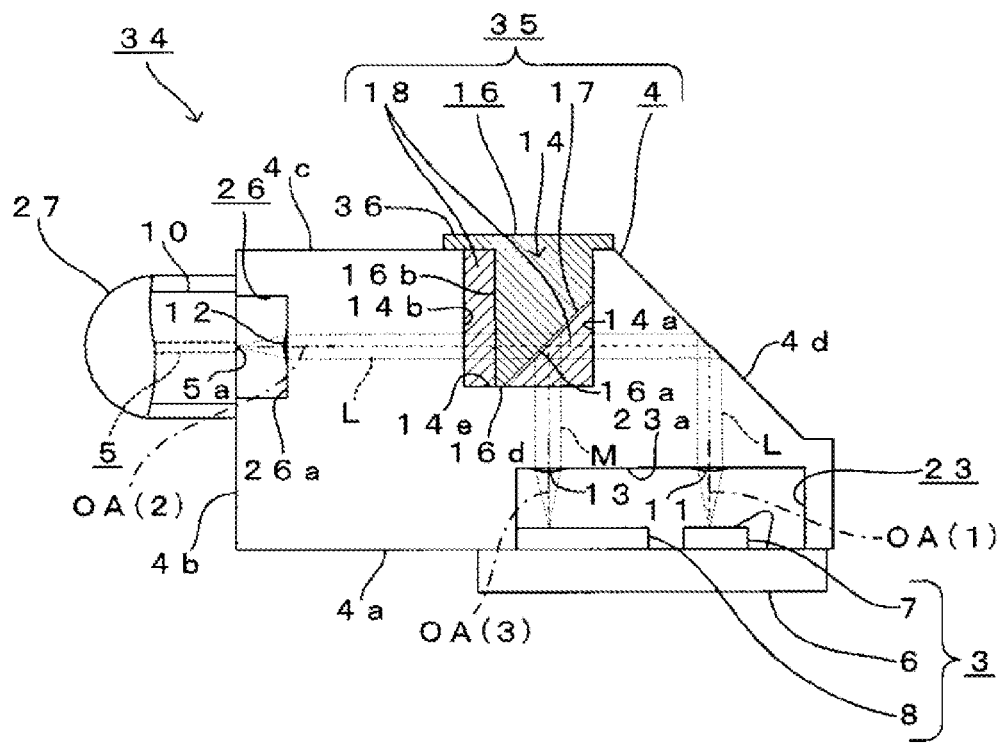
FIG. 18 is a configurational diagram schematically showing an overview of an optical module together with a longitudinal sectional view of a lens array in Embodiment 4 of the lens array and the optical module provided therewith according to the present invention.

As shown in FIG. 18, lens array 35 and optical module 34 in this embodiment are different from those in Embodiments 1 to 3 in that first optical surface 14a is formed parallel to left end face 4b.

As shown in FIG. 18, in this embodiment, reflecting/transmitting layer 17 is formed on first prism surface 16a having an inclining angle to left end face 4b. As with Embodiment 1, reflecting/transmitting layer 17 may be formed by coating first prism surface 16a with a metal single layer film or a dielectric multilayer film. The preferable range of the inclining angle of first prism surface 16a is as shown in Embodiment 1.

In accordance with the configurations of first optical surface 14a and reflecting/transmitting layer 17, as shown in FIG. 18, in this embodiment, a space having a right triangle in a sectional view is formed between first optical surface 14a and reflecting/transmitting layer 17. As shown in FIG. 18, in this embodiment, filler 18 fills not only a space between second optical surface 14b and second prism surface 16b but also a space between first optical surface 14a and reflecting/transmitting layer 17. Filler 18 inserted between first optical surface 14a and reflecting/transmitting layer 17 may be integral with filler 18 inserted between second optical surface 14b and second prism surface 16b. In this case, concave part 14 is formed larger in measurements in the lens alignment direction than prism 16 in the lens alignment direction. The portion largely formed in concave part 14 is filled with filler 18, and filler 18 may be integrated in the front and rear of prism 16. This configuration allows the contact area between prism 16 and filler 18 to be increased, thereby enabling prism 16 to be fixed further firmly to lens array body 4.

In the following description, for the sake of convenience, filler 18 inserted between first optical surface 14a and reflecting/transmitting layer 17 is referred to as filler 18 in the front of prism. Filler 18 inserted between second optical surface 14b and second prism surface 16b is referred to as filler 18 in the rear of prism.

Furthermore, in this embodiment, prism 16 and filler 18 are formed so as to have the same refractive index. Prism 16 and filler 18 are preferably formed to have the same refractive index as that of lens array body 4, in order to suppress Fresnel reflection on the interface between lens array body 4 and filler 18.

As shown in FIG. 18, in this embodiment, the right side face of concave part 14 where first optical surface 14a is formed extends upwardly in the perpendicular direction from first optical surface 14a. Furthermore, in this embodiment, the upper end of prism 16 is located above the upper end of first prism surface 16a. In accordance with this, the right end face of prism 16 parallel to left end face 4b is formed to extend from the upper end of first prism surface 16a toward the upper end of prism 16. As shown in FIG. 18, the right end face of prism 16 is in contact with the extension at the right side face of concave part 14 extending upwardly from first optical surface 14a. This allows prism 16 to be simply disposed at a fixation position in concave part 14.

Furthermore, as shown in FIG. 18, in this embodiment, plate-shaped flange 36 is formed integrally with prism 16 at the upper end of prism 16. Flange 36 is formed such that the measurements in lateral direction in FIG. 18 are larger than the measurements of prism 16 and concave part 14 in the same direction. Prism 16 is stably disposed in concave part 14 such that the undersurface of flange 36 is in contact with the circumference of concave part 14 at top face 4c of lens array body 4. In FIG. 18, bottom face 16d of prism 16 is in contact with bottom surface 14e of concave part 14. However, as long as flange 36 can secure stability and reliability of prism 16 as with this embodiment, bottom face 16d of prism 16 may be located above bottom surface 14e of concave part 14.

According to such a configuration of this embodiment, laser light L from each light emitting element 7, having been totally reflected by total reflection surface 4d, is perpendicularly incident on first optical surface 14a, and then immediately incident perpendicularly on filler 18 in the front of prism.

Next, laser light L from each light emitting element 7, having been incident on filler 18 in the front of prism is not refracted and moves forth through the optical path in filler 18 in the front of prism, and subsequently is incident on reflecting/transmitting layer 17. The incident direction at this time is perpendicular to left end face 4b.

On the traveling path of laser light L thereafter, laser light L from each light emitting element 7 moving forth through reflecting/transmitting layer 17 toward second lens surface 12 side is the same as that described in Embodiment 1.

Meanwhile, monitor light M from each light emitting element 7, having been reflected by reflecting/transmitting layer 17 and moved forth toward third lens surface 13 side, moves forth through the optical path in filler 18 in the front of prism, and subsequently is incident on bottom surface 14e of concave part 14. Monitor light M from each light emitting element 7, having been incident on bottom surface 14e, moves forth through the optical path in lens array body 4 and subsequently is incident on third lens surface 13.

That is, this embodiment allows monitor light M to be securely acquired by reflecting/transmitting layer 17, as with Embodiment 1.

In this embodiment, first optical surface 14a is formed parallel to left end face 4b, and prism 16 is formed so as to have the same refractive index as that of filler 18. Accordingly, this embodiment enables the optical path of laser light L from each light emitting element 7 in filler 18 and prism 16 to be maintained perpendicular to left end face 4b. Furthermore, laser light L from each light emitting element 7, having moved forth in filler 18 and prism 16, can be incident perpendicularly to second optical surface 14b. Moreover, as with Embodiment 1, the optical path on the incident side onto first optical surface 14a and the optical path on the emitting side from second optical surface 14b can be aligned on the same line.

Furthermore, in this embodiment, not only second optical surface 14b but also first optical surface 14a are formed parallel to left end face 4b, thereby simplifying design of first optical surface 14a and determination of accuracy in measuring thereof. On the other hand, for instance, in demolding of lens array body 4 from the mold in the case of injection molding of lens array body 4, if a scratch is formed on first optical surface 14a, filler 18 inserted between first optical surface 14a and reflecting/transmitting layer 17 can suppress occurrence of reflected light and scattered light due to the scratch on first optical surface 14a.

In the case where the effect of suppressing reflected light or scattered light on second optical surface 14b is not required, it is sufficient to fill filler 18 only between first optical surface 14a and reflecting/transmitting layer 17. Also in this case, laser light L from each light emitting element 7, having moved forth in filler 18 and prism 16, can sequentially be incident perpendicularly on second prism surface 16b and second optical surface 14b. This allows the optical path on the incident side onto first optical surface 14a and the optical path on the emitting side from second optical surface 14b to be aligned on the same line.

Figure 19:
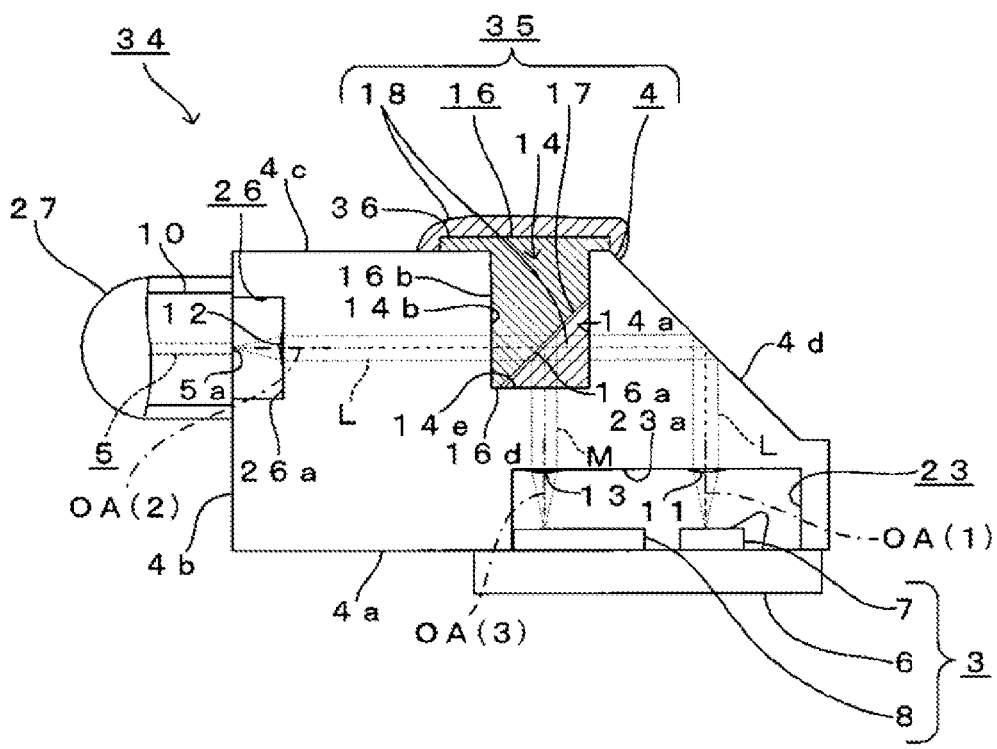
FIG. 19 is a configurational diagram schematically showing a variation of Embodiment 4.

As shown in FIG. 19, filler 18 may newly be disposed that causes the entire left end face of prism 16 including second prism surface 16b to be in contact with the entire left side face of concave part 14 including second optical surface 14b and covers the entire flange 36 and circumference of flange 36 on top face 4c of lens array body 4 from above.

Furthermore, in this embodiment (configuration in FIG. 18), bottom surface 14e may have a two-step structure to assist installation of prism 16 into concave part 14 as with Embodiment 3.

Embodiment 5

Embodiment 5 of a lens array and an optical module provided therewith according to the present invention will now be described mainly on difference from Embodiment 4 with reference to FIGS. 20 and 21.

In this embodiment, elements having configurations identical or similar to those in FIGS. 18 and 19 will be described using the same reference signs as those of FIGS. 18 and 19.

Figure 20:
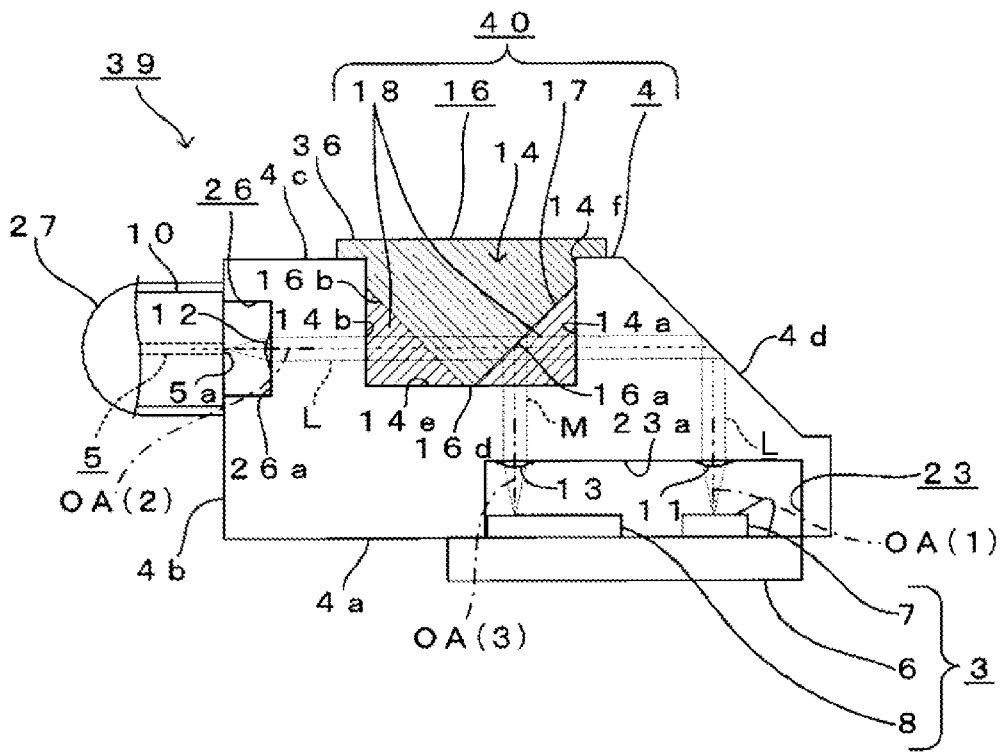
FIG. 20 is a configurational diagram schematically showing an overview of an optical module together with a longitudinal sectional view of a lens array in Embodiment 5 of the lens array and the optical module provided therewith according to the present invention.

As shown in FIG. 20, lens array 40 and optical module 39 in this embodiment are formed such that first optical surface 14a is parallel to left end face 4b as with Embodiment 4.

Note that, as shown in FIG. 20, this embodiment is different from Embodiment 4 in that second prism surface 16b is disposed to have a predetermined inclining angle to left end face 4b. More specifically, as shown in FIG. 20, the inclining angle of second prism surface 16b is set such that it extends toward first prism surface 16a side in the direction from opening 14f side to bottom surface 14e side of concave part 14. On the other hand, the inclining angle of first prism surface 16a is set such that it extends toward second prism surface 16b side in the direction from opening 14f side to bottom surface 14e side of concave part 14. Furthermore, as shown in FIG. 20, first prism surface 16a and second prism surface 16b intersect with each other at the bottom ends thereof. Accordingly, in this embodiment, prism 16 reflects such inclining angles of prism surfaces 16a and 16b, and thereby has the entire side shape similar to a home plate. The inclining angle of second prism surface 16b is preferably within a range from 40° to 50° (more preferably, 45°) in the counterclockwise direction in FIG. 20 with reference to left end face 4b (0°).

As shown in FIG. 20, in this embodiment, left end face of prism 16 parallel to left end face 4b is in contact with a portion extending upwardly in the vertical direction from second optical surface 14b of left side face of concave part 14 identically parallel to left end face 4b.

This embodiment can also realize the optical path of monitor light M as with that described in Embodiment 4, thereby allowing monitor light to be securely acquired.

According to this embodiment, laser light L from each light emitting element 7, having passed through reflecting/transmitting layer 17, moves forth through the optical path in prism 16 while maintaining linearity to the optical path connecting total reflection surface 4d and first optical surface 14a, and subsequently is incident on filler 18 in the rear of prism via second prism surface 16b. Here, filler 18 in the rear of prism is formed to have the same refractive index as that of prism 16. Accordingly, laser light L from each light emitting element 7, having been incident on filler 18 in the rear of prism, is not refracted and moves forth through the optical path in filler 18, and subsequently is perpendicularly incident on second optical surface 14b. Accordingly, as with Embodiment 1, the optical path on the incident side onto first optical surface 14a and the optical path on the emitting side from second optical surface 14b can be aligned on the same line.

Figure 21:
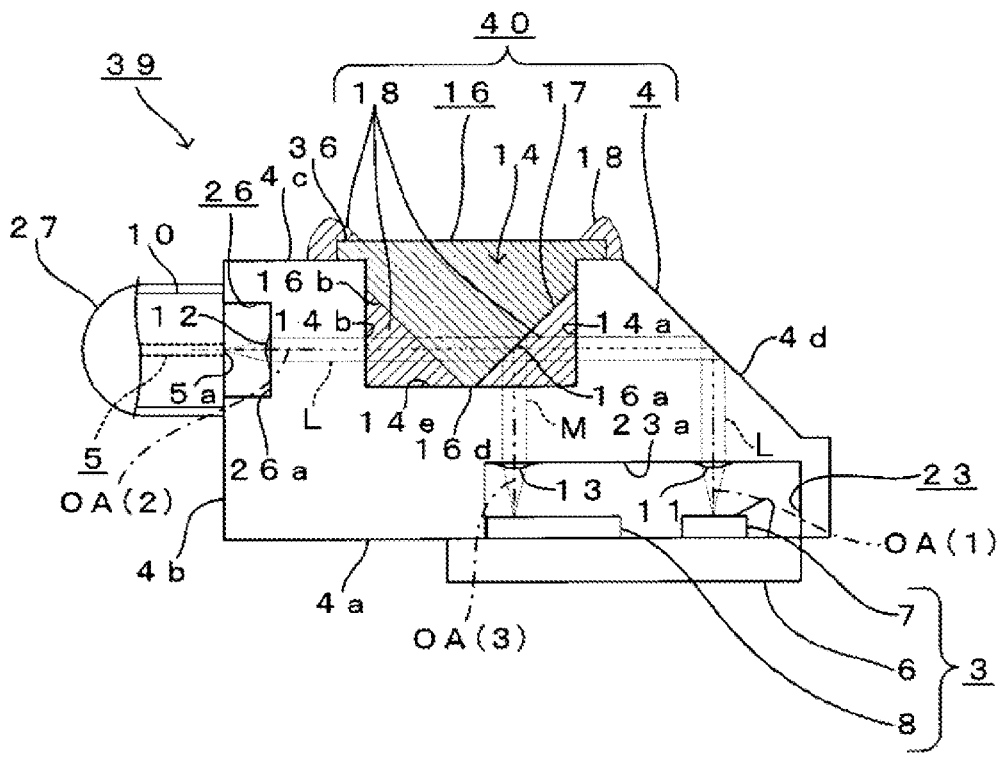
FIG. 21 is a configurational diagram of a variation of Embodiment 5.

As shown in FIG. 21, in this embodiment, filler 18 may newly be provided that covers the entire flange 36 and circumference of flange 36 at top face 4c of lens array body 4 from the above.

Embodiment 6

Embodiment 6 of a lens array and an optical module provided therewith according to the present invention will now be described mainly on difference from Embodiment 5 with reference to FIG. 22.

In this embodiment, elements having configurations identical or similar to those in FIGS. 20 and 21 will be described using the same reference signs.

Figure 22:
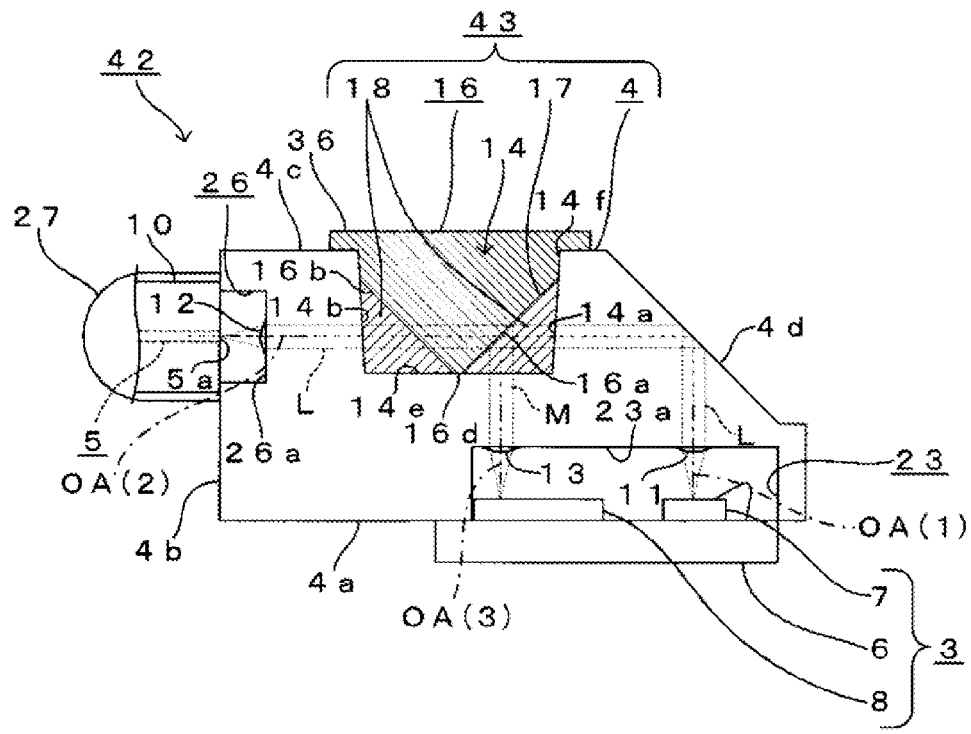
FIG. 22 is a configurational diagram schematically showing an overview of an optical module together with a longitudinal sectional view of a lens array in Embodiment 6 of the lens array and the optical module provided therewith according to the present invention.

As shown in FIG. 22, as to lens array 43 and optical module 42 in this embodiment, first prism surface 16a and second prism surface 16b are formed into inclining surfaces, as with Embodiment 5.

Note that this embodiment is different from Embodiment 5 in that first optical surface 14a is formed to have a predetermined slight inclining angle to left end face 4b and second optical surface 14b is formed to have a predetermined slight inclining angle to left end face 4b. The slight inclining angle of first optical surface 14a is set such that first optical surface 14a slightly inclines toward second optical surface 14b side in the direction from opening 14f side to bottom surface 14e side of concave part 14. The slight inclining angle of second optical surface 14b is set such that second optical surface 14b slightly inclines toward first optical surface 14a side in the direction from opening 14f side to bottom surface 14e side of concave part 14.

For instance, the slight inclining angle of first optical surface 14a may be in a range from 1° to 3° (preferably, 2°) in the clockwise direction in FIG. 22 with reference to left end face 4b(0°). The slight inclining angle of second optical surface 14b may be in a range from 1° to 3° (preferably, 2°) in the counterclockwise direction in FIG. 22 with reference to left end face 4b (0°).

Furthermore, in this embodiment, lens array body 4, prism 16 and filler 18 (both in the front and rear of prism) are formed to have the same refractive index. In the case of using the aforementioned ARTON as the material of lens array body 4 and prism 16, the aforementioned A1754B can be used as filler 18. Instead, in the case of using PMMA as the material of lens array body 4 and prism 16, AX4-LS-06 made by NIPPON SHOKUBAI can be used as filler 18.

This embodiment can also realize the optical path of monitor light M similar to that described in Embodiment 5, thereby allowing the monitor light to be securely acquired.

Furthermore, according to this embodiment, laser light L from each light emitting element 7, having been totally reflected by total reflection surface 4d, moves forth through the optical path in lens array body 4 and subsequently is incident from first optical surface 14a to filler 18 in the front of prism. At this time, filler 18 in the front of prism is formed to have the same refractive index as that of lens array body 4. Accordingly, laser light L from each light emitting element 7, having been incident on filler 18 in the front of prism is not refracted, moves forth through the optical path in filler 18 in the front of prism while maintaining linearity to the optical path connecting total reflection surface 4d and first optical surface 14a, and subsequently is incident on reflecting/transmitting layer 17. Moreover, prism 16 is formed to have the same refractive index as that of filler 18 in the front of prism. Accordingly, laser light L from each light emitting element 7, having passed through reflecting/transmitting layer 17, moves forth through the optical path in prism 16 while maintaining linearity to the optical path connecting total reflection surface 4d and first optical surface 14a, and subsequently is incident on filler 18 in the rear of prism via second prism surface 16b. Here, filler 18 in the rear of prism is formed to have the same refractive index as that of prism 16. Accordingly, laser light L from each light emitting element 7, having been incident on filler 18 in the rear of prism, is not refracted and moves forth through the optical path in filler 18 in the rear of prism while maintaining linearity to the optical path connecting total reflection surface 4d and first optical surface 14a. Subsequently, laser light L from each light emitting element 7 is incident on lens array body 4 via second optical surface 14b. Here, lens array body 4 is formed to have the same refractive index as that of filler 18 in the rear of prism. Accordingly, laser light L from each light emitting element 7, having been incident on lens array body 4, is not refracted, and moves forth through the optical path in lens array body 4 toward second lens surface 12 while maintaining linearity to the optical path connecting total reflection surface 4d and first optical surface 14a. Accordingly, as with Embodiment 1, the optical path on the incident side onto first optical surface 14a and the optical path on the emitting side from second optical surface 14b can be aligned on the same line.

Furthermore, in this embodiment, first optical surface 14a and second optical surface 14b have a slight inclining angle.

Accordingly, in the case of integrally forming lens array body 4 using a mold, demoldability of lens array body 4 can be secured.

In FIG. 22, the entire right side face of concave part 14 including first optical surface 14a has a slight inclining angle. In accordance with this, the right end face of prism 16 (portion extending upwardly from the upper end of first prism surface 16a) is contact with the portion extending upwardly from the upper end of first optical surface 14a on the right side face of concave part 14 in the state where the right end face of prism 16 has the same inclining angle as that of the right side face of concave part 14. However, the configuration is not necessarily limited to such a configuration. For instance, the portion upwardly extending from the upper end of first optical surface 14a on the right side face of concave part 14 may be formed parallel to left end face 4b (inclining angle 0°). In accordance with this, the right end face of prism 16 may be formed parallel to left end face 4b.

Likewise, in FIG. 22, the entire left side face of concave part 14 including second optical surface 14b has a slight inclining angle. In accordance with this, the left end face of prism 16 (portion extending upwardly from the upper end of second prism surface 16b) is in contact with the portion extending upwardly from the upper end of second optical surface 14b on the left side face of concave part 14, in the state where the left end face of prism 16 has the same inclining angle as that of the left side face of concave part 14. However, the configuration is not necessarily limited to such a configuration. For instance, the portion extending upwardly from the upper end of second optical surface 14b on the left side face of concave part 14 may be formed parallel to left end face 4b. In accordance with this, the left end face of prism 16 may also be formed parallel to left end face 4b.

Embodiment 7

Embodiment 7 of a lens array and an optical module provided therewith according to the present invention will now be described mainly on difference from Embodiment 5 with reference to FIG. 23.

In this embodiment, elements having configurations identical or similar to those in FIGS. 20 and 21 will be described using the same reference signs.

Figure 23:
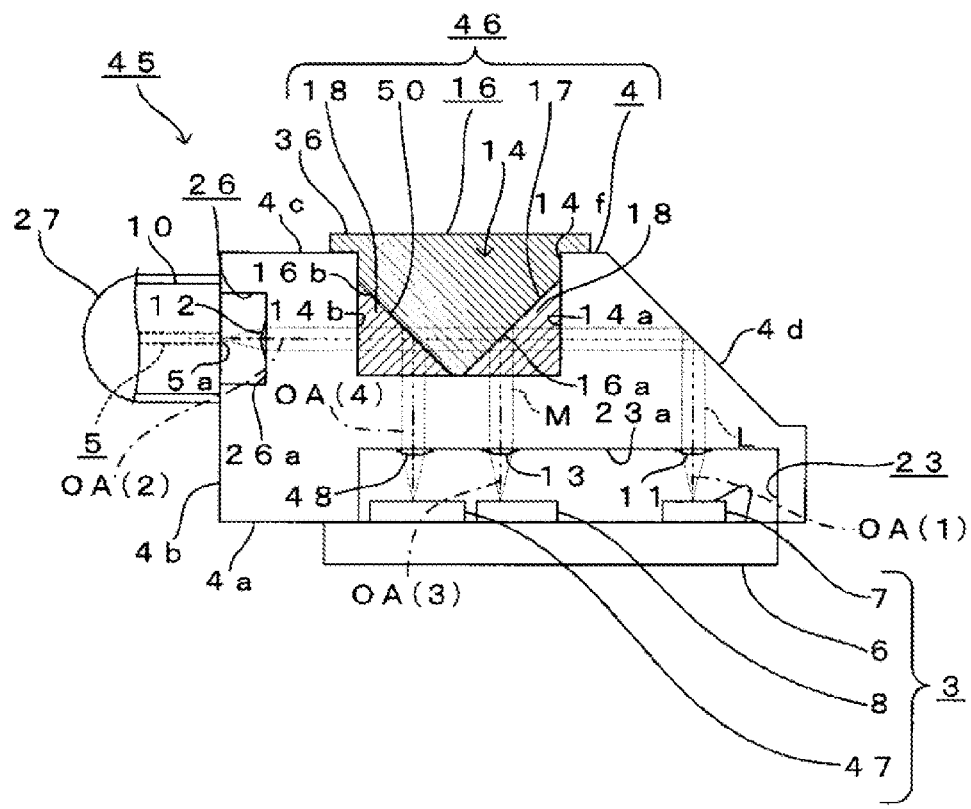
FIG. 23 is a configurational diagram schematically showing an overview of an optical module together with a longitudinal sectional view of a lens array in Embodiment 7 of the lens array and the optical module provided therewith according to the present invention.

As shown in FIG. 23, as to lens array 46 and optical module 45 in this embodiment, as with Embodiment 5, first optical surface 14a and second optical surface 14b are formed parallel to left end face 4b, and first prism surface 16a and second prism surface 16b are formed into inclining surfaces.

However, the configuration of this embodiment is different from that in Embodiment 5, and applicable not only to transmission of optical signals but also to reception of optical signals.

More specifically, as shown in FIG. 23, in this embodiment, laser light having the same wavelength is emitted from end face 5a of each optical fiber 5 toward lens array 46. Accordingly, the laser light emitted from each optical fiber 5 has a wavelength different from that of laser light L emitted from each light emitting element 7. As more specific means, a plurality of light emitting elements, not shown, equal in number to optical fibers 5 are disposed at the end faces of optical fibers 5 on the side opposite to end faces 5a facing lens array 46, and light emitted from the light emitting elements are incident on respective corresponding optical fibers 5.

The laser light having thus emitted from each optical fiber 5 enters respective second lens surfaces 12 corresponding to the optical fibers.

As shown in FIG. 23, in this embodiment, optoelectric converting device 3 includes a plurality of second light receiving elements 47 that are on a surface of semiconductor substrate 6 facing lens array 46 at left adjacent positions of light receiving elements 8 in FIG. 23 and receive laser light emitted from respective optical fibers 5. The plurality of second light receiving elements 47 are arranged equal in number and pitch to second lens surfaces 12 along the same direction as the alignment direction of second lens surfaces 12. Each second light receiving element 47 may be a photodetector.

Furthermore, as shown in FIG. 23, at positions facing second light receiving elements 47 at bottom face 4a (i.e. bottom surface 23a of counter-bore part 23), a plurality of respective fourth lens surfaces 48 are formed that emit laser light toward second light receiving elements 47 after it has been emitted from optical fibers 5 and incident from the inside of lens array body 4. The plurality of fourth lens surfaces 48 are provided equal in number and pitch to second lens surfaces 12, along the same direction as the alignment direction of second lens surfaces 12.

Furthermore, as shown in FIG. 23, second reflecting/transmitting layer 50 is disposed on second prism surface 16b.

Here, laser light having been emitted from each optical fiber 5 and incident on second lens surface 12 is incident on second reflecting/transmitting layer 50. Second reflecting/transmitting layer 50 reflects the incident laser light at a predetermined reflectance toward fourth lens surfaces 48 side while allowing the light to pass through at a predetermined transmittance.

According to such a configuration, the laser light emitted from each optical fiber 5 passes through second lens surface 12, second reflecting/transmitting layer 50 and fourth lens surface 48 and is coupled to second light receiving element 47. Accordingly, bidirectional optical communication can be effectively supported.

Second reflecting/transmitting layer 50 may be formed using the same material and method as those of reflecting/transmitting layer 17.

In terms of facilitation of design, optical axis OA(4) on fourth lens surface 48 is preferably perpendicular to bottom face 4a. The configuration for supporting bidirectional communication similar to this embodiment may be applied to the configuration in Embodiment 6.

Embodiment 8

Embodiment 8 of a lens array and an optical module provided therewith according to the present invention will now be described mainly on a configuration specific to this embodiment with reference to FIGS. 24 to 27.

In this embodiment, elements having configurations identical or similar to those in each of the embodiments will be described using the same reference signs.

Figure 24:
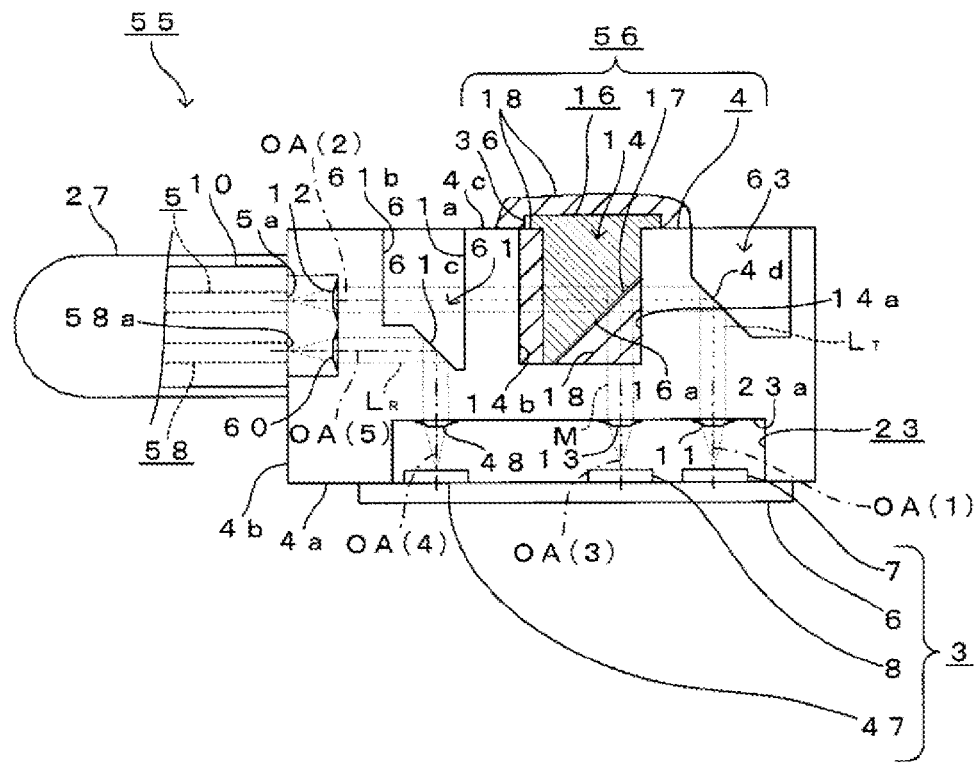
FIG. 24 is a configurational diagram schematically showing an overview of an optical module together with a longitudinal sectional view of a lens array in Embodiment 8 of the lens array and the optical module provided therewith according to the present invention.
Figure 25:
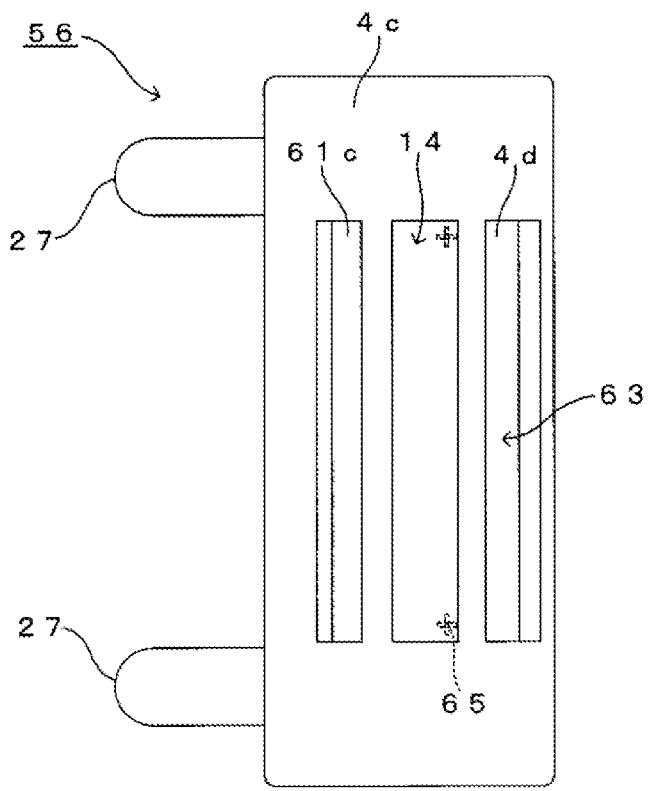
FIG. 25 is a plan view of the lens array shown in FIG. 24.
Figure 26:
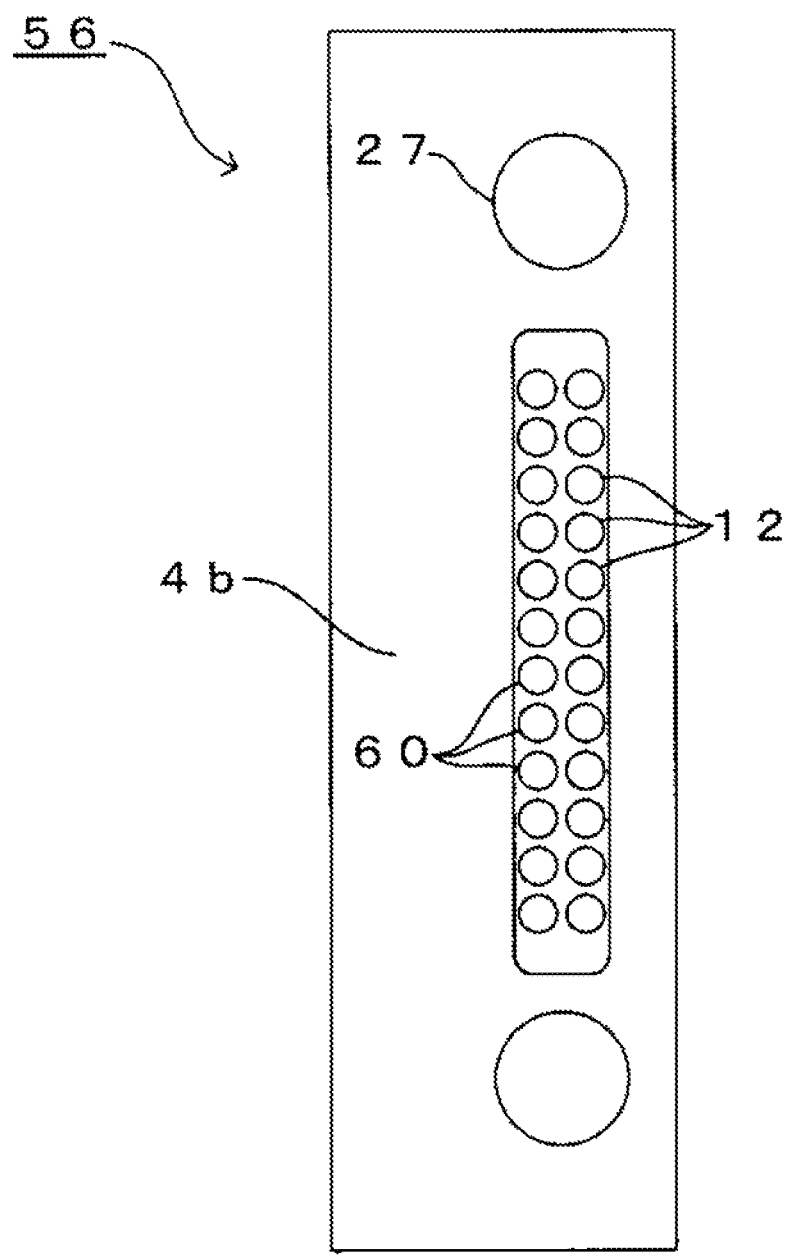
FIG. 26 is a left side view of the lens array shown in FIG. 24.
Figure 27:
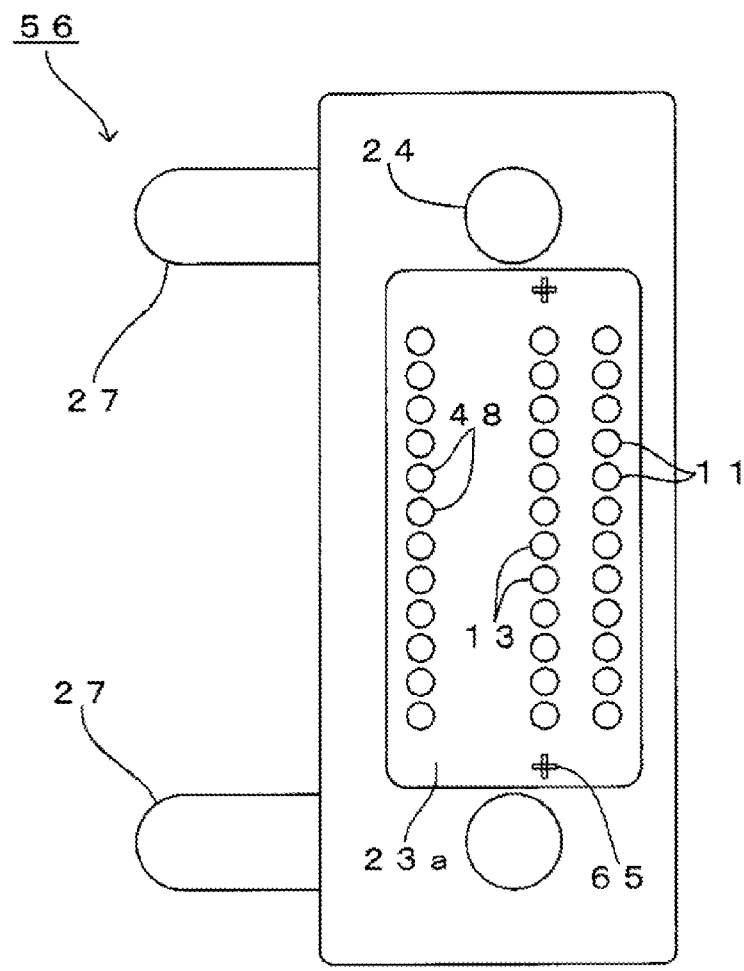
FIG. 27 is a bottom view of the lens array shown in FIG. 24.

FIG. 24 is a configurational diagram schematically showing an overview of optical module 55 in this embodiment together with a longitudinal sectional view of lens array 56 in this embodiment. FIG. 25 is a plan view of lens array 56 shown in FIG. 24. FIG. 26 is a left side view of lens array 56 shown in FIG. 24. FIG. 27 is a bottom view of lens array 56 shown in FIG. 24.

Here, as shown in FIG. 24, lens array 56 and optical module 55 of this embodiment are the same as those in the configuration of Embodiment 4 in FIG. 18, in terms of configurations of concave part 14, prism 16, reflecting/transmitting layer 17 and filler 18 in concave part 14. In this embodiment, the left end of flange 36 of prism 16 is formed shorter than that in Embodiment 4, and disposed on filler 18 in concave part 14. Adoption of such a difference in configuration in Embodiment 4 may be optional.

As shown in FIG. 24, in this embodiment, as with Embodiment 7 shown in FIG. 23, optoelectric converting device 3 includes second light receiving elements 47 formed to align along the alignment direction of second lens surface 12 that are on a surface of semiconductor substrate 6 facing lens array 56 at left adjacent positions of light receiving elements 8 in FIG. 24. Furthermore, as shown in FIGS. 24 and 27, in this embodiment, as with Embodiment 7, the plurality of fourth lens surfaces 48 are formed to align along the alignment direction of second lens surfaces 12 at positions facing second light receiving elements 47 at bottom face 4a of lens array 4 (bottom surface 23a of counter-bore part 23).

As with Embodiment 7, second light receiving elements 47 and fourth lens surfaces 48 have configurations for supporting reception of optical signals.

Note that, in this embodiment, optical signals are not received according to a one core bidirectional (BiDi) system, which is adopted in Embodiment 7. As shown in FIG. 24, signals are received using second optical fibers 58 dedicated for reception, which are second transmission members. Second optical fibers 58 are arranged in parallel adjacent to optical fibers 5 for transmission (below adjacent in FIG. 24) so that second optical fibers 58 are held in the same connector 10 as optical fibers 5 for transmission. In this embodiment, second optical fibers 58 are provided equal in pitch and number (twelve) to optical fibers 5 for transmission, along the same direction as the alignment direction of optical fibers 5 for transmission. The number of second optical fibers 58 is identical to the number of second light receiving elements 47 and the number of fourth lens surfaces 48.

In this embodiment, laser light is emitted from end faces 58a of the plurality of second optical fibers 58 facing lens array 56, toward lens array 56. The laser light corresponds to a reception optical signal.

As shown in FIGS. 24 and 26, fifth lens surfaces 60, which are equal in number to second optical fibers 58 and on which light emitted from respective second optical fibers 58 is incident, are provided at positions that are adjacent to second lens surfaces 12 on left end face 4b of lens array 4 in the direction orthogonal to the alignment direction of these surfaces 12 (downward direction in FIG. 24) and face end faces 58a of second optical fibers 58. The plurality of fifth lens surfaces 60 are arranged in line at the same pitch as second lens surfaces 12 along the alignment direction of second lens surfaces 12. Fifth lens surfaces 60 may have the same diameter as that of the second lens surfaces.

Furthermore, as shown in FIGS. 24 and 25, second concave part 61 is formed in a reentrant manner so as to be located at the left of concave part 14 on top face 4c of lens array 4 and be located at the left of concave part 14 and so that the optical paths connecting first lens surfaces 11 and second lens surfaces 12 pass through concave part 14.

Here, as shown in FIG. 24, second concave part 61 has third optical surface 61a forming a part of the inner surface (right side face of second concave part 61 in FIG. 24). Third optical surface 61a is formed parallel to left end face 4b.

As shown in FIG. 24, laser light $L_T$ from each light emitting element 7, having been incident on second optical surface 14b of concave part 14 and moved forth toward second lens surfaces 12 side, is perpendicularly incident on third optical surface 61a from the right in FIG. 24. As shown in FIG. 24, second concave part 61 has fourth optical surface 61b that is a part of the inner surface and forms a portion opposite to third optical surface 61a at the left in FIG. 24 (left side face of second concave part 61 in FIG. 24). Fourth optical surface 61b is formed parallel to left end face 4b.

As shown in FIG. 24 laser light $L_T$ from each light emitting element 7, having been incident on third optical surface 61a and moved forth toward second lens surface 12 side, is perpendicularly incident on fourth optical surface 61b from the right in FIG. 24.

Furthermore, as shown in FIG. 24, second concave part 61 has second total reflection surface 61c, which is a part of the inner surface, that is, forms a center portion of the bottom surface of second concave part 61 in FIG. 24. Second total reflection surface 61c is formed into an inclining surface where the upper end is located to the left of the bottom end in FIG. 24. A portion that is at the bottom surface of second concave part 61 and other than second total reflection surface 61c is formed parallel to top face 4c of lens array body 4. Second total reflection surface 61c may be formed parallel to total reflection surface 4d described earlier.

Laser light $L_R$, having been incident on fifth lens surfaces 60 from second optical fibers 58, is incident on such second total reflection surface 61c from the left in FIG. 24 at an incident angle of at least the critical angle. Second total reflection surface 61c totally reflects laser light $L_R$, having been incident from second optical fibers 58, toward fourth lens surfaces 48 side (in the downward direction in FIG. 24).

This configuration allows laser light $L_R$, having been emitted from second optical fibers 58, to pass through fifth lens surface 60, second total reflection surface 61c and fourth lens surfaces 48 and be coupled to respective second light receiving elements 47. Accordingly, reception of optical signals can be effectively supported.

In particular, the configuration of this embodiment is optimal to be applied to the optical communication at 120 Gbps according to CXP standard (see September 2009, Annex A6, InfiniBand architecture specifications Vol. 2 Release 1.2.1) having recently been proposed.

In this embodiment, as described above, laser light $L_T$ is perpendicularly incident on both third optical surface 61a and fourth optical surface 61b. This does not cause second concave part 61 to refract laser light $L_T$ to change the traveling direction; second concave part 61 is an effective element to form second total reflection surface 61c into a shape capable of securing demoldability without increase in the number of components. Accordingly, optical signals can securely be transmitted as well as be received.

Furthermore, as shown in FIG. 27, in this embodiment, fitting holes 24 for positioning optoelectric converting device 3 are formed on bottom face 4a of lens array 4, as with the configuration shown in FIG. 11. However, in this embodiment, fitting holes 24 are different from those in FIG. 11 in that fitting holes 24 are formed such that a pair of fitting holes 24 are disposed across counter-bore part 23. However, in this embodiment, the means for positioning optoelectric converting device 3 and optical fibers 5 and 58 are not limited to that shown in the diagram.

Furthermore, as shown in FIG. 24, in lens array body 4, third concave part 63 that has a trapezoidal shape in a sectional view and includes total reflection surface 4d as a part of the inner surface is formed. Third concave part 63 has a function of storing filler 18 if filler 18 is spilled out of flange 36 during installation of filler 18 on flange 36 of prism 16. Accordingly, in this embodiment, advancement of spilling of filler 18 can be suppressed.

As shown in FIGS. 25 and 27, mark 65 for positioning optoelectric converting device 3 may be formed on bottom face 4a of lens array body 4 (bottom surface 23a of counter-bore part 23), and optical means may be utilized to position optoelectric converting device 3.

In terms of facilitating design, optical axis OA(5) of fifth lens surface 60 is preferably perpendicular to left end face 4*b*.

Furthermore, as one variation of this embodiment, the configurations of concave part 14, prism 16, reflecting/transmitting layer 17 and filler 18 may be replaced with the configuration of Embodiment 4 shown in FIG. 19, or any one of Embodiments 1 to 3, 5 and 6. Even in such a case, the configuration specific to this embodiment for also supporting reception of optical signals is not degraded.

Figure 28:
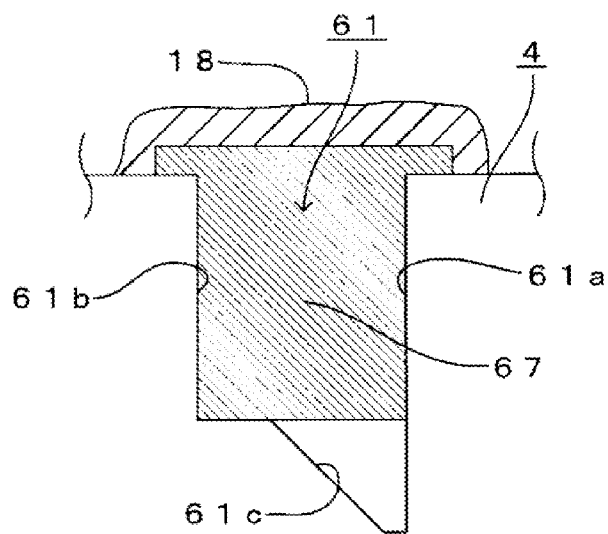
FIG. 28 is a configurational diagram schematically showing a variation of Embodiment 8.

Furthermore, as another variation in this embodiment, as shown in FIG. 28, second prism 67 formed so as to have the same refractive index as that of lens array body 4 may be arranged between third optical surface 61*a* and fourth optical surface 61*b* in a space formed by second concave part 61. Note that second prism 67 is formed into a shape that does not reach second total reflection surface 61*c*. Thus, the number of components is increased in comparison with the configuration shown in FIG. 24. However, this configuration can effectively suppress Fresnel reflection on third optical surface 61*a* and fourth optical surface 61*b*.

The present invention is not limited to the aforementioned embodiments, and can be modified variously in such an extent that the characteristics of the present invention is not degraded.

Figure 29:
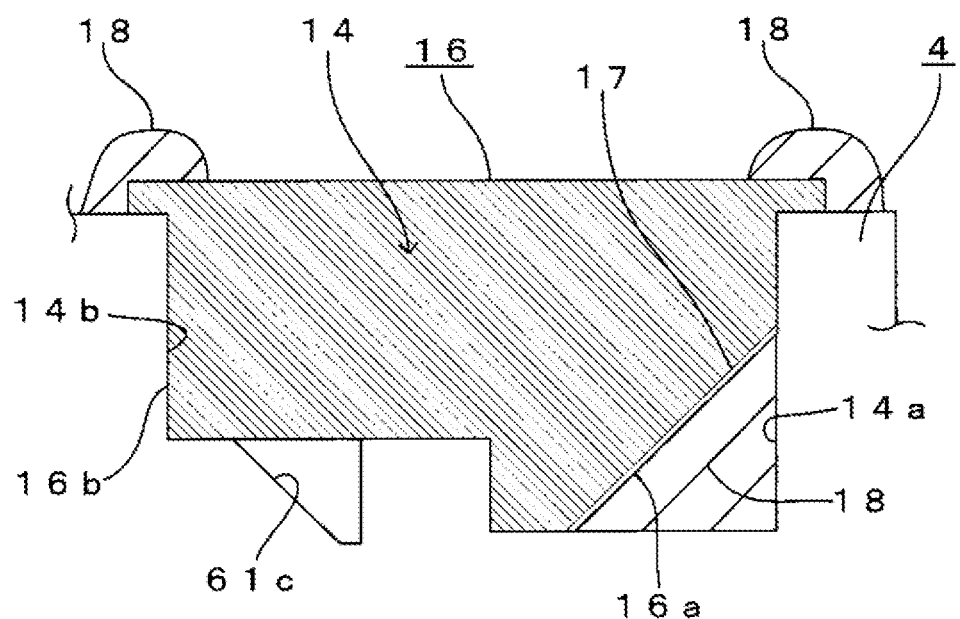
FIG. 29 is a configurational diagram schematically showing another mode of the lens array.

For instance, as shown in FIG. 29, second total reflection surface 61*c* for supporting reception of optical signals that has been described in Embodiment 8 may be formed in concave part 14 as a part of the inner surface of concave part 14 without provided in second concave part 61.

Lens array body 4 may be formed using light-transmitting material (e.g. glass) other than resin material.

Furthermore, the present invention is effectively applicable also to an optical transmission member other than optical fiber 5, such as an optical waveguide.

Embodiment 9

Embodiment 9 of a lens array and an optical module provided therewith according to the present invention will now be described with reference to FIGS. 30 to 35. In FIGS. 30 to 35, components having the same configuration as those of FIGS. 1 to 29 are assigned with the same reference signs.

Figure 30:
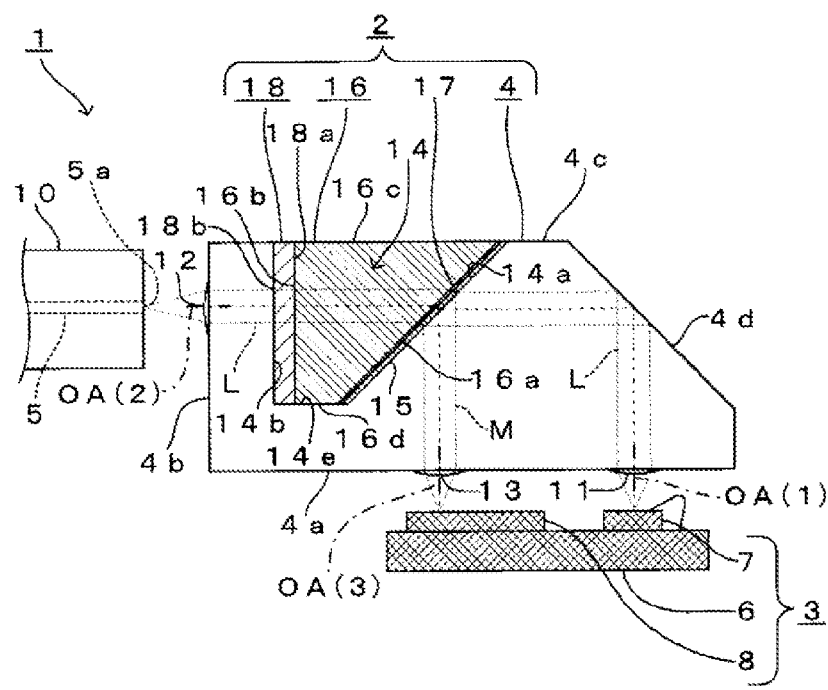
FIG. 30 is a configurational diagram schematically showing an overview of an optical module together with a longitudinal sectional view of a lens array in Embodiment 9 of the lens array and the optical module provided therewith according to the present invention.
Figure 31:
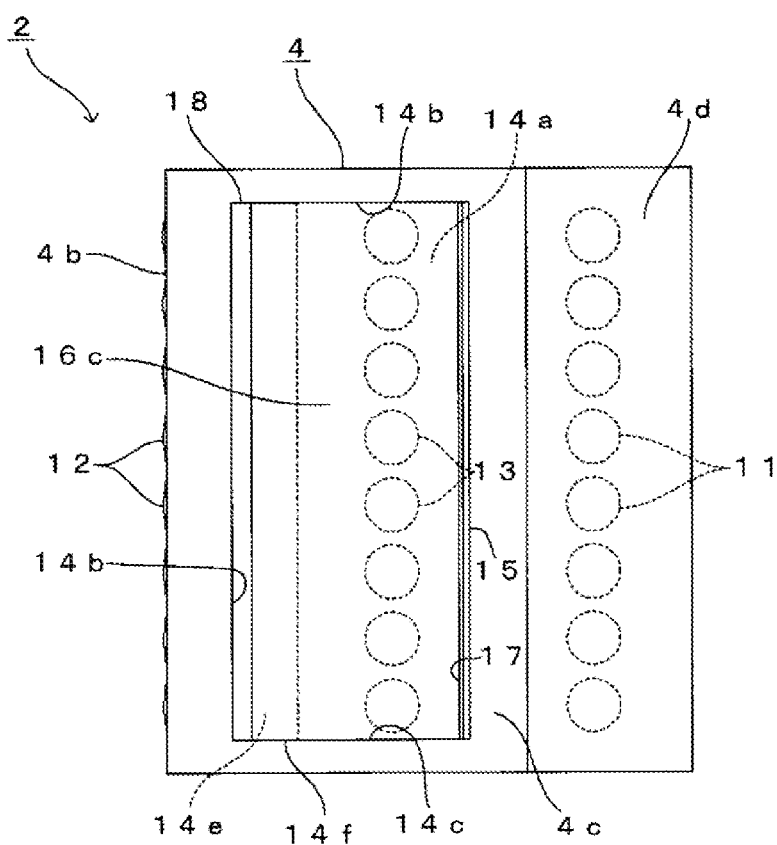
FIG. 31 is a plan view of the lens array shown in FIG. 30.
Figure 32:
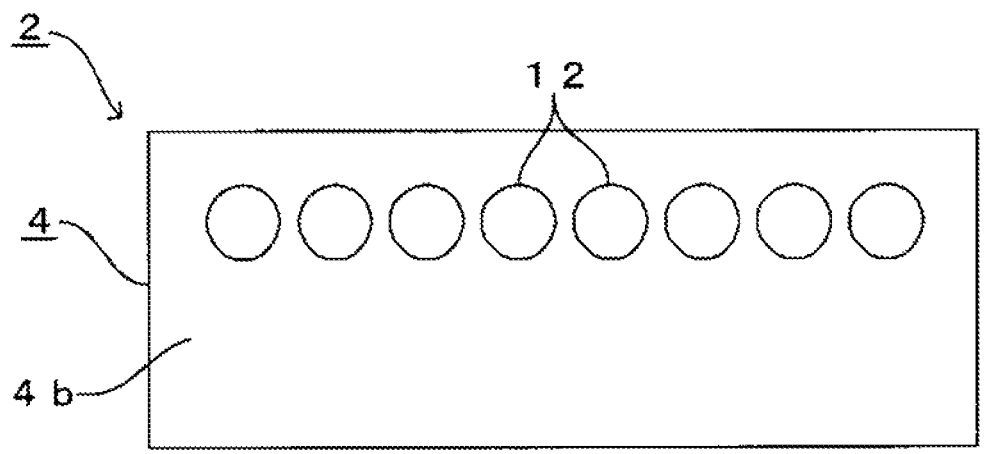
FIG. 32 is a left side view of the lens array shown in FIG. 30.
Figure 33:
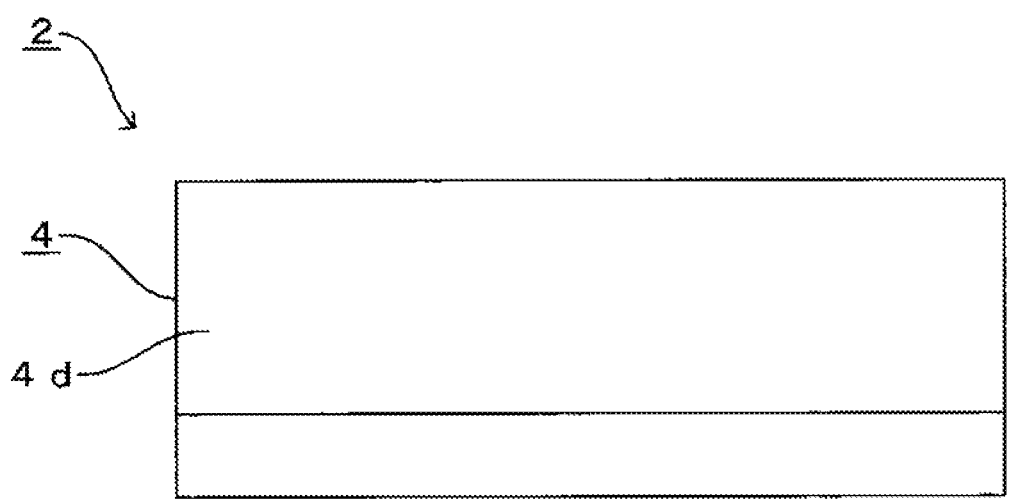
FIG. 33 is a right side view of the lens array shown in FIG. 30.
Figure 34:
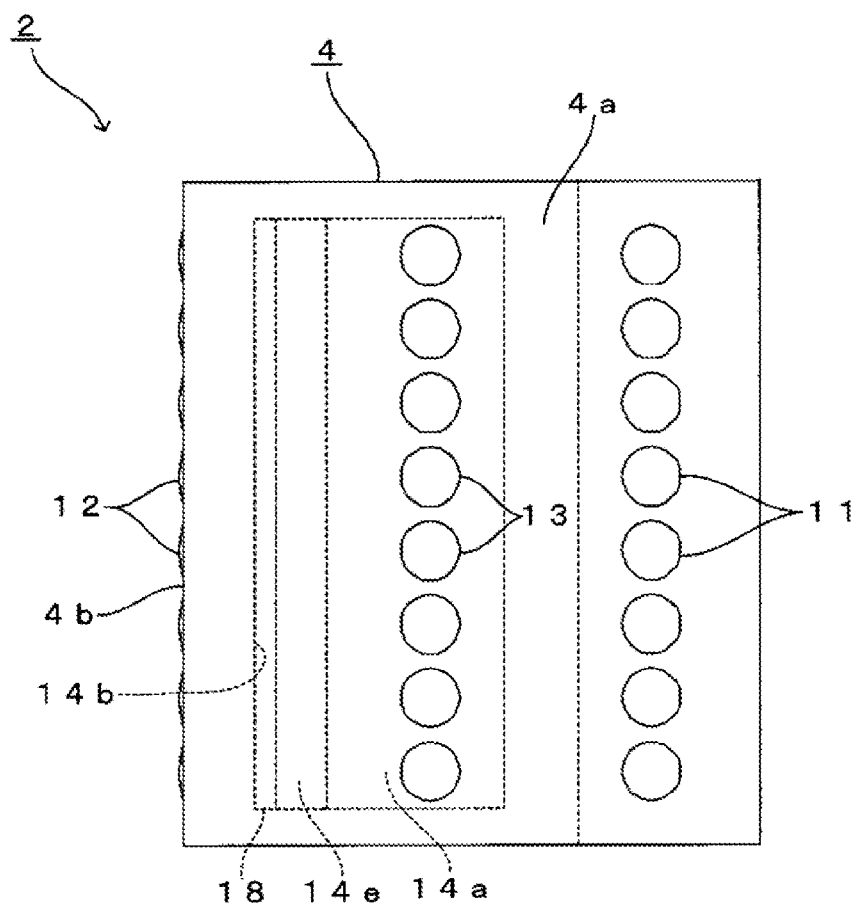
FIG. 34 is a bottom view of the lens array shown in FIG. 30.

FIG. 30 is a configurational diagram schematically showing an overview of optical module 1 in this embodiment together with a longitudinal sectional view of lens array 2 in this embodiment. FIG. 31 is a plan view of lens array 2 shown in FIG. 30. FIG. 32 is a left side view of lens array 2 shown in FIG. 30. FIG. 33 is a right side view of lens array 2 shown in FIG. 30. FIG. 34 is a bottom view of lens array 2 shown in FIG. 30.

As shown in FIG. 30, lens array 2 in this embodiment is disposed between optoelectric converting device 3 and optical fiber 5.

Here, optoelectric converting device 3 includes the plurality of light emitting elements 7 that emit laser light L toward a surface of semiconductor substrate 6 facing lens array 2 in the direction perpendicular to this surface (upper direction in FIG. 30). Light emitting elements 7 constitute a vertical cavity surface emitting laser (VCSEL). In FIG. 30, light emitting elements 7 are formed to align along the direction perpendicular to the sheet of FIG. 30. Furthermore, optoelectric converting device 3 includes the plurality of light receiving elements 8 that are for receiving monitor light M to monitor an output of laser light L (e.g. intensity and amount of light) emitted from respective light emitting elements 7 and are equal in number to light emitting elements 7, at left adjacent positions of FIG. 30 to the respective light emitting elements 7, on a surface of semiconductor substrate 6 facing lens array 2. Light receiving elements 8 are arranged in line in the same direction as the direction of light emitting elements 7. The positions of light emitting elements 7 and light receiving elements 8, which correspond to each other, in the alignment direction match with each other. That is, light receiving elements 8 are arranged at the same pitch as light emitting elements 7. Light receiving elements 8 may be photo-detectors. Furthermore, although not shown, optoelectric converting device 3 is connected with a control circuit that controls an output of laser light L emitted from light emitting elements 7 on the basis of the intensity or amount of monitor light M received by light receiving elements 8. For instance, such optoelectric converting device 3 is disposed opposite to lens array 2 such that a contact part (not shown) with lens array 2 is in contact with lens array 2. Optoelectric converting device 3 is attached to lens array 2 by publicly known fixation means.

Optical fibers 5 in this embodiment are provided equal in number to light emitting elements 7 and light receiving elements 8. Optical fibers 5 are arranged in line along the direction perpendicular to the sheet of FIG. 30. Optical fibers 5 are arranged in line at the same pitch as light emitting elements 7. Each optical fiber 5 is attached to lens array 2 by publicly known fixation means in the state where a part of the fiber on a side of end face 5*a* is held in bulk multicore connector 10.

Lens array 2 optically couples light emitting elements 7 and end faces 5*a* of respective optical fibers 5 to each other in the state where lens array 2 is disposed between optoelectric converting device 3 and optical fibers 5.

Lens array 2 is further described; as shown in FIG. 30, lens array 2 includes lens array body 4. Lens array body 4 is formed to have a substantially trapezoidal external shape in a longitudinal sectional view, a substantially rectangular shape in a plan view as shown in FIG. 31, and a rectangular shape in a side view as shown in FIGS. 32 and 33.

As shown in FIGS. 30 and 34, lens array 2 has a plurality of (eight) first lens surfaces (convex lens surfaces) 11 that are plano-convex and equal in number to light emitting elements 7, on bottom face 4*a* (plane) as a first surface of lens array body 4 in FIG. 34 facing optoelectric converting device 3. The plurality of first lens surfaces 11 are formed to align in the predetermined alignment direction (direction perpendicular to the sheet of FIG. 30, longitudinal direction in FIG. 34) corresponding to light emitting elements 7. First lens surfaces 11 are arranged at the same pitch as light emitting elements 7. Furthermore, as shown in FIG. 30, optical axis OA(1) on each first lens surface 11 coincides with the central axis of laser light L emitted from light emitting element 7 corresponding to first lens surface 11.

As shown in FIG. 30, laser light L emitted from each light emitting element 7 corresponding to first lens surface 11 is incident on first lens surface 11. Each first lens surface 11 collimates incident laser light L emitted from light emitting element 7, and causes the collimated light to move forth into lens array body 4.

As shown in FIGS. 30 and 32, lens array 2 has the plurality of second lens surfaces (convex lens surfaces) 12 equal in number to first lens surfaces 11, on left end face 4*b* (plane) in FIG. 30 as a second surface of lens array body 4 facing end faces 5*a* of optical fibers 5. The plurality of second lens surfaces 12 are formed to align in the same direction as the alignment direction of first lens surfaces 11. Second lens surfaces 12 are arranged at the same pitch as first lens surfaces 11. Optical axis OA(2) on each second lens surface 12 is preferably disposed on the same axis as the central axis of end face 5a of optical fiber 5 corresponding to second lens surface 12.

As shown in FIG. 30, laser light L from each light emitting element 7, having been incident on first lens surface 11 corresponding to second lens surface 12 and moved forth through the optical path in lens array body 4, is incident on second lens surface 12 in the state where the central axis of the laser light coincides with optical axis OA(2) on second lens surface 12. Each second lens surface 12 emits incident laser light L from light emitting element 7 toward end face 5a of optical fiber 5 corresponding to second lens surface 12.

Thus, light emitting elements 7 and respective end faces 5a of optical fibers 5 are optically coupled to each other via first lens surfaces 11 and second lens surfaces 12.

Furthermore, as shown in FIGS. 30 and 34, third lens surfaces 13 equal in number to light receiving elements 8 (also equal in number to light emitting elements 7, optical fibers 5, first lens surfaces 11 and second lens surfaces 12 in this embodiment) are formed at left adjacent positions of FIG. 30 to first lens surfaces 11, on bottom face 4a of lens array body 4. Third lens surfaces 13 are formed to align in the predetermined alignment direction corresponding to light receiving elements 8, that is, the same direction as the alignment direction of first lens surfaces 11. Third lens surfaces 13 are arranged at the same pitch as light receiving elements 8. Optical axis OA(3) on each third lens surface 13 preferably coincides with the central axis of light receiving surface of light receiving element 8 corresponding to third lens surface 13.

As shown in FIG. 30, monitor light M from each light emitting element 7 corresponding to third lens surface 13 is incident on third lens surface 13 from the inside of lens array body 4. Each third lens surface 13 emits incident monitor light M from light emitting element 7 toward light receiving element 8 corresponding to third lens surface 13.

Furthermore, as shown in FIGS. 30 and 33, lens array body 4 includes total reflection surface 4d at the right upper end in FIG. 30. Total reflection surface 4d is formed into an inclining surface where the upper end is located left to the bottom end in FIG. 30 (i.e. on a side of after-mentioned concave part 14). Total reflection surface 4d lies in the optical path of laser light L from each light emitting element 7, between first lens surface 11 and after-mentioned first optical surface 14a of concave part 14.

As shown in FIG. 30, laser light L from each light emitting element 7, having been incident on first lens surface 11, is incident on such total reflection surface 4d from the bottom in FIG. 30 at an incident angle of at least the critical angle. Total reflection surface 4d totally reflects incident laser light L from each light emitting element 7 toward the left in FIG. 30.

Note that a reflection film made of Au, Ag, Al or the like may be coated onto total reflection surface 4d.

As shown in FIGS. 30 and 31, concave part 14 is formed in a reentrant manner so that the optical paths connecting first lens surfaces 11 and second lens surfaces 12 pass through therein, on top face 4c (plane) of lens array body 4 in FIG. 30 as a third surface. Top face 4c is formed parallel to bottom face 4a.

Here, as shown in FIG. 30, concave part 14 has first optical surface 14a forming a part of the inner surface (right side face of concave part 14 in FIG. 30). First optical surface 14a is formed into an inclining surface having a predetermined inclining angle to left end face 4b where the upper end is located right to the bottom end in FIG. 30 (i.e. on a side of total reflection surface 4d).

As shown in FIG. 30, laser light L from each light emitting element 7, having been totally reflected by total reflection surface 4d, is incident on such first optical surface 14a at a predetermined incident angle. However, the incident direction of laser light L from each light emitting element 7 onto first optical surface 14a is perpendicular to left end face 4b.

As shown in FIG. 30, concave part 14 has second optical surface 14b, which is a part of the inner surface and opposite to first optical surface 14a at the left in FIG. 30 (left side face of concave part 14 in FIG. 30). Second optical surface 14b is formed parallel to left end face 4b.

As shown in FIG. 30, laser light L from each light emitting element 7, having been incident on first optical surface 14a and subsequently moved forth toward second lens surface 12 side, is incident on such second optical surface 14b perpendicularly to second optical surface 14b. Second optical surface 14b allows incident laser light L from each light emitting element 7 to pass perpendicularly to the surface.

Furthermore, as shown in FIG. 30, prism 16 having a trapezoidal longitudinal section is disposed in a space formed by concave part 14. Prism 16 is formed to have the same refractive index as that of lens array body 4. Prism 16 may be made of the same material as that of lens array body 4 (e.g. resin material, such as polyetherimide). For instance, in the case where lens array body 4 and prism 16 are made of Ultem made by SABIC as a polyetherimide, the refractive indices of lens array body 4 and prism 16 are 1.64 for light with a wavelength of 850 nm.

Besides that, in the case of forming lens array body 4 and prism 16 using ARTON made by JSR as an annular olefin resin, the refractive index for light with a wavelength of 850 nm is 1.50.

Here, as shown in FIG. 30, prism 16 has first prism surface 16a forming a part of the surface thereof (right side face of prism 16 in FIG. 30). First prism surface 16a is disposed parallel to first optical surface 14a at a position facing first optical surface 14a at a predetermined interval from first optical surface 14a in the left direction in FIG. 30.

Furthermore, as shown in FIG. 30, prism 16 has second prism surface 16b forming a part of the surface thereof (left side face of prism 16 in FIG. 30). Second prism surface 16b is disposed parallel to second optical surface 14b at a position facing second optical surface 14b at a predetermined interval from second optical surface 14b in the right direction in FIG. 30.

Prism 16 forms the optical path of laser light L from each light emitting element 7, having been incident on first optical surface 14a and subsequently moved forth toward second lens surface 12 side.

Furthermore, as shown in FIG. 30, thin reflecting/transmitting layer 17 having a uniform thickness is disposed on first prism surface 16a. The surface of reflecting/transmitting layer 17 on the side of first prism surface 16a is in closely contact with first prism surface 16a.

Moreover, as shown in FIG. 30, light-transmitting adhesive sheet 15, which has a uniform thickness and a predetermined refractive index, is arranged between reflecting/transmitting layer 17 and first optical surface 14a. The surface of adhesive sheet 15 on the side of reflecting/transmitting layer 17 is in closely contact with reflecting/transmitting layer 17. The surface of adhesive sheet 15 on the side of first optical surface 14a is in closely contact with first optical surface 14a. Prism 16 is bonded by adhesive sheet 15 to lens array body 4 (more specifically, first optical surface 14a) via reflecting/transmitting layer 17. For instance, adhesive thin (e.g. 20 μm) refractive index matching film, such as Fitwell manufactured by Tomoegawa, can be used as adhesive sheet 15.

Here, as shown in FIG. 30, laser light L from each light emitting element 7, having been incident on first optical surface 14a, passes through adhesive sheet 15 and subsequently is incident on reflecting/transmitting layer 17. Reflecting/transmitting layer 17 reflects incident laser light L from each light emitting element 7 toward third lens surface 13 side at a predetermined reflectance, and allows the light to pass through toward prism 16 side at a predetermined transmittance.

Here, as shown in FIG. 30, reflecting/transmitting layer 17 reflects a part of laser light L from each light emitting element 7 (light of the amount of reflectance), having been incident on reflecting/transmitting layer 17, as monitor light M from each light emitting element 7 that corresponds to each light emitting element 7, toward third lens surface 13 side corresponding to monitor light M.

Monitor light M from each light emitting element 7 thus reflected by reflecting/transmitting layer 17 moves forth in lens array body 4 toward third lens surface 13 side and is subsequently emitted from third lens surface 13 toward corresponding light receiving element 8.

Here, for instance, in the case of coating first prism surface 16a with a single layer film of Cr using a publicly known coating technique to form reflecting/transmitting layer 17, reflectance of reflecting/transmitting layer 17 can be 30% and transmittance can be 30% (absorptance of 40%). Reflecting/transmitting layer 17 may be formed using a single metal single layer film of Ni, Al or the like, which is other than Cr. In the case of coating first prism surface 16a with a publicly known dielectric multilayer film of $TiO_2$, $SiO_2$ or the like using a publicly known coating technique to form reflecting/transmitting layer 17, for instance, reflectance of reflecting/transmitting layer 17 can be 20% and transmittance can be 80%. Instead, reflectance and transmittance of reflecting/transmitting layer 17 can be set to desired values in accordance with the material, thickness and the like of reflecting/transmitting layer 17 within a limit where an amount of monitor light M that is considered sufficient for monitoring the output of laser light L can be acquired. Reflecting/transmitting layer 17 can be coated using a coating technique, such as Inconel deposition. Furthermore, for instance, reflecting/transmitting layer 17 may be made of a glass filter.

On the other hand, laser light L from each light emitting element 7, having passed through reflecting/transmitting layer 17, is incident on first prism surface 16a immediate after the transmission. Laser light L from each light emitting element 7, having been incident on first prism surface 16a, moves forth through the optical path in prism 16 toward second lens surface 12 side.

At this time, prism 16 is formed to have the same refractive index as that of lens array body 4, thereby allowing the optical path of laser light L from each light emitting element 7 in prism 16 to be maintained parallel to the optical path of laser light L connecting total reflection surface 4d and first optical surface 14a.

This will be described in detail. Provided that first optical surface 14a, the interface between adhesive sheet 15 and reflecting/transmitting layer 17, and first prism surface 16a are parallel to each other, following Equations 1 and 2 hold.

(Snell's Law at First Optical Surface)

$$n_1 \sin\theta_1 = n_2 \sin\theta_2 \quad \text{(Equation 1)}$$

(Snell's Law at First Prism Surface)

$$n_2 \sin\theta_2 = n_1 \sin\theta_3 \quad \text{(Equation 2)}$$

Note that, in Equations 1 and 2, $n_1$ represents the refractive index of lens array body 4 and prism 16, and $n_2$ represents refractive index of adhesive sheet 15. These $n_1$ and $n_2$ are acquired with reference to light having the same wavelength. $\theta_1$ in Equation 1 represents the incident angle of laser light L from each light emitting element 7 onto first optical surface 14a. $\theta_2$ in Equations 1 and 2 represents the emission angle from first optical surface 14a concerning laser light L from each light emitting element 7, and the incident angle of laser light L from each light emitting element 7 onto first prism surface 16a, respectively. Note that, the refraction of laser light L at reflecting/transmitting layer 17 is neglected here, because the thickness of reflecting/transmitting layer 17 (measurement in the optical path direction) is significantly thin in comparison with lens array body 4, adhesive sheet 15 and prism 16. $\theta_3$ in Equation 2 represents the emission angle from first prism surface 16a concerning laser light L from each light emitting element 7. The plane normal direction of first optical surface 14a is adopted as the references (0°) of $\theta_1$ to $\theta_3$.

Because the right side of Equation 1 and the left side of Equation 2 are identical to each other, the following equation is derived.

$$n_1 \sin\theta_1 = n_1 \sin\theta_3 \quad \text{(Equation 3)}$$

According to Equation 3, $\theta_3 = \theta_1$. This represents that the optical path of laser light L from each light emitting element 7 in prism 16 is parallel to the optical path of laser light L connecting total reflection surface 4d and first optical surface 14a.

Thus, laser light L from each light emitting element 7, having moved forth through the optical path in prism 16, is perpendicularly incident on second prism surface 16b as shown in FIG. 30 and emitted from second lens surface 16b to the outside of prism 16 perpendicularly to second lens surface 16b, while parallelity to the optical path of laser light L connecting total reflection surface 4d and first optical surface 14a is maintained.

As shown in FIG. 30, lens array body 4 includes filler 18 that has a predetermined refractive index and is inserted between second optical surface 14b and second prism surface 16b. Here, as shown in FIG. 30, laser light L from each light emitting element 7, having been emitted from second prism surface 16b, is incident on surface (hereinafter, referred to as incident side surface) 18a of filler 18 on the side of second prism surface 16b perpendicularly to incident side surface 18a immediate after the emission. Laser light L from each light emitting element 7, having been incident on incident side surface 18a, moves forth through the optical path in filler 18 toward second lens surface 12 side. Further, laser light L from each light emitting element 7, having moved forth through the optical path in filler 18, is perpendicularly incident on surface (hereinafter, referred to as emitting side surface) 18b of filler 18 on the side of second optical surface 14b, and emitted from emitting side surface 18b to the outside of filler 18 perpendicularly to emitting side surface 18b.

Laser light L from each light emitting element 7, having thus perpendicularly emitted from filler 18, is perpendicularly incident on second optical surface 14b immediately after emission as described above. Laser light L from each light emitting element 7, having been incident on second optical surface 14b, moves forth through the optical path in lens array body 4 after second optical surface 14b toward each second lens surface 12 side and is subsequently emitted by second lens surface 12 toward end face 5a of corresponding optical fiber 5.

The aforementioned configuration allows reflecting/transmitting layer 17 between adhesive sheet 15 and first prism surface 16a to split laser light L from each light emitting element 7, having been incident on first lens surface 11, toward second lens surface 12 side and third lens surface 13 side. Monitor light M split toward third lens surface 13 side can be emitted by each third lens surface 13 toward light receiving element 8 side. As a result, monitor light M can be securely acquired. Adoption of reflecting/transmitting layer 17 capable of being easily formed to have a certain extent of area, as a configuration of acquiring such monitor light M, facilitates manufacturing of lens array 2.

According to this embodiment, prism 16 is formed to have the same refractive index as that of lens array body 4, thereby allowing the optical path of laser light L from each light emitting element 7 in prism 16 to be maintained perpendicular to left end face 4b. Furthermore, laser light L from each light emitting element 7, having thus moved forth through the optical path in prism 16, can sequentially be incident perpendicularly to second prism surface 16b and second optical surface 14b. This allows the optical path of laser light L from each light emitting element 7 in lens array body 4 to be parallel to each other between an incident side onto first optical surface 14a (between total reflection surface 4d and first optical surface 14a in FIG. 30) and an emitting side from second optical surface 14b. As a result, for instance, in the case of product inspection, this can reduce the number of spots required to be adjusted in measurements (modification of a mold shape etc.) for canceling a deviation from the center of each second lens surface 12 concerning laser light L, which has been from each light emitting element 7 and incident on each second lens surface 12, if such a deviation is confirmed. More specifically, in the case of a configuration incapable of securing parallelity between the optical path on the incident side onto first optical surface 14a and the optical path on the emitting side from second optical surface 14b, the measurements of optical surfaces 14a and 14b of concave part 14 and prism surfaces 16a and 16b of prism 16 (including the inclining angle) are sometimes required to be adjusted within a permissible limit for correcting the axial deviation of incident light on second lens surface 12.

In contrast, according to this embodiment, if accuracy in measuring is secured such that the total reflection direction at total reflection surface 4d is perpendicular to left end face 4b and further second optical surface 14b and second prism surface 16b are parallel to left end face 4b, complicated measurement adjustment to reset optimal inclining angles relative to respective surfaces 14a, 14b, 16a and 16b is not required. This can contribute to further facilitation of manufacturing lens array 2.

Furthermore, according to this embodiment, second optical surface 14b is formed parallel to left end face 4b, thereby allowing design of second optical surface 14b and determination of accuracy in measuring thereof to be simplified.

Moreover, according to this embodiment, filler 18 is inserted between second optical surface 14b and second prism surface 16b. Accordingly, in this embodiment, even if a scratch is formed on second optical surface 14b, reflection or scattering of laser light L on second optical surface 14b caused by the scratch can be suppressed. The effect of suppressing reflected/scattered light owing to filler 18 is based on the same principle as a principle that drops of water applied onto a surface of frosted glass cover irregularities thereat and the frosted glass becomes transparent. Here, reflection and scattering of laser light L cause occurrence of stray light or reduction in coupling efficiency of laser light L with fiber end 5a. Accordingly, suppression of reflection and scattering of laser light L is significantly important in terms of securing optical performance. In particular, such an effect of suppressing reflected/scattered light is effective in the case where lens array body 4 is integrally molded by injection molding of resin material (polyetherimide, etc.) using a mold. More specifically, in the case of forming lens array body 4 by injection molding, a molded piece having a shape transferred from concave part 14 is demolded. According to this embodiment, as described above, in terms of simplifying design and determination of accuracy in measuring, second optical surface 14b is formed parallel to left end face 4b (i.e. perpendicular to top face 4c). In demolding, the piece is demolded by relatively moving in the upper direction in FIG. 30 such that the mold slides in the direction of the surface of second optical surface 14b. In this case, second optical surface 14b is susceptible to damage. Accordingly, with the configuration of second optical surface 14b having high frequency of occurrence of a scratch, it is significantly important to provide filler 18 that avoids malfunction on optical performance due to the scratch. As a result, according to this embodiment, manufacturing and handling (e.g. determination of accuracy in measuring) are facilitated by forming second optical surface 14b parallel to left end face 4b, as well as occurrence of stray light and reduction in coupling efficiency is suppressed (i.e. optical performance is secured) by suppressing reflected/scattered light on second optical surface 14b.

Furthermore, as described above, coating of first prism surface 16a with the single metal single layer film or the dielectric multilayer film to form reflecting/transmitting layer 17 allows the configuration of reflecting/transmitting layer 17 to be simplified, thereby enabling further facilitation of manufacturing to be realized. Moreover, the coating allows reflecting/transmitting layer 17 to be formed significantly thinly (e.g. 1 μm or less). Accordingly, a lateral deviation of laser light L (shift amount in the longitudinal direction in FIG. 30) caused by the refraction on transmission of laser light L from each light emitting element 7 through reflecting/transmitting layer 17 can be reduced to a negligible level. This allows the optical path on the incident side onto first optical surface 14a and the optical path on the emitting side from second optical surface 14b to be brought closely to the same line. Accordingly, the position of second lens surface 12 can be simply determined when being designed, thereby contributing to further facilitation of manufacturing.

Furthermore, preferably, adhesive sheet 15 is configured such that difference of refractive indices with lens array body 4 is 0.35 or less (more preferably, 0). This configuration can suppress the refraction when laser light L from each light emitting element 7 passes through adhesive sheet 15. Accordingly, the lateral deviation of laser light L when laser light L passes through adhesive sheet 15 can be suppressed. It is a matter of course that if the difference of refractive index is 0, the refraction is not caused at all. This enables optical path on the incident side onto first optical surface 14a and the optical path on the emitting side from second optical surface 14b to be aligned on the substantially same line. Accordingly, the position of second lens surface 12 can be simply determined when being designed, thereby contributing to further facilitation of manufacturing.

Furthermore, light-transmitting adhesive may be adopted as filler 18, and prism 16 may be bonded to lens array body 4 with filler 18. This allows prism 16 and lens array body 4 to be fixed to each other more firmly in comparison with the case of adhesion only with adhesive sheet 15, thereby mechanical strength, such as impact resistance, to be improved. Filler 18 may also function as adhesive for bonding prism 16 to lens array body 4. As a result, the cost can be reduced. For instance, thermoset resin or ultraviolet-set resin may be adopted as such filler 18 that also functions as light-transmitting adhesive.

Moreover, preferably, the difference of refractive indices between filler 18 and lens array body 4 is a predetermined value of 0.35 or less (more preferably, 0). According to this configuration, Fresnel reflection at the interface between second prism surface 16b and filler 18 and Fresnel reflection at the interface between filler 18 and second optical surface 14b can be suppressed, thereby occurrence of stray light and reduction in coupling efficiency to be suppressed more securely. In the case of forming lens array body 4 using the aforementioned Ultem made by SABIC, for instance LPC1101 made by Mitsubishi Gas Chemical Company can be used as filler 18. As to this product, the refractive index of light with wavelength of 850 nm, which is calculated on the basis of the refractive index and Abbe number for d line and disclosed by the manufacturer, is 1.66. In this case, the difference of refractive indices between filler 18 and lens array body 4 is 0.02 (reference of λ=850 nm). Besides that, in the case of forming lens array body 4 using the aforementioned ARTON made by JSR, suitable filler 18 may be A1754B made by TECS, which is UV-curable resin. The refractive index of this product for light with a wavelength of 850 nm is 1.50. In this case, the difference of refractive indices between lens array body 4 and filler 18 is 0.

Furthermore, preferably, the inclining angle of total reflection surface 4d is within a range from 40° to 50° (more preferably, 45°) in the clockwise direction in FIG. 30 with reference to bottom face 4a(0°); the inclining angle of first optical surface 14a is within a range from 40° to 50° (more preferably, 45°) in the counterclockwise direction in FIG. 30 with reference to bottom face 4a(0°). This configuration allows a reasonable design for totally reflecting incident laser light L from each light emitting element 7 on total reflection surface 4d toward concave part 14 side and for splitting laser light L incident on first optical surface 14a toward second lens surface 12 side and third lens surface 13 side. In particular, in the case where the inclining angles of total reflection surface 4d and first optical surface 14a are 45°, the design of surfaces 4d and 14a and determination of accuracy in measuring thereof are more simplified.

Furthermore, bottom face 4a and left end face 4b may be formed perpendicular to each other. Optical axis OA(1) on first lens surface 11 and optical axis OA(3) on third lens surface 13 may be formed perpendicular to bottom face 4a. Optical axis OA(2) on second lens surface 12 may be formed perpendicular to left end face 4b. This configuration can relax accuracy in measuring that is required for lens array 2 to secure the optical path connecting light emitting element 7 and light receiving element 8 and the optical path connecting light emitting element 7 and end face 5a of optical fiber 5, thereby allowing further facilitation of manufacturing to be realized. More specifically, for instance, in the case where optical axis OA(3) on third lens surface 13 is configured to be inclined at an acute angle to optical axis OA(1) on first lens surface 11, there is a possibility that a slight measurement error in the longitudinal direction in FIG. 30 prevents monitor light M, having been emitted from third lens surface 13, from being coupled to light receiving element 8. In contrast, as with this embodiment, optical axis OA(1) on first lens surface 11 and optical axis OA(3) on third lens surface 13 are parallel to each other. By this means, even if lens array 2 causes a slight measurement error in the longitudinal direction in FIG. 30, the beam diameter of monitor light M emitted from third lens surface 13 merely becomes larger or smaller with respect to a designed value, thus allowing the monitor light M to be appropriately received by each light receiving element 8. If optical axis OA(2) on second lens surface 12 has an angle other than the right angle to optical axis OA(1) on first lens surface 11, there is a possibility that a slight measurement error in the lateral direction in FIG. 30 prevents laser light L, having been emitted from second lens surface 12 from being coupled to the end face of optical fiber 5. In contrast, as with this embodiment, optical axis OA(1) on first lens surface 11 and optical axis OA(2) on second lens surface 12 are formed to be perpendicular to each other. Accordingly, even if lens array 2 causes a slight measurement error in the lateral direction in FIG. 30, the beam diameter of laser light L emitted from second lens surface 12 merely becomes slightly larger or smaller with respect to a designed value, thus allowing the laser light L to be appropriately coupled to the end face of optical fiber 5.

In addition to the configuration, in this embodiment, as shown in FIGS. 30 and 31, concave part 14 is formed into a shape accommodating bottom surface (bottom face in FIG. 30) 14e and all sides 14a to 14d within a range indicated by the external shape of opening 14f of concave part 14 in the case of being viewed in the plane normal direction of top face 4c (from the top in FIG. 30). In other words, concave part 14 is formed so as to accommodate projected surfaces of bottom surface 14e and all sides 14a to 14d in the plane normal direction of top face 4c within the range indicated by the external shape of opening 14f. As shown in FIG. 31, opening 14f is formed into a rectangular shape elongated in the longitudinal direction in FIG. 31 and encompassed therearound by top face 4c. Sides 14b to 14d other than first optical surface 14a are formed perpendicular to top face 4c. This configuration allows concave part 14 to be formed into a shape capable of securing demoldability from the mold. This can realize effective manufacturing of lens array 2 using the mold.

Third lens surfaces 13 and light receiving elements 8 corresponding thereto are not necessarily provided so as to be equal in number to light emitting elements 7. It is sufficient that at least one set is provided. In this case, at reflecting/transmitting layer 17, in laser light L from each light emitting element 7 incident on each first lens surface 11, only a part of laser light L to which third lens surfaces 13 correspond is reflected as monitor light M. The other part of laser light L is reflected but is not used as monitor light M.

Figure 35:
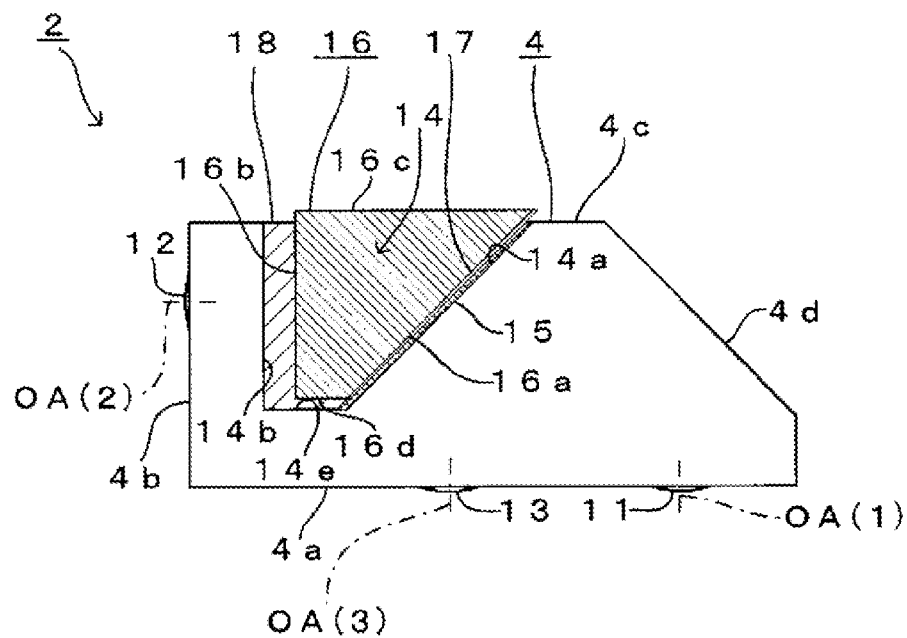
FIG. 35 is a configurational diagram schematically showing a variation of Embodiment 9.

In the configuration in FIG. 30, top face 16c of prism 16 is at the same plane as top face 4c of lens array 4, and bottom face 16d of prism 16 is in contact with bottom surface 14e of concave part 14. However, as shown in FIG. 35, even if prism 16 is bonded in the state where top face 16c of prism 16 protrudes upward from top face 4c of lens array 4, optical performance is not affected.

A counter-bore part having a bottom surface parallel to bottom face 4a may be provided with a dent in a portion on bottom face 4a facing optoelectric converting device 3. First lens surfaces 11 and third lens surfaces 13 may be formed on the bottom surface (to be a first surface) of the counter-bore part. In this case, optoelectric converting device 3 is fixed to lens array 2 in the state where semiconductor substrate 6 is in contact with the inner circumference of the counter-bore part at bottom face 4a.

Embodiment 10

Embodiment 10 of a lens array and an optical module provided therewith according to the present invention will now be described mainly on difference from Embodiment 9 with reference to FIGS. 36 to 41.

In this embodiment, elements having configurations identical or similar to those in FIGS. 30 to 35 will be described using the same reference signs.

Figure 36:
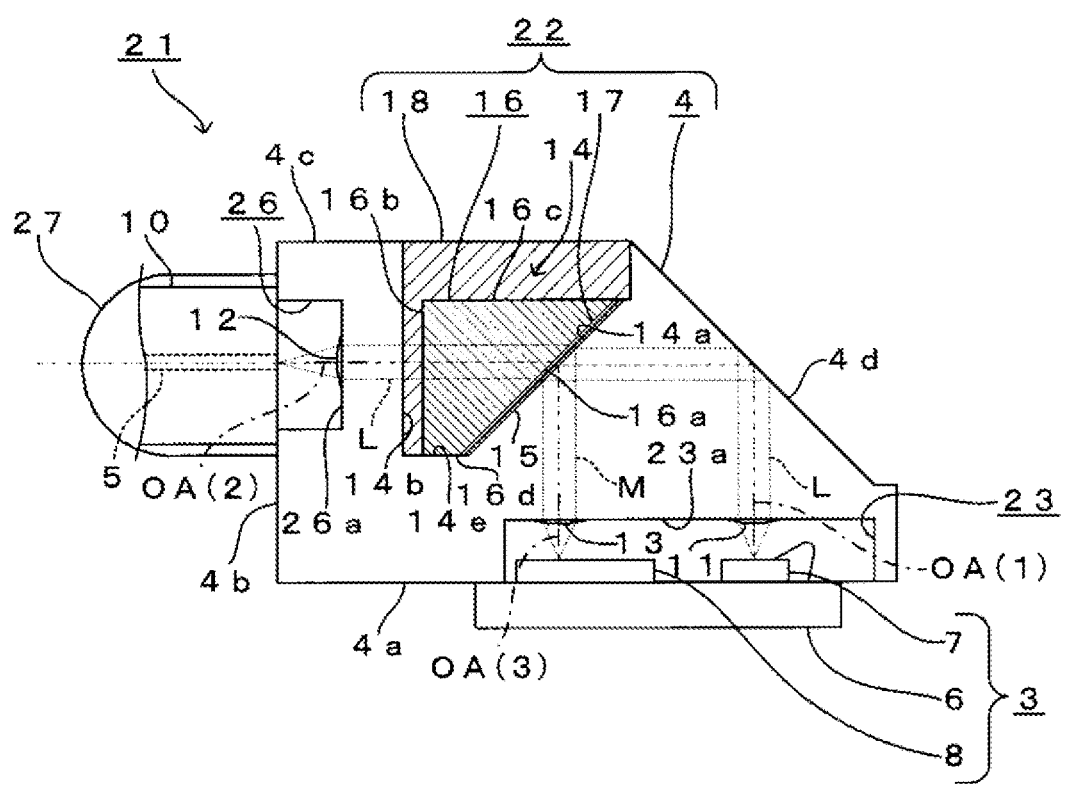
FIG. 36 is a configurational diagram schematically showing an overview of an optical module together with a longitudinal sectional view of a lens array in Embodiment 10 of the lens array and the optical module provided therewith according to the present invention.
Figure 37:
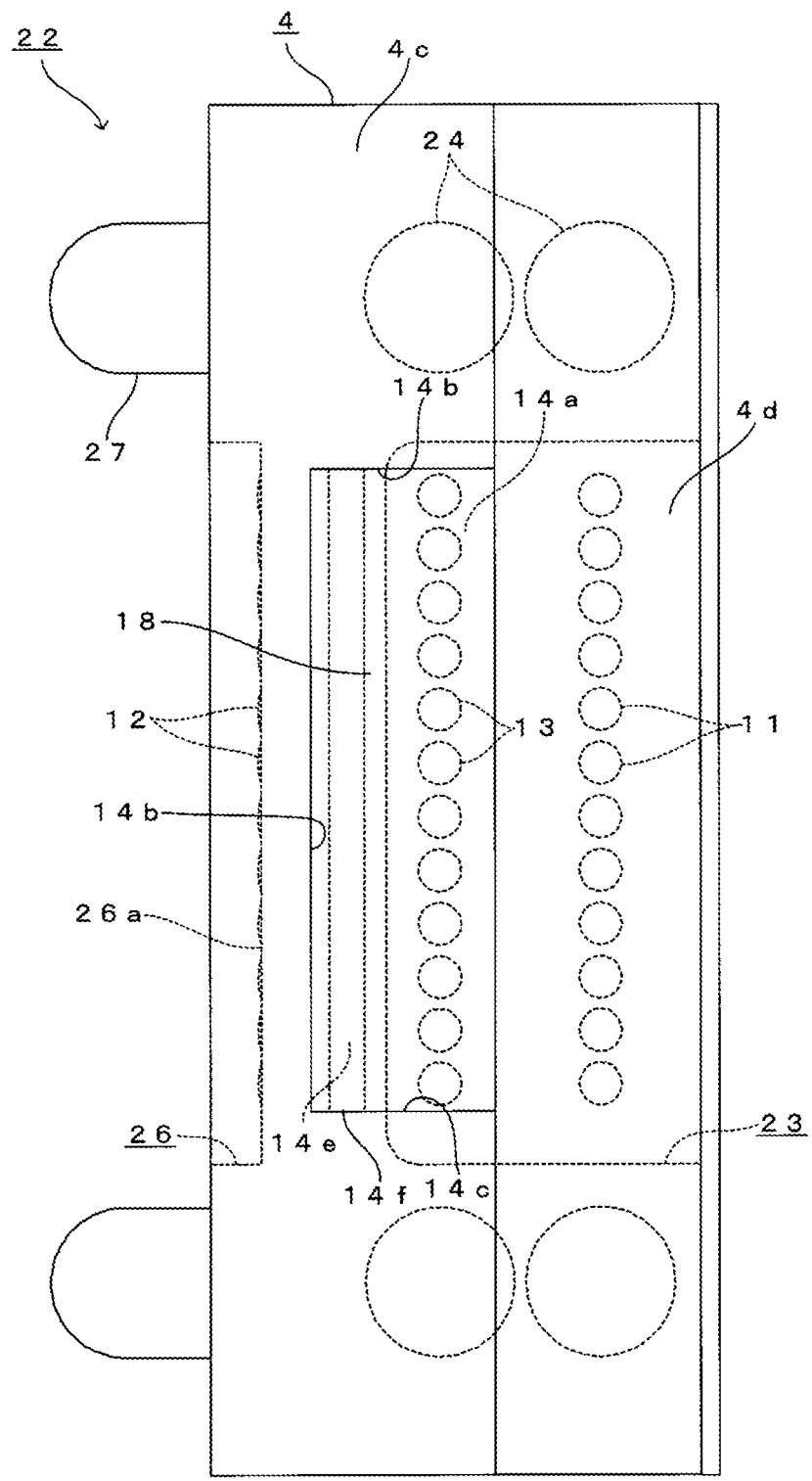
FIG. 37 is a plan view of the lens array shown in FIG. 36.
Figure 38:
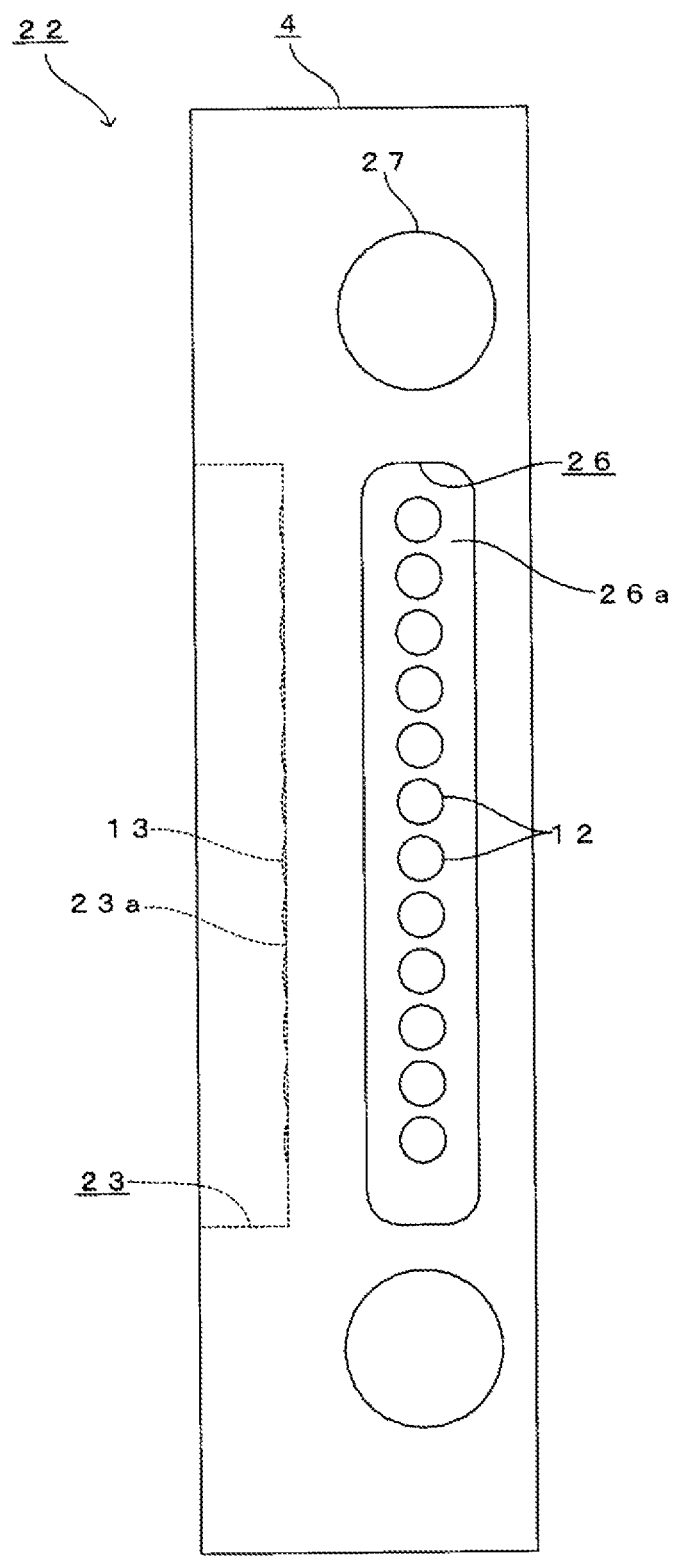
FIG. 38 is a left side view of FIG. 37.
Figure 39:
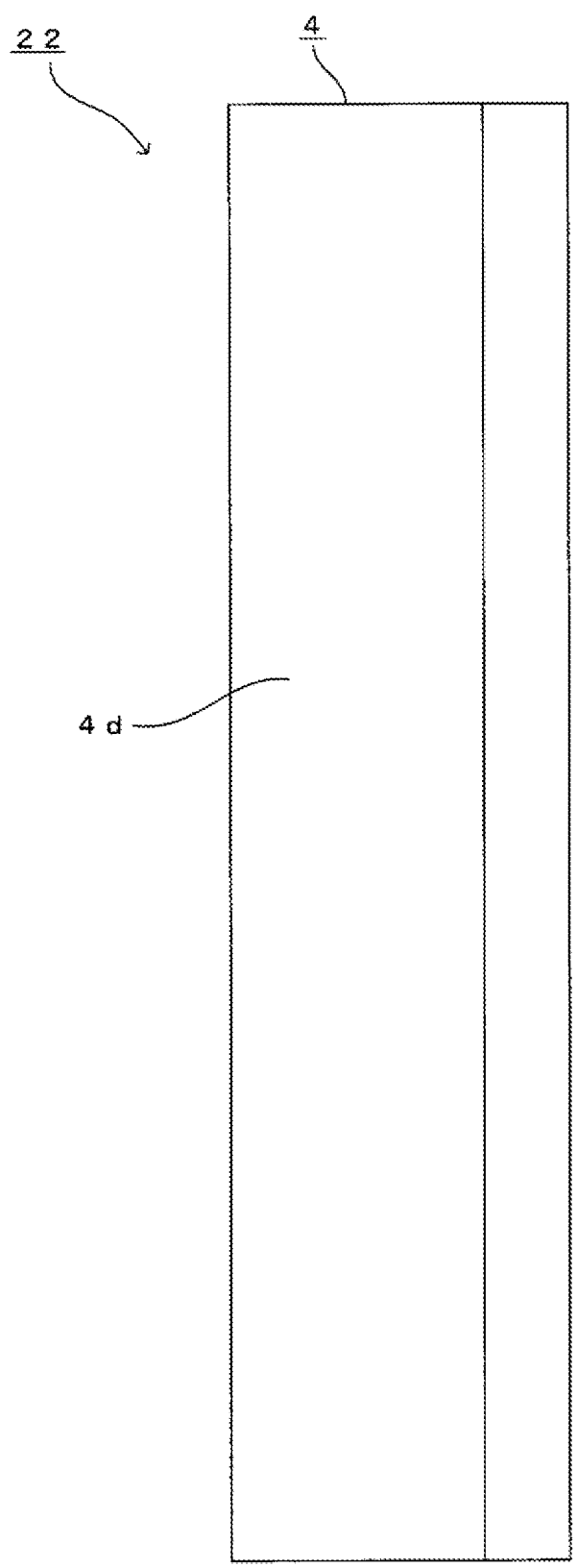
FIG. 39 is a right side view of FIG. 37.
Figure 40:
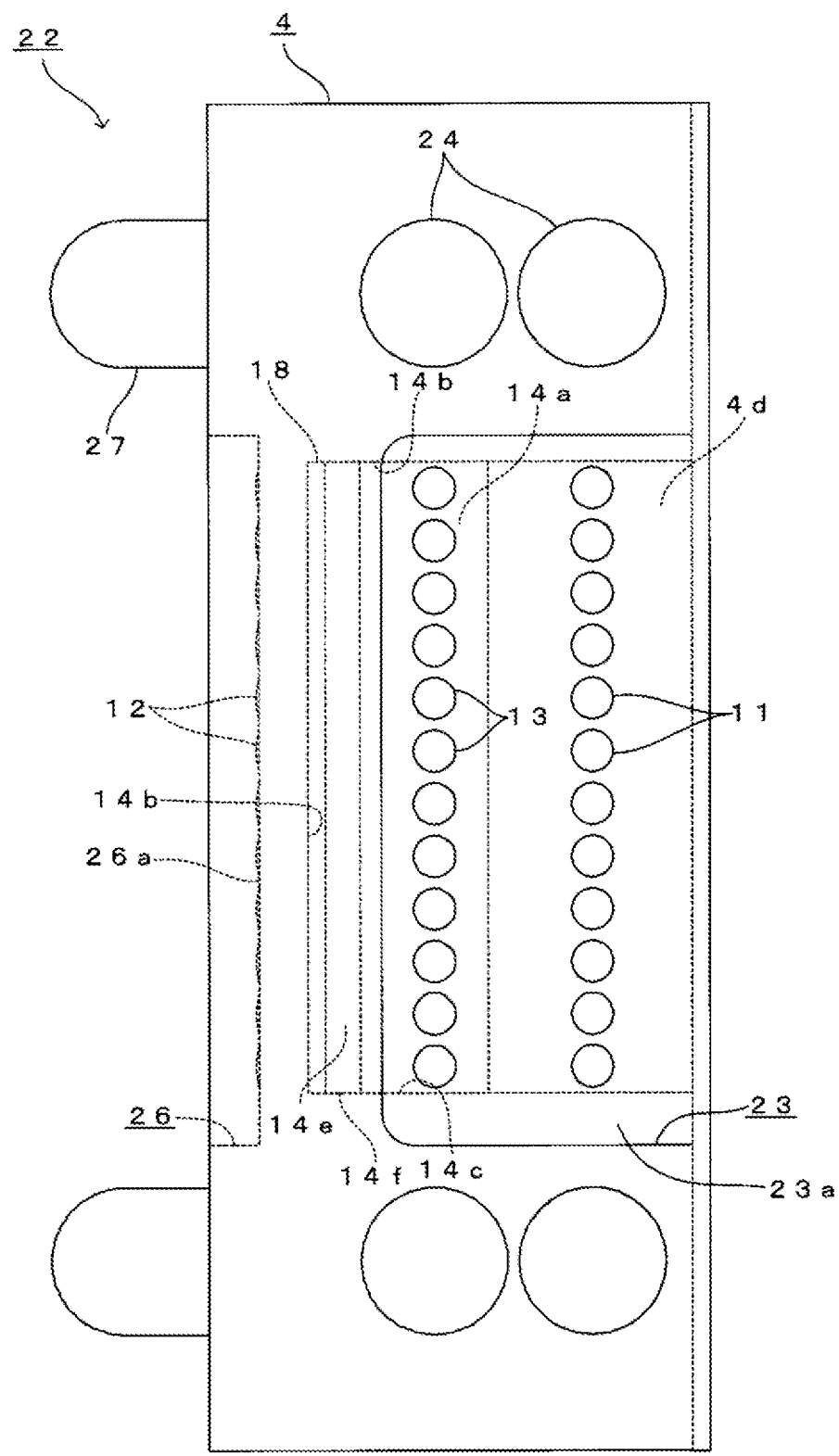
FIG. 40 is a bottom view of FIG. 37.

FIG. 36 is a configurational diagram schematically showing an overview of optical module 21 in this embodiment together with a longitudinal sectional view of lens array 22 in this embodiment. FIG. 37 is a plan view of lens array 22 shown in FIG. 36. FIG. 38 is a left side view of FIG. 37. FIG. 39 is a right side view of FIG. 37. FIG. 40 is a bottom view of FIG. 37.

In this embodiment, as a difference from Embodiment 9, means is adopted for mechanically positioning optoelectric converting device 3 and optical fibers 5 when fixing optoelectric converting device 3 and optical fibers 5 to lens array 22.

More specifically, as shown in FIGS. 36 and 40, in this embodiment, first lens surfaces 11 and second lens surfaces 12 are formed on bottom surface 23a of first counter-bore part 23 (first surface in this embodiment) provided with a dent in bottom face 4a of lens array body 4. Bottom surface 23a of first counter-bore part 23 is formed parallel to bottom face 4a. As shown in FIG. 40, first counter-bore part 23 is formed to have such a width that in the longitudinal direction in FIG. 40 (hereinafter, referred to as the lens alignment direction) that the widthwise edges of first counter-bore part 23 are disposed slightly outwardly from lens surfaces 11 and 13 that are arranged outermost in the lens alignment direction. In this embodiment, lens array body 4 is formed wider in the lens alignment direction than the width of first counter-bore part 23 in the lens alignment direction. In accordance with this, as shown in FIG. 40, bottom face 4a includes portions that extend outwardly in the lens alignment direction from both ends of first counter-bore part 23. As shown in FIG. 40, at the both extended portions of bottom face 4a extending outwardly in the lens alignment direction from both ends of first counter-bore part 23, two pairs, four in total, of plano-convex fitting holes 24 are formed so as to be disposed across first counter-bore part 23 as a structure for positioning optoelectric converting device 3. Fitting holes 24 are fitted with fitting pins, not shown, penetrating through semiconductor substrate 6 in the state where semiconductor substrate 6 is in contact with extended portions of bottom face 4a. This allows optoelectric converting device 3 to be mechanically positioned when optoelectric converting device 3 is fixed to lens array 22.

As shown in FIGS. 36 and 38, in this embodiment, second lens surfaces 12 are formed on bottom surface 26a (second surface in this embodiment) of second counter-bore part 26 provided with a dent in left end face 4b of lens array 22. Bottom surface 26a of second counter-bore part 26 is formed parallel to left end face 4b. As shown in FIG. 38, second counter-bore part 26 is formed to have such a width in lens alignment direction that the widthwise edges of second counter-bore part 26 are disposed slightly outwardly from lens surfaces 12 arranged outermost in the lens alignment direction. As shown in FIG. 38, in this embodiment, left end face 4b includes portions that extend outwardly in the lens alignment direction from both ends of second counter-bore part 26. As shown in FIG. 38, at the both extended portions of left end face 4b, a pair, two in total, of fitting pins 27 are formed so as to be disposed across second counter-bore part 26 in a protruding manner as a structure for positioning optical fibers 5. Fitting pins 27 are fitted into fitting holes, not shown, formed in connector 10 in the state where connector 10 is in contact with the extended portions of left end face 4b. This allows optical fibers 5 to be mechanically positioned when optical fibers 5 are fixed to lens array 22.

As shown in FIG. 36, in this embodiment, as to a difference from Embodiment 9, concave part 14 is formed to extend upwardly from first optical surface 14a and second optical surface 14b. In accordance with this, the upper end of lens array body 4 is located upwardly from top face 16c of prism 16.

In FIG. 36, the upper end of lens array body 4 is a plane, or top face 4c, at the left of concave part 14. The upper end of lens array body 4 forms a ridge line at the right of concave part 14 by intersection of a portion extending upwardly from first optical surface 14a of the inner surface of concave part 14 and an extension of total reflection surface 4d.

Furthermore, as shown in FIG. 36, in this embodiment, filler 18 fills not only a space between second prism surface 16b and second optical surface 14b but also a space over top face 16c of prism 16 so as to fill a step between the upper end of lens array body 4 and top face 16c of prism 16.

The configuration of this embodiment can also exert excellent working-effect similar to those of Embodiment 9. Furthermore, in this embodiment, optoelectric converting device 3 and optical fibers 5 can be simply positioned with respect to lens array 22 using fitting holes 24 and fitting pins 27. This allows optoelectric converting device 3 and optical fibers 5 to be simply fixed to lens array 22. Moreover, in this embodiment, the amount of filler 18 is larger and the adhesive area between prism 16 and concave part 14 is increased in comparison with Embodiment 9. This allows prism 16 to be bonded further firmly to lens array body 14.

Instead of aforementioned fitting hole 24, a through hole having the same diameter as that of fitting hole 24 penetrating lens array body 4 may be formed. The structures for positioning optical fiber 5 may be fitting holes or through holes on the side of lens array body 4, and fitting pins on the side of optical fiber 5. Likewise, the structure for positioning optoelectric converting device 3 may be fitting pins on the side of lens array body 4, and fitting holes or through holes on the side of optoelectric converting device 3. The positioning of optical fiber 5 and optoelectric converting device 3 is not limited to mechanical positioning. Instead, for instance, the positioning may be performed according to an optical method by optically recognizing a mark formed on lens array body 4.

(Variation)

Figure 41:
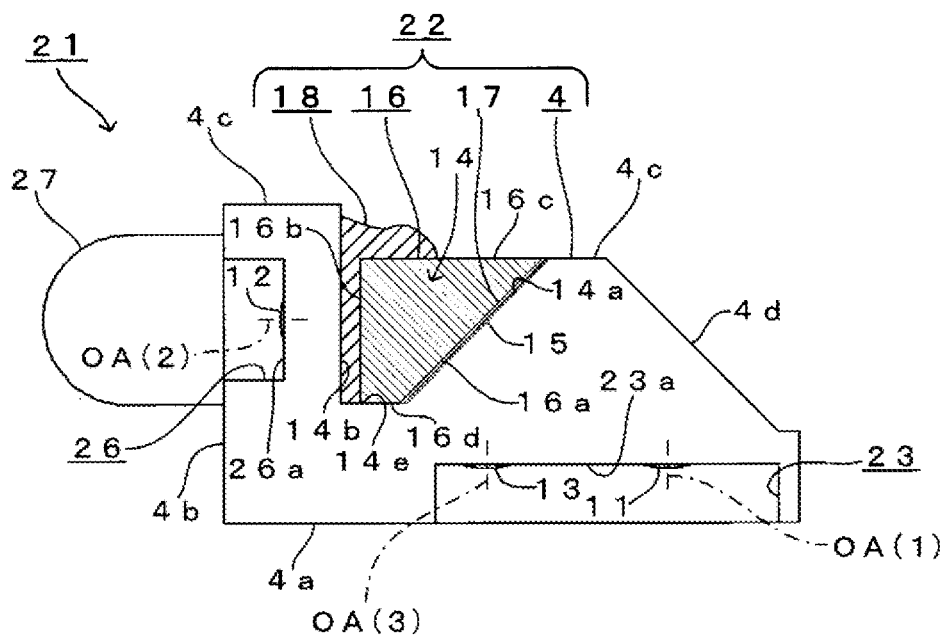
FIG. 41 is a configurational diagram schematically showing a variation of Embodiment 10.

Next, FIG. 41 shows a variation of this embodiment. Lens array 22 in this variation extends upwardly from top face 16c of prism 16 only at left side face of the array in FIG. 41 including second optical surface 14b among the sides of concave part 14. The other portions are formed to the same height as top face 16c of prism 16. In this variation, filler 18 fills not only a space between second prism surface 16b and second optical surface 14b but also the space in a manner flowing upwardly therefrom such that filler 18 fills the space up to the extension upward from second optical surface 14b on the left side face of concave part 14 and a predetermined range at the left end side of top face 16c of prism 16.

Embodiment 11

Embodiment 11 of a lens array and an optical module provided therewith according to the present invention will now be described mainly on difference from Embodiments 9 and 10 with reference to FIGS. 42 to 46.

In this embodiment, elements having configurations identical or similar to those in FIGS. 30 to 41 will be described using the same reference signs.

Figure 42:
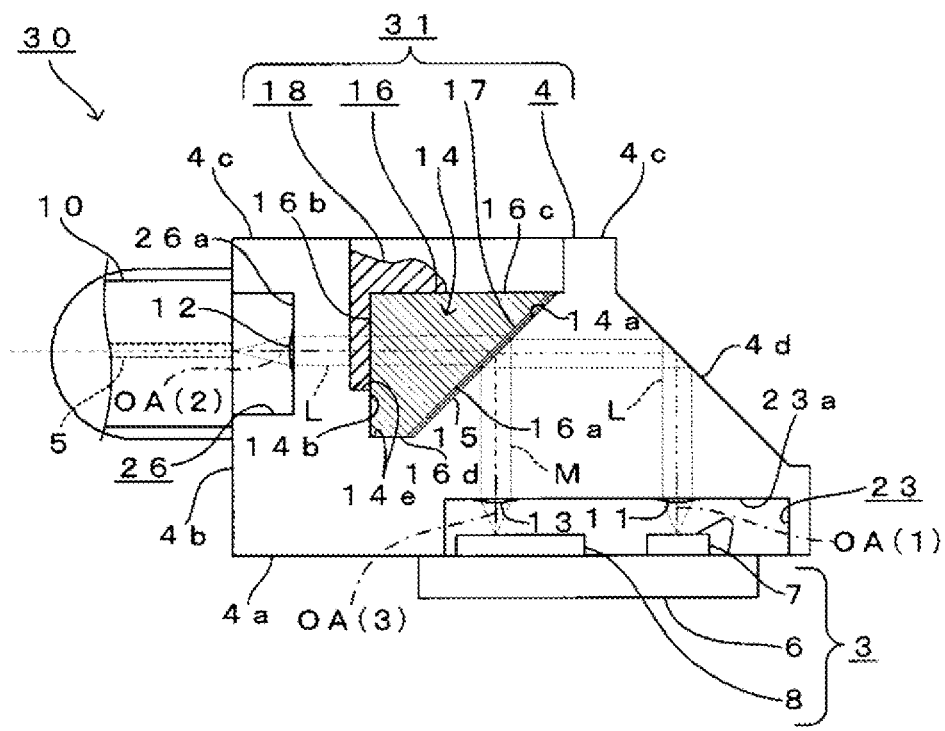
FIG. 42 is a configurational diagram schematically showing an overview of an optical module together with a longitudinal sectional view of a lens array in Embodiment 11 of the lens array and the optical module provided therewith according to the present invention.
Figure 43:
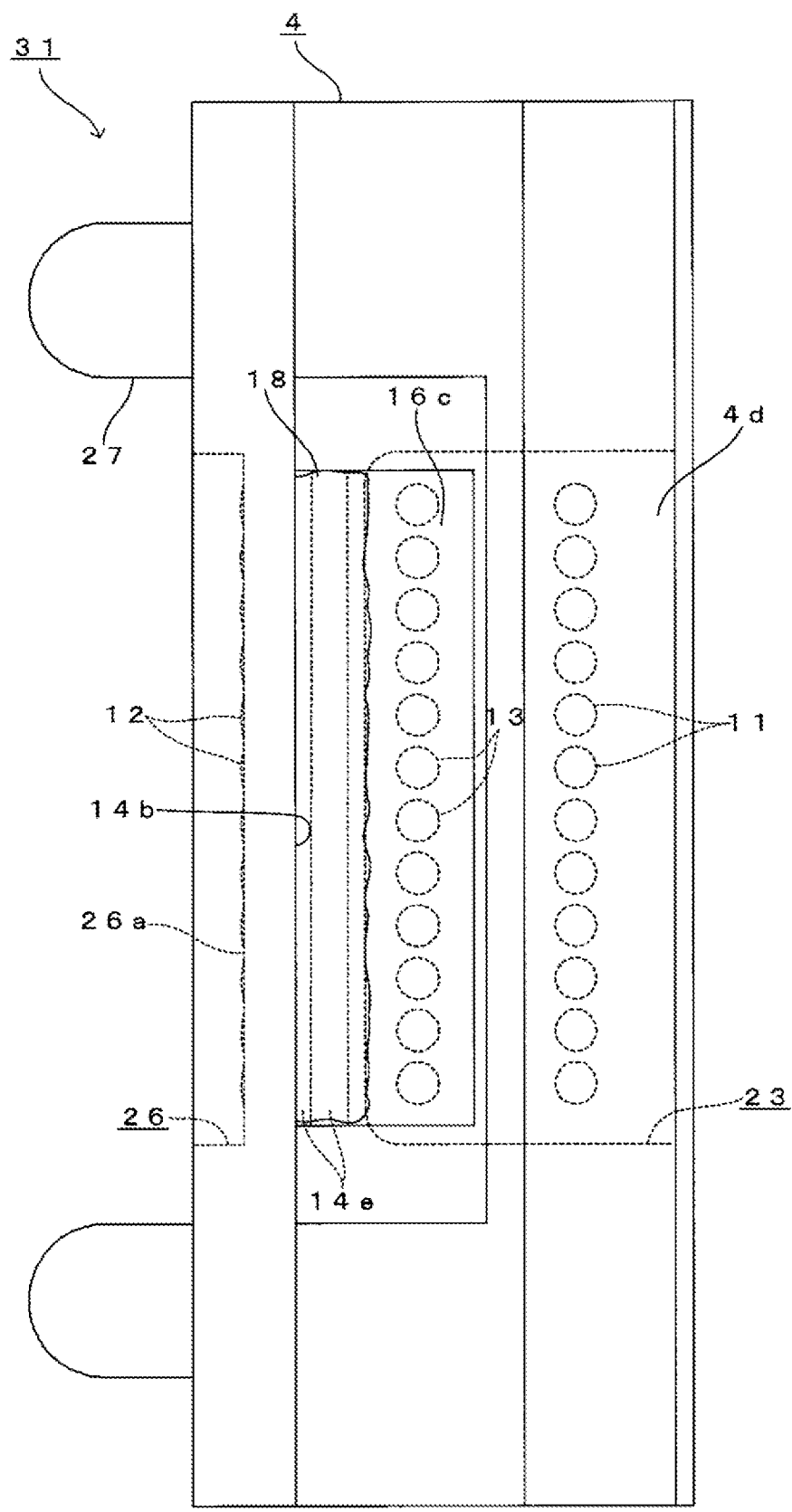
FIG. 43 is a plan view of the lens array shown in FIG. 42.
Figure 44:
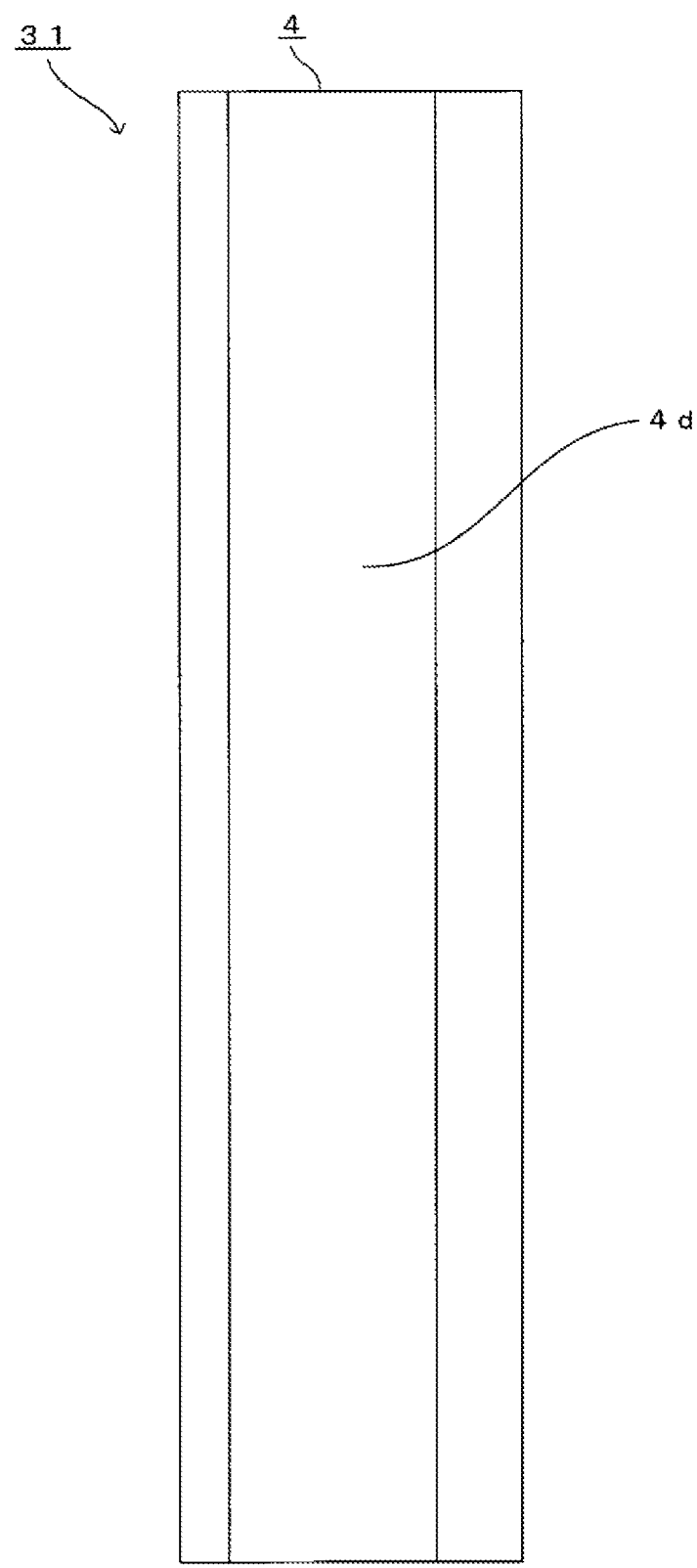
FIG. 44 is a right side view of FIG. 42.

FIG. 42 is a configurational diagram schematically showing an overview of optical module 30 in this embodiment together with a longitudinal sectional view of lens array 31 in this embodiment. FIG. 43 is a plan view of lens array 31 shown in FIG. 42. FIG. 44 is a right side view of FIG. 43.

As shown in FIG. 42, the configuration in this embodiment is similar to that in Embodiment 10 in that the side surface of concave part 14 extends upwardly from first optical surface 14a and second optical surface 14b, and filler 18 fills a space in a manner flowing upwardly from top face 16c of prism 16.

However, this embodiment is different from Embodiment 10 in that concave part 14 has a characteristic surface shape in a part of the inner surface thereof to assist installation of prism 16 into concave part 14. More specifically, as shown in FIG. 42, in this embodiment, bottom surface 14e of concave part 14 has a two-step structure. The portion located to the left of prism 16 at bottom surface 14e of concave part 14 in FIG. 42 protrudes upwardly from the remaining portions (a portion in contact with bottom face 16d of prism 16) on bottom surface 14e of concave part 14. The measurements of the remaining portions of bottom surface 14e in the lateral direction in FIG. 42 match with the measurements of bottom face 16d of prism 16 in the same direction.

Bottom surface 14e of concave part 14 having such two-step structure regulates backlash of prism 16 in the lateral direction in FIG. 42 in the case where prism 16 is installed in concave part 14 while securing a filling space with filler 18 by means of the step of bottom surface 14e. This allows bottom surface 14e of concave part 14 to assist installation of prism 16 into concave part 14.

Accordingly, this embodiment can exert excellent working-effects of Embodiment 9, facilitate installation of prism 16 when prism 16 is bonded to concave part 14, and exert further significant effects that can further facilitate manufacturing of lens array 31.

(First Variation)

Figure 45:
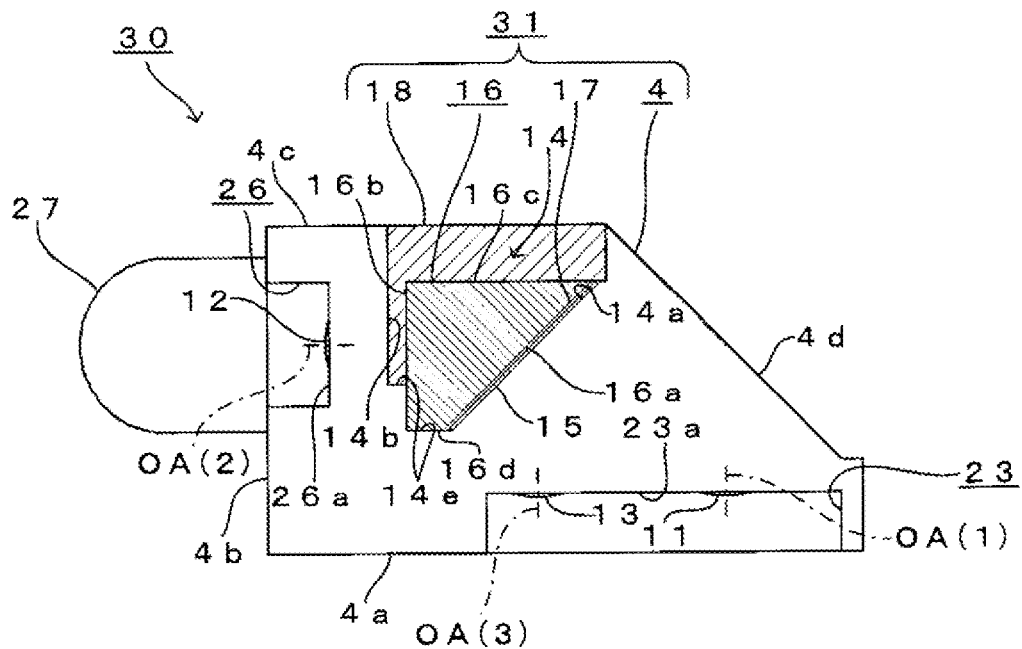
FIG. 45 is a configurational diagram schematically showing a first variation of Embodiment 11.

Next, FIG. 45 shows a first variation of this embodiment. Lens array 31 in this variation has a configuration where bottom surface 14e of concave part 14 of lens array 22 in Embodiment 10 shown in FIGS. 36 to 40 is formed into the two-step structure as with FIG. 42.

Lens array 31 in this variation also allows bottom surface 14e of concave part 14 to regulate the backlash of prism 16 in the lateral direction in FIG. 45 by means of the step of bottom surface 14e when prism 16 is installed in concave part 14 while securing the filling space with filler 18, as with lens array 31 shown in FIGS. 42 to 44. This allows bottom surface 14e of concave part 14 to assist installation of prism 16 into concave part 14.

(Second Variation)

Figure 46:
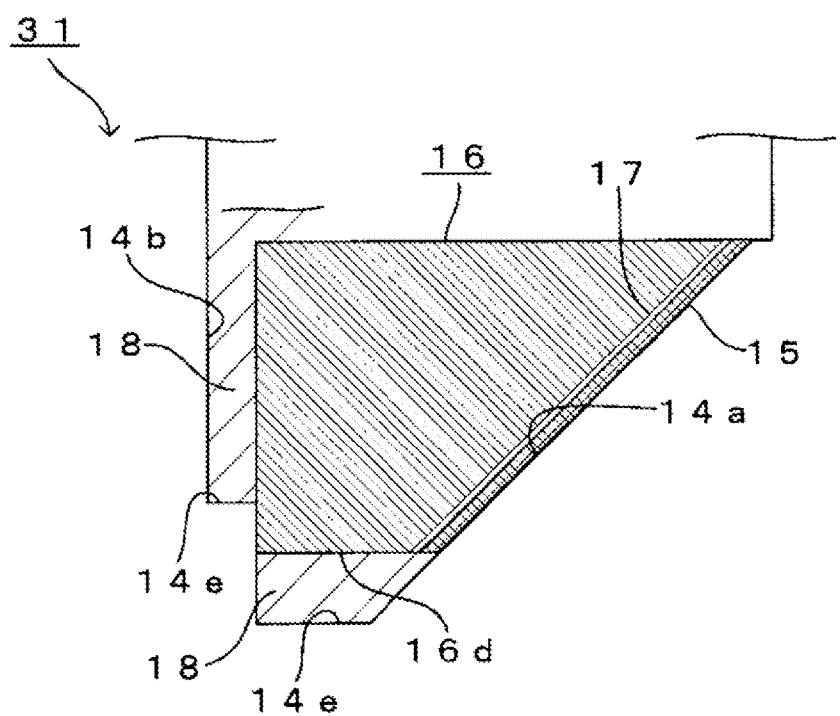
FIG. 46 is a configurational diagram schematically showing a second variation of Embodiment 11.

Next, FIG. 46 shows a second variation of this embodiment. Lens array 31 in this variation has a configuration shown in FIG. 42 or 45 wherein the measurements of bottom surface 16d of prism 16 in the lateral direction in FIG. 46 are larger than those of the portions at the lower step of the two-step structure of bottom surface 14e of concave part 14 in the same direction. Accordingly, a space can intentionally be formed between bottom surface 16d of prism 16 and the portions at the lower step of bottom surface 14e of concave part 14. Therefore, according to lens array 31 in this variation, as shown in FIG. 46, filler 18 can fill even a space between bottom surface 16d of prism 16 and the portions at the lower step of bottom surface 14e of concave part 14, thereby allowing prism 16 to be fixed further firmly to lens array body 4. Lens array 31 in this variation allows lens array body 4 to support prism 16 via first optical surface 14a and the steps of bottom surface 14e such that prism 16 is laterally sandwiched. This enables prism 16 to be stably disposed in concave part 14, and allows an operation of fixing prism 16 using filler 18 to be facilitated.

The present invention is not limited to the aforementioned embodiments, and can be modified variously in such an extent that the characteristics of the present invention is not degraded.

Figure 47:
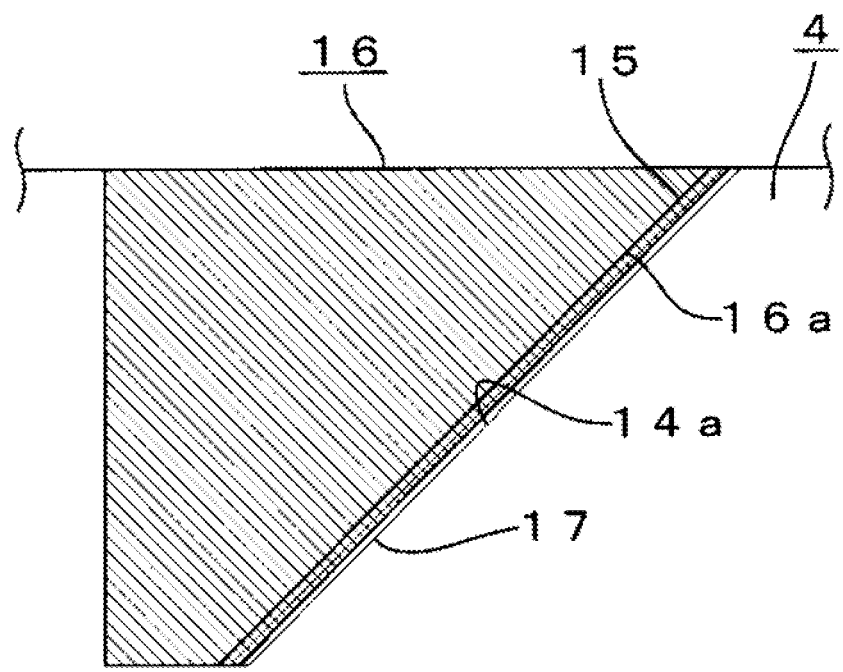
FIG. 47 is a diagram schematically showing an embodiment of the present invention different from Embodiments 9 to 11.

For instance, formation of reflecting/transmitting layer 17 on first prism surface 16a as described above is convenient for integral molding of lens array body 4 using resin material. Under some concepts, reflecting/transmitting layer 17 may be formed on first optical surface 14a by coating or the like, as shown in FIG. 47. In this case, as shown in FIG. 47, adhesive sheet 15 is arranged between first prism surface 16a and reflecting/transmitting layer 17 on first optical surface 14a. The adhesive force of adhesive sheet 15 allows prism 16 to be bonded to lens array body 4 via first prism surface 16a. Also in such a case, as with Embodiments 9 to 11, on the optical path of laser light L from each light emitting element 7 in lens array body 4, the incident side onto first optical surface 14a and the emitting side from second optical surface 14b can be parallel to each other.

The present invention is applicable to an optical module capable of bidirectional communication. In this case, the configuration may further include optical fibers for receiving optical signals. Moreover, lens surfaces for receiving optical signals are formed at lens array body 4, and optoelectric converting device 3 may further include light receiving elements for receiving optical signals.

Furthermore, lens array body 4 may be formed using light-transmitting material (e.g. glass) other than resin material.

The present invention is effectively applicable also to optical transmission members other than optical fibers 5, such as sheet-shaped optical waveguides.

Embodiment 12

Embodiment 12 of a lens array and an optical module provided therewith according to the present invention will now be described with reference to FIGS. 48 to 57. In this embodiment, elements having configurations identical to those in FIGS. 1 to 47 will be described using the same reference signs.

Figure 48:
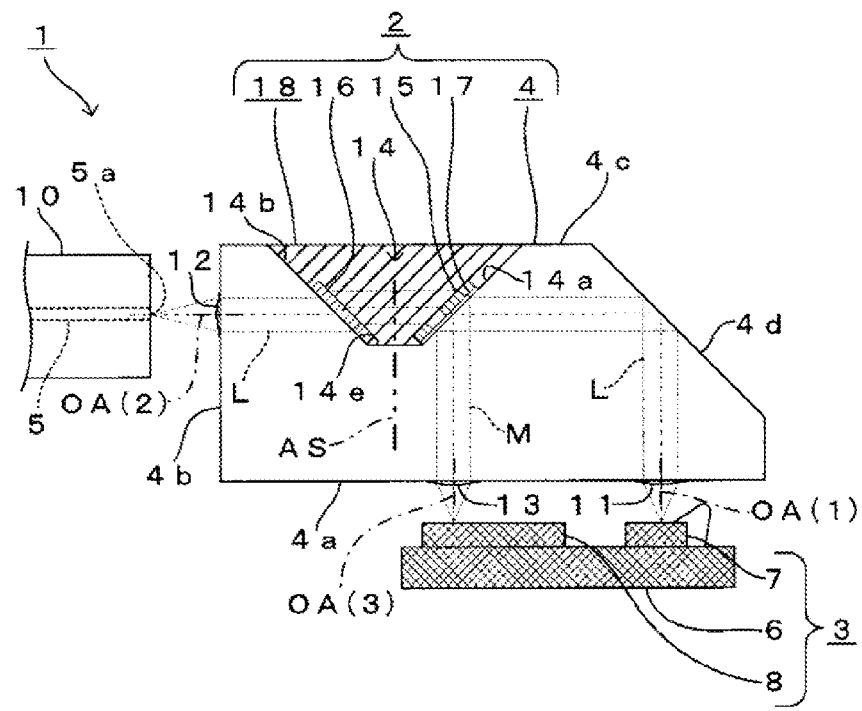
FIG. 48 is a configurational diagram schematically showing an overview of an optical module together with a longitudinal sectional view of a lens array in Embodiment 12 of the lens array and the optical module provided therewith according to the present invention.
Figure 49:
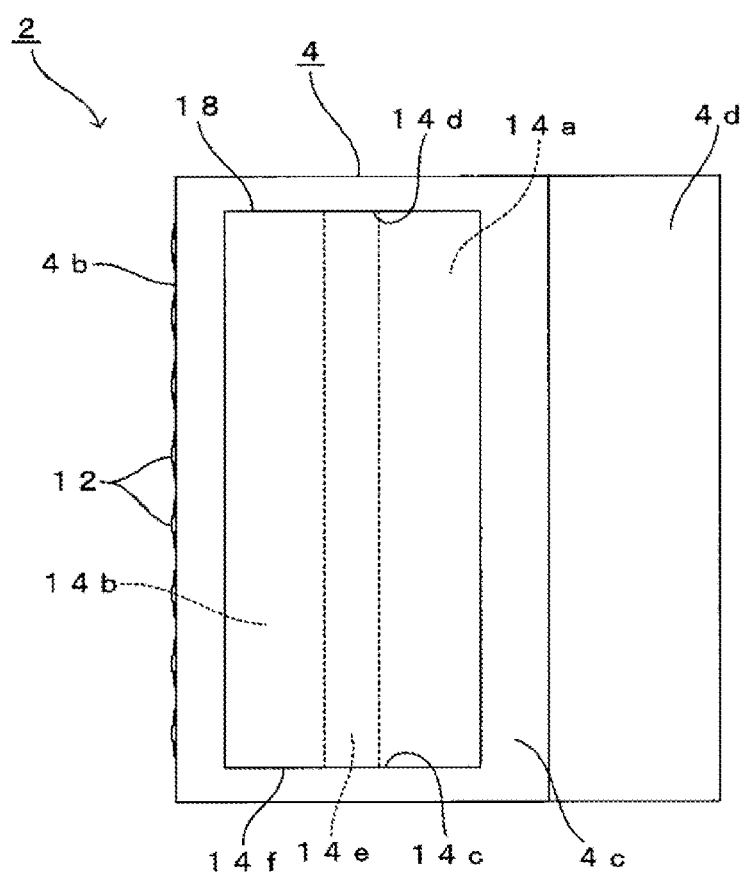
FIG. 49 is a plan view of the lens array shown in FIG. 48.
Figure 50:
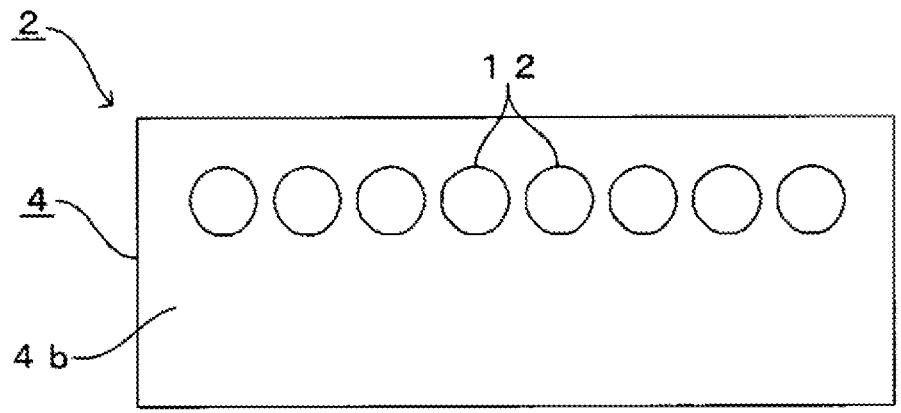
FIG. 50 is a left side view of the lens array shown in FIG. 48.
Figure 52:
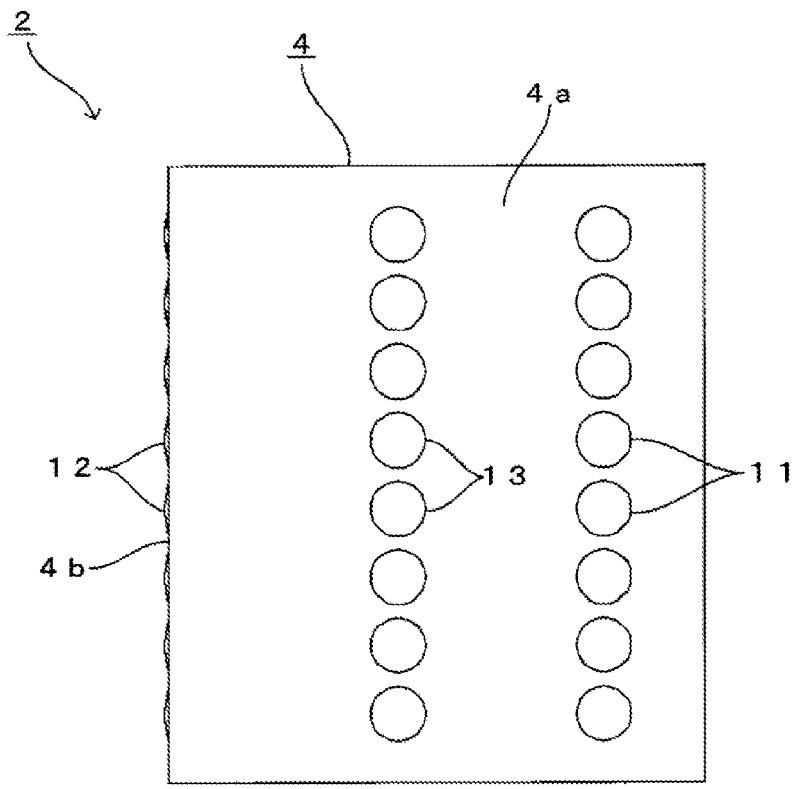
FIG. 52 is a bottom view of the lens array shown in FIG. 48.
Figure 53:
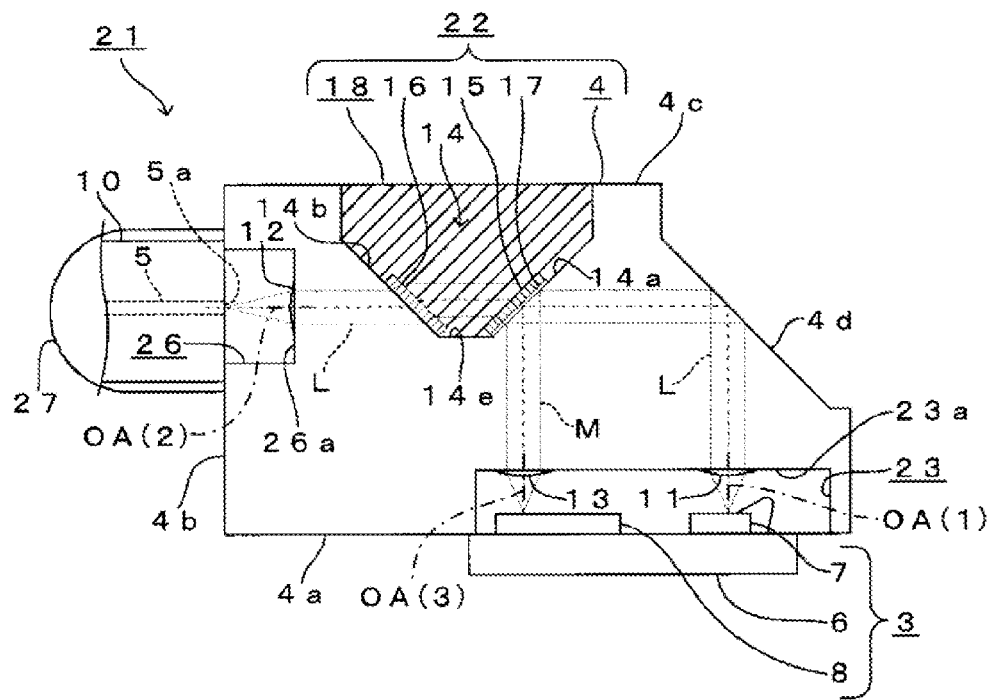
FIG. 53 is a configurational diagram schematically showing an overview of an optical module together with a longitudinal sectional view of a lens array in a variation of Embodiment 12.

FIG. 48 is a configurational diagram schematically showing an overview of optical module 1 in this embodiment together with a longitudinal sectional view of lens array 2 in this embodiment. FIG. 49 is a plan view of lens array 2 shown in FIG. 48. FIG. 50 is a left side view of lens array 2 shown in FIG. 48. FIG. 52 is a right side view of lens array 2 shown in FIG. 48. FIG. 53 is a bottom view of lens array 2 shown in FIG. 48.

As shown in FIG. 48, lens array 2 in this embodiment is disposed between optoelectric converting device 3 and optical fiber 5.

Here, optoelectric converting device 3 includes the plurality of light emitting elements 7 that emit laser light L having the same wavelength toward a surface of semiconductor substrate 6 facing lens array 2 in the direction perpendicular to this surface (upper direction in FIG. 48). Light emitting elements 7 constitute a vertical cavity surface emitting laser (VCSEL). In FIG. 48, light emitting elements 7 are arranged in line along the direction perpendicular to the sheet of FIG. 48. Furthermore, optoelectric converting device 3 includes a plurality of first light receiving elements 8 that are equal in number to light emitting elements 7 and receive monitor light M to monitor an output of laser light L (e.g. intensity and amount of light) emitted from respective light emitting elements 7, at left adjacent positions of FIG. 48 to the respective light emitting elements 7, on a surface of semiconductor substrate 6 facing lens array 2. First light receiving elements 8 are arranged in line in the same direction as the direction of light emitting elements 7. The positions of light emitting elements 7 and light receiving elements 8, which correspond to each other, in the alignment direction match with each other. That is, first light receiving elements 8 are arranged at the same pitch as light emitting elements 7. First light receiving elements 8 may be photo-detectors. Furthermore, although not shown, optoelectric converting device 3 is connected with a control circuit that controls an output of laser light L emitted from light emitting elements 7 on the basis of the intensity or amount of monitor light M received by first light receiving elements 8. For instance, such optoelectric converting device 3 is disposed opposite to lens array 2 such that a contact part (not shown) with lens array 2 is in contact with lens array 2. Optoelectric converting device 3 is attached to lens array 2 by publicly known fixation means.

Optical fibers 5 in this embodiment are provided equal in number to light emitting element 7 and first light receiving elements 8. In FIG. 48, each optical fiber 5 is arranged in line along the direction perpendicular to the sheet of FIG. 48. Optical fibers 5 are arranged in line at the same pitch as light emitting elements 7. Each optical fiber 5 is attached to lens array 2 by publicly known fixation means in the state where a portion of the fiber on a side of end face 5a is held in bulk multicore connector 10.

Lens array 2 optically couples light emitting elements 7 and end faces 5a of respective optical fibers 5 to each other in the state where lens array 2 is disposed between optoelectric converting device 3 and optical fibers 5.

Figure 51:
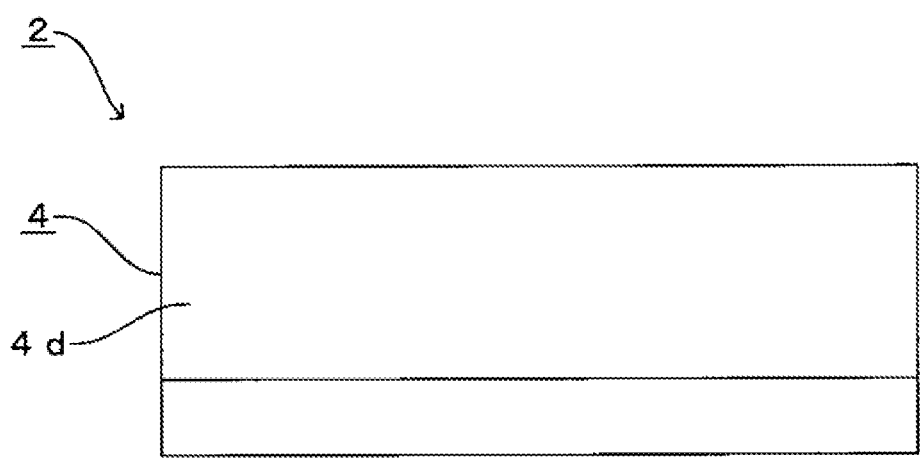
FIG. 51 is a right side view of the lens array shown in FIG. 48.

Lens array 2 is further described; as shown in FIG. 48, lens array 2 includes lens array body 4. Lens array body 4 is formed to have a substantially trapezoidal external shape in a longitudinal sectional view, a substantially rectangular shape in a plan view as shown in FIG. 49, and a rectangular shape in a side view as shown in FIGS. 50 and 51.

As shown in FIGS. 48 and 52, lens array 2 has a plurality of (eight) first lens surfaces (convex lens surfaces) 11 that are plano-convex and equal in number to light emitting elements 7, on bottom face 4a (plane) as a first surface of lens array body 4 in FIG. 48 facing optoelectric converting device 3. The plurality of first lens surfaces 11 are formed to align in the predetermined alignment direction (direction perpendicular to the sheet of FIG. 48, longitudinal direction in FIG. 52) corresponding to light emitting elements 7. First lens surfaces 11 are arranged at the same pitch as light emitting elements 7. It is preferred that optical axis OA(1) on each first lens surface 11 coincide with the central axis of laser light L emitted from light emitting element 7 corresponding to first lens surface 11.

As shown in FIG. 48, laser light L emitted from each light emitting element 7 corresponding to first lens surface 11 is incident on first lens surface 11. Each first lens surface 11 collimates incident laser light L from light emitting element 7, and causes the collimated light to move forth into lens array body 4.

As shown in FIGS. 48 and 50, lens array 2 has the plurality of second lens surfaces (convex lens surfaces) 12 equal in number to first lens surfaces 11, on left end face 4b (plane) in FIG. 48 as a second surface of lens array body 4 facing end faces 5a of optical fiber 5. The plurality of second lens surfaces 12 are formed to align in the same direction as the alignment direction of first lens surfaces 11. Second lens surfaces 12 are arranged at the same pitch as first lens surfaces 11. Optical axis OA(2) on each second lens surface 12 is preferably disposed on the same axis as the central axis of end face 5a of optical fiber 5 corresponding to second lens surface 12.

As shown in FIG. 48, laser light L from each light emitting element 7, having been incident on first lens surface 11 corresponding to second lens surface 12 and moved forth through the optical path in lens array body 4, is incident on second lens surface 12 in the state where the central axis of the laser light coincides with optical axis OA(2) on second lens surface 12. Each second lens surface 12 emits incident laser light L from light emitting element 7 toward end face 5a of optical fiber 5 corresponding to second lens surface 12.

Thus, light emitting elements 7 and respective end faces 5a of optical fibers 5 are optically coupled to each other via first lens surfaces 11 and second lens surfaces 12.

Furthermore, as shown in FIGS. 48 and 52, third lens surfaces 13 equal in number to first light receiving elements 8 (also equal in number to light emitting elements 7, optical fibers 5, first lens surfaces 11 and second lens surfaces 12 in this embodiment) are formed at left adjacent positions in FIG. 48 to first lens surfaces 11, on bottom face 4a of lens array body 4. Third lens surfaces 13 are formed to align in the predetermined alignment direction corresponding to first light receiving elements 8, that is, the same direction as the alignment direction of first lens surface 11. Third lens surfaces 13 are arranged at the same pitch as first light receiving elements 8. Optical axis OA(3) on each third lens surface 13 preferably coincides with the central axis of light receiving surface of first light receiving element 8 corresponding to third lens surface 13.

As shown in FIG. 48, monitor light M from each light emitting element 7 corresponding to third lens surface 13 is incident on third lens surface 13 from the inside of lens array body 4. Each third lens surface 13 emits incident monitor light M from light emitting element 7 toward first light receiving element 8 corresponding to third lens surface 13.

Furthermore, as shown in FIGS. 48 and 51, lens array body 4 includes total reflection surface 4d at the right upper end in FIG. 48. Total reflection surface 4d is formed into an inclining surface where the upper end is located left to the bottom end in FIG. 48 (i.e. on a side of after-mentioned concave part 14). Total reflection surface 4d lies in the optical path of laser light L from each light emitting element 7, between first lens surface 11 and after-mentioned first optical surface 14a of concave part 14.

As shown in FIG. 48, laser light L from each light emitting element 7, having been incident on first lens surface 11, is incident on such total reflection surface 4d from the bottom in FIG. 48 at an incident angle of at least the critical angle. Total reflection surface 4d totally reflects incident laser light L from each light emitting element 7 toward the left in FIG. 48.

Note that a reflection film made of Au, Ag, Al or the like may be coated onto total reflection surface 4d.

As shown in FIGS. 48 and 49, concave part 14 is formed in a reentrant manner on top face 4c (plane) of lens array body 4 in FIG. 48 as third surface so that the optical paths connecting first lens surfaces 11 and second lens surfaces 12 pass through therein. Top face 4c is formed parallel to bottom face 4a.

Here, as shown in FIG. 48, concave part 14 has first optical surface 14a forming a part of the inner surface (right side face of concave part 14 in FIG. 48). First optical surface 14a is formed into an inclining surface having a predetermined inclining angle to left end face 4b where the upper end is located right to the bottom end in FIG. 48 (i.e. on a side of total reflection surface 4d).

As shown in FIG. 48, laser light L from each light emitting element 7, having been totally reflected by total reflection surface 4d, is incident on such first optical surface 14a at a predetermined incident angle. However, the incident direction of laser light L from each light emitting element 7 onto first optical surface 14a is perpendicular to left end face 4b.

As shown in FIG. 48, concave part 14 has second optical surface 14b, which is a part of the inner surface and opposite to first optical surface 14a at the left in FIG. 48 (left side face of concave part 14 in FIG. 48). Second optical surface 14b has a predetermined inclining angle to left end face 4b.

Note that, in this embodiment, the inclining angle of second optical surface 14b with reference to left end face 4b(0°) is represented as 180−θ[°], provided that the inclining angle of first optical surface 14a is θ[°] with reference to left end face 4b. That is, in this embodiment, first optical surface 14a and second optical surface 14b have a shape that is line-symmetry with respect to symmetry axis AS that is perpendicular to bottom face 4a and indicated by a chain double-dashed line in FIG. 48.

Furthermore, as shown in FIG. 48, thin reflecting/transmitting layer 17 having a uniform thickness is disposed on first optical surface 14a. The surface of reflecting/transmitting layer 17 on the side of first optical surface 14a is in closely contact with first optical surface 14a.

Moreover, as shown in FIG. 48, first reflecting/transmitting layer 17 is disposed on first optical surface 14a in the state where first reflecting/transmitting layer 17 is formed over the entire surface of first optical plate 15 (undersurface in FIG. 48). Here, as shown in FIG. 48, first optical plate 15 is formed into a plate having a uniform thickness and parallel to first optical surface 14a, and formed to have a predetermined refractive index according to the material of first optical plate 15. First optical plate 15 is formed to have a size in a direction perpendicular to the sheet of FIG. 48 on which entire laser light L from each light emitting element 7 can be incident.

As shown in FIG. 48, second optical plate 16 is disposed on second optical surface 14b. The surface of second optical plate 16 on the side of second optical surface 14b is closely in contact with second optical surface 14b. As shown in FIG. 48, second optical plate 16 is formed into a plate having a uniform thickness parallel to second optical surface 14b, and formed to have the same refractive index as that of first optical plate 15. Second optical plate 16 is formed into a size in a direction perpendicular to the sheet of FIG. 48 on which entire laser light L from each light emitting element 7 can be incident. Second optical plate 16 may be made of the same material as that of first optical plate 15. In this embodiment, second optical plate 16 is formed to have the same air-converted length as that of first optical plate 15.

Furthermore, as shown in FIG. 48, filler 18 having the same refractive index as that of lens array body 4 fills concave part 14 so as to cover first optical plate 15 and second optical plate 16 in a space formed by concave part 14 from substantially above without gap.

Moreover, in this embodiment, filler 18 is made of light-transmitting adhesive. First optical plate 15 and second optical plate 16 are bonded to lens array body 4 by the adhesive force of filler 18. Ultraviolet-set resin or thermoset resin that has the same refractive index as that of lens array body 4 may be used as filler 18 also functioning as adhesive. More specifically, for instance, in the case of forming lens array body 4 using ARTON made by JSR as an annular olefin resin, filler 18 may be A1754B made by TECS, which is UV-curable resin. As to each of ARTON and A1754B, the refractive indices of light with a wavelength of 850 nm, which are calculated on the basis of the refractive index and Abbe number for d line and disclosed by the manufacturer, are 1.50. However, the materials of filler 18 and lens array body 4 are not limited thereto.

First reflecting/transmitting layer 17, first optical plate 15, filler 18 and second optical plate 16, which are thus disposed in concave part 14, exert a light separating function and an optical path adjusting function that couple laser light L from each light emitting element 7 to end face 5a of optical fiber 5 or first light receiving element 8, as described below.

More specifically, as shown in FIG. 48, laser light L from each light emitting element 7, having been incident on first optical surface 14a, is incident on first reflecting/transmitting layer 17 immediately thereafter. First reflecting/transmitting layer 17 reflects incident laser light L from each light emitting element 7 toward third lens surface 13 side at a predetermined reflectance while allowing the light to pass through toward first optical plate 15 side at a predetermined transmittance.

Here, as shown in FIG. 48, first reflecting/transmitting layer 17 reflects a part of laser light L from each light emitting element 7 (light of the amount of reflectance), having been incident on first reflecting/transmitting layer 17, as monitor light M from each light emitting element 7 that corresponds to each light emitting element 7, toward third lens surface 13 side corresponding to monitor light M.

Monitor light M from each light emitting element 7 thus reflected by first reflecting/transmitting layer 17 moves forth in lens array body 4 toward third lens surface 13 side and is subsequently emitted from third lens surface 13 toward corresponding first light receiving element 8.

Here, for instance, in the case of coating first optical plate 15 with a single layer film of Cr using a publicly known coating technique to form first reflecting/transmitting layer 17, reflectance of first reflecting/transmitting layer 17 can be 30% and transmittance can be 30% (absorptance of 40%). First reflecting/transmitting layer 17 may be formed using a single metal single layer film of Ni, Al or the like, which is other than Cr. In the case of coating first optical plate 15 with a publicly known dielectric multilayer film of $TiO_2$, $SiO_2$ or the like using a publicly known coating technique to form first reflecting/transmitting layer 17, for instance, the reflectance of first reflecting/transmitting layer 17 can be 20% and the transmittance can be 80%. Instead, the reflectance and transmittance of first reflecting/transmitting layer 17 can be set to desired values in accordance with the material, thickness and the like of first reflecting/transmitting layer 17 within a limit where an amount of monitor light M that is considered sufficient for monitoring the output of laser light L can be acquired. First reflecting/transmitting layer 17 can be coated using a coating technique, such as Inconel deposition. Furthermore, for instance, first reflecting/transmitting layer 17 may be made of a glass filter.

On the other hand, laser light L from each light emitting element 7, having passed through first reflecting/transmitting layer 17, passes through first optical plate 15 and subsequently is incident on filler 18. Laser light L from each light emitting element 7, having been incident on filler 18, moves forth through the optical path in filler 18 toward second lens surface 12 side.

At this time, filler 18 is formed to have the same refractive index as that of lens array body 4, thereby allowing the optical path of laser light L from each light emitting element 7 in filler 18 to be maintained parallel to the optical path of laser light L connecting total reflection surface 4d and first optical surface 14a.

This will be described in detail. Provided that first optical surface 14a, the interface between first reflecting/transmitting layer 17 and first optical plate 15, and the interface between first optical plate 15 and filler 18 are parallel to each other, following Equations 4 and 5 based on the Snell's law hold.

$$n_1 \sin \theta_1 = n_2 \sin \theta_2 \quad \text{(Equation 4)}$$

$$n_2 \sin \theta_2 = n_1 \sin \theta_3 \quad \text{(Equation 5)}$$

Note that, in Equations 4 and 5, $n_1$ represents the refractive index of lens array body 4 and filler 18, and $n_2$ represents refractive index of first optical plate 15. These $n_1$ and $n_2$ are acquired with reference to light having the same wavelength. $\theta_1$ in Equation 4 represents the incident angle of laser light L from each light emitting element 7 onto first optical surface 14a. $\theta_2$ in Equations 4 and 5 represents the emission angle from the interface between first reflecting/transmitting layer 17 and first optical plate 15 concerning laser light L from each light emitting element 7, and the incident angle of laser light L from each light emitting element 7 onto the interface between first optical plate 15 and filler 18, respectively. Note that, the refraction of laser light L at first reflecting/transmitting layer 17 is neglected here, because the thickness of first reflecting/transmitting layer 17 (measurement in the optical path direction) is significantly thin in comparison with lens array body 4, first optical plate 15 and filler 18. $\theta_3$ in Equation 5 represents the emission angle from the interface between first optical plate 15 and filler 18 concerning laser light L from each light emitting element 7. The plane normal direction of first optical surface 14a is adopted as the references (0°) of $\theta_1$ to $\theta_3$.

Because the right side of Equation 4 and the left side of Equation 5 are identical to each other, the following equation is derived.

$$n_1 \sin \theta_1 = n_1 \sin \theta_3 \quad \text{(Equation 6)}$$

According to Equation 6, $\theta_3 = \theta_1$. This represents that the optical path of laser light L from each light emitting element 7 in filler 18 is parallel to the optical path of laser light L connecting total reflection surface 4d and first optical surface 14a.

Thus, laser light L from each light emitting element 7, having moved forth through the optical path in filler 18, passes through second optical plate 16 and subsequently is incident on second optical surface 14b to return to the optical path in lens array body 4 as shown in FIG. 48, while parallelity to the optical path of laser light L connecting total reflection surface 4d and first optical surface 14a is maintained.

Here, provided that the interface between second optical surface 14b and second optical plate 16 and the interface between second optical plate 16 and filler 18 are parallel to each other, and second optical surface 14b is line-symmetric to first optical surface 14a, following Equations 7 and 8 based on the Snell's law hold.

$$n_1 \sin \theta_1 = n_2 \sin \theta_2 \quad \text{(Equation 7)}$$

$$n_2 \sin \theta_2 = n_1 \sin \theta_4 \quad \text{(Equation 8)}$$

Note that, in Equations 7 and 8, $n_1$ represents the refractive index of lens array body 4 and filler 18, as with Equations 4 to 6, and $n_2$ represents the refractive index of second optical plate 16 and also represents the refractive index of first optical plate 15. This is as described on Equations 4 and 5. $\theta_1$ in Equation 7 represents the incident angle of laser light L from each light emitting element 7 onto the interface between filler 18 and second optical plate 16, and also represents the emission angle from the interface between first optical plate 15 and filler 18 concerning laser light L from each light emitting element 7. This is as described on Equation 6. $\theta_2$ in Equations 7 and 8 represents the emission angle from the interface between filler 18 and second optical plate 16 concerning laser light L from each light emitting element 7, and the incident angle of laser light L from each light emitting element 7 onto second optical surface 14b (i.e. the interface between second optical plate 16 and second optical surface 14b). $\theta_2$ represents the emission angle from the interface between first reflecting/transmitting layer 17 and first optical plate 15 concerning laser light L from each light emitting element 7, and also represents the incident angle of laser light L from each light emitting element 7 onto the interface between first optical plate 15 and filler 18. This is as described on Equations 4 and 5. $\theta_4$ in Equation 8 represents the emission angle from second optical surface 14b concerning laser light L from each light emitting element 7. The plane normal direction of second optical surface 14b is adopted as the references) (0°) of $\theta_1$, $\theta_2$ and $\theta_4$ in Equations 7 and 8.

Because the right side of Equation 7 and the left side of Equation 8 are identical to each other, Equation 9 is derived.

$$n_1 \sin \theta_1 = n_1 \sin \theta_4 \quad \text{(Equation 9)}$$

According to Equation 9, $\theta_4 = \theta_1$. This represents that the optical path of laser light L from each light emitting element 7 after second optical surface 14b is parallel to the optical path of laser light L from each light emitting element 7 in filler 18.

Here, it has been described above that the optical path of laser light L from each light emitting element 7 in filler 18 was parallel to the optical path of laser light L connecting total reflection surface 4d and first optical surface 14a. Accordingly, it can be said that the optical path of laser light L from each light emitting element 7 after second optical surface 14b is parallel to the optical path of laser light L connecting total reflection surface 4d and first optical surface 14a.

Furthermore, in consideration that first optical surface 14a and second optical surface 14b are line-symmetric, the air-converted lengths of first optical plate 15 and second optical plate 16 are identical to each other, the thickness of reflecting/transmitting layer 17 is negligible, and laser light L from each light emitting element 7 is incident on first optical surface 14a from the direction perpendicular to symmetry axis AS, it can be said that the optical path of laser light L after second optical surface 14b is located on the same line as the optical path of laser light L connecting total reflection surface 4d and first optical surface 14a.

More specifically, in this embodiment, laser light L from each light emitting element 7, having been incident on first optical surface 14a at incident angle $\theta_1$, is refracted at refraction angle $\theta_2$ when being incident on first optical plate 15, and moves forth to the upper left in FIG. 48. This refraction causes a deviation (so-called lateral deviation) in the direction perpendicular to the optical path length direction (lateral direction in FIG. 48) between the optical path of laser light L from each optical element 7 that connects total reflection surface 4d and first optical surface 14a to each other and the optical path in filler 18. However, in this embodiment, laser light L from each light emitting element 7, having moved forth through the optical path in filler 18, is refracted at refraction angle $\theta_2$ and moves forth to the lower left in FIG. 48 when being incident on second optical plate 16, and subsequently is emitted from second optical surface 14b at emission angle $\theta_1$. This can correct a lateral deviation, in this embodiment. Thus, second optical plate 16 corrects the optical path of laser light L such that the optical path of laser light L from each light emitting element 7 after second optical surface 14b is located on the same line as the optical path of laser light L connecting total reflection surface 4d and first optical surface 14a.

As described above, laser light L from each light emitting element 7, having returned from second optical surface 14b to the optical path in lens array body 4, moves forth through the optical path in lens array body 4 toward second lens surface 12 side, and subsequently is emitted by second lens surface 12 toward end face 5a of optical fiber 5 corresponding second lens surface 12.

The aforementioned configuration allows first reflecting/transmitting layer 17 to split laser light L from each light emitting element 7, having been incident on first lens surface 11, toward second lens surface 12 side and third lens surface 13 side. Monitor light M split toward each third lens surface 13 side is emitted by third lens surface 13 toward first light receiving element 8 side. As a result, monitor light M can be securely acquired. Adoption of first reflecting/transmitting layer 17 capable of being easily formed to have a certain extent of area, as a configuration of acquiring such monitor light M, facilitates manufacturing of lens array 2.

This embodiment can secure linearity between the optical path in a predetermined range on the incident side onto first optical surface 14a (optical path between total reflection surface 4d and first optical surface 14a) and optical path on the emitting side from second optical surface 14b. In the case of product inspection, this can reduce the number of spots required to be adjusted in measurements for canceling a deviation from the center of each second lens surface 12 concerning laser light L, which has been from each light emitting element 7 and incident on each second lens surface 12, if such a deviation is confirmed. The measurement adjustment may be change in the shape of the mold. More specifically, if a design is adopted that cannot secure linearity between the optical path on the incident side onto first optical surface 14a and the optical path on the emitting side from second optical surface 14b, both optical surfaces 14a and 14b of concave part 14 are sometimes required to be reset to the respective optimal inclining angles separately from each other in order to correct the axial deviation of incident light onto second lens surface 12 to be within a permissible limit. In contrast, in this embodiment, it is provided that total reflection direction of total reflection surface 4d is perpendicular to left end face 4b and both optical surfaces 14a are 14b are secured to be line-symmetric, thereby negating the need for performing complicated and intricate measurement adjustment by trial and error, such as appropriate setting of an inclining angle without no correlation between both optical surfaces 14a and 14b. If linearity between the optical path on the incident side onto first optical surface 14a and the optical path on the emitting side from second optical surface 14b can be secured, the position of second lens surface 12 can be simply determined in designing.

This can contribute to further facilitation of manufacturing lens array 2.

Furthermore, as described above, coating of first optical plate 15 with the single metal single layer film or the dielectric multilayer film to form first reflecting/transmitting layer 17 allows the configuration and manufacturing process of first reflecting/transmitting layer 17 to be simplified, thereby enabling further facilitation of manufacturing to be realized. Moreover, the coating allows first reflecting/transmitting layer 17 to be formed significantly thin (e.g. 1 μm or less). Accordingly, a lateral deviation of laser light L caused by the refraction on transmission of laser light L from each light emitting element 7 through first reflecting/transmitting layer 17 can be reduced to a negligible level. This can secure linearity between the optical path on the incident side onto first optical surface 14a and the optical path on the emitting side from second optical surface 14b in a more accurate manner.

Furthermore, preferably, the inclining angle of first optical surface 14a is within a range from 130° to 140° (more preferably, 135°) in the counterclockwise direction in FIG. 48 with reference to left end face 4b (0°); the inclining angle of second optical surface 14b is within a range from 40° to 50° (more preferably, 45°) in the counterclockwise direction in FIG. 48 with reference to left end face 4b(0°). Note that, the symmetry between first optical surface 14a and second optical surface 14b is maintained. Furthermore, total reflection surface 4d is formed parallel to second optical surface 14b. This configuration allows a reasonable design when totally reflecting incident laser light L from each light emitting element 7 on total reflection surface 4d toward concave part 14 side while splitting laser light L, having been incident on first optical surface 14a, toward second lens surface 12 side and third lens surface 13 side. In particular, in the case where the inclining angle of first optical surface 14a is 135° and the inclining angles of second optical surface 14b and total reflection surface 4d are 45°, design of surfaces 14a, 14b and 4d or determination of accuracy in measuring thereof is further simplified.

Furthermore, bottom face 4a and left end face 4b may be formed perpendicular to each other. Optical axis OA(1) on first lens surface 11 and optical axis OA(3) on third lens surface 13 may be formed perpendicular to bottom face 4a. Optical axis OA(2) on second lens surface 12 may be formed perpendicular to left end face 4b. This configuration can relax accuracy in measuring that is required for lens array 2 to secure the optical path connecting light emitting element 7 and first light receiving element 8 and the optical path connecting light emitting element 7 and end face 5a of optical fiber 5, thereby allowing further facilitation of manufacturing to be realized. More specifically, for instance, in the case where optical axis OA(3) on third lens surface 13 is configured to be inclined at an acute angle to optical axis OA(1) on first lens surface 11, there is a possibility that a slight measurement error in the longitudinal direction in FIG. 48 prevents monitor light M, having been emitted from third lens surface 13, from being coupled to first light receiving element 8. In contrast, in this embodiment, optical axis OA(1) on first lens surface 11 and optical axis OA(3) on third lens surface 13 are parallel to each other. Even if lens array 2 causes a slight measurement error in the longitudinal direction in FIG. 48, the beam diameter of monitor light M emitted from third lens surface 13 merely becomes larger or smaller with respect to a designed value, thus allowing the monitor light M to be appropriately received by each first light receiving element 8. If optical axis OA(2) on second lens surface 12 has an angle other than the right angle to optical axis OA(1) on first lens surface 11, there is a possibility that a slight measurement error in the lateral direction in FIG. 48 prevents laser light L, having been emitted from second lens surface 12 from being coupled to the end face of optical fiber 5. In contrast, in this embodiment, optical axis OA(1) on first lens surface 11 and optical axis OA(2) on second lens surface 12 are formed to be perpendicular to each other. Accordingly, even if lens array 2 causes a slight measurement error in the lateral direction in FIG. 48, the beam diameter of laser light L emitted from second lens surface 12 merely becomes slightly larger or smaller with respect to a designed value, thus allowing the laser light L to be appropriately coupled to the end face of optical fiber 5.

In addition to the configuration, in this embodiment, as shown in FIGS. 48 and 49, concave part 14 is formed into a shape accommodating bottom surface (bottom face in FIG. 48) 14e and all sides 14a to 14d within a range indicated by the external shape of opening 14f of concave part 14 in the case of being viewed in the plane normal direction of top face 4c (from the top in FIG. 48). In other words, concave part 14 is formed so as to accommodate projected surfaces of bottom surface 14e and all sides 14a to 14d in the plane normal direction of top face 4c within the range indicated by the external shape of opening 14f. As shown in FIG. 49, opening 14f is formed into a rectangular shape elongated in the longitudinal direction in FIG. 49 and encompassed therearound by top face 4c. Sides 14c and 14d other than first optical surface 14a and second optical surface 14b are formed perpendicular to top face 4c. This configuration allows concave part 14 to be formed into a shape capable of securing demoldability. This can realize effective manufacturing of lens array 2 using a mold.

Third lens surfaces 13 and first light receiving elements 8 corresponding thereto are not necessarily provided so as to be equal in number to light emitting elements 7. It is sufficient that at least one set is provided. In this case, at first reflecting/transmitting layer 17, in laser light L from each light emitting element 7 incident on each first lens surface 11, only a part of laser light L to which third lens surfaces 13 correspond is reflected as monitor light M. The other part of laser light L is reflected but is not used as monitor light M.

First optical plate 15 and second optical plate 16 may be formed using inexpensive material, such as BK7 or colorless plate glass.

Furthermore, the difference of refractive indices between first optical plate 15 and lens array body 4 may be such that the incident angle of laser light L from each light emitting element 7 onto first optical plate 15 does not exceed the critical angle. For instance, as described above, in the case of assuming that the inclining angle of first optical surface 14a (i.e. inclining angle of first optical plate 15) is 135° and the refractive index of lens array body 4 is 1.64, it is sufficient that the refractive index of first optical plate 15 is at least 1.16.

(Variation)

A variation of this embodiment will now be described mainly on difference from the configuration in FIG. 48 with reference to FIGS. 53 to 57.

In this variation, elements having configurations identical or similar to those in FIG. 48 will be described using the same reference signs.

Figure 54:
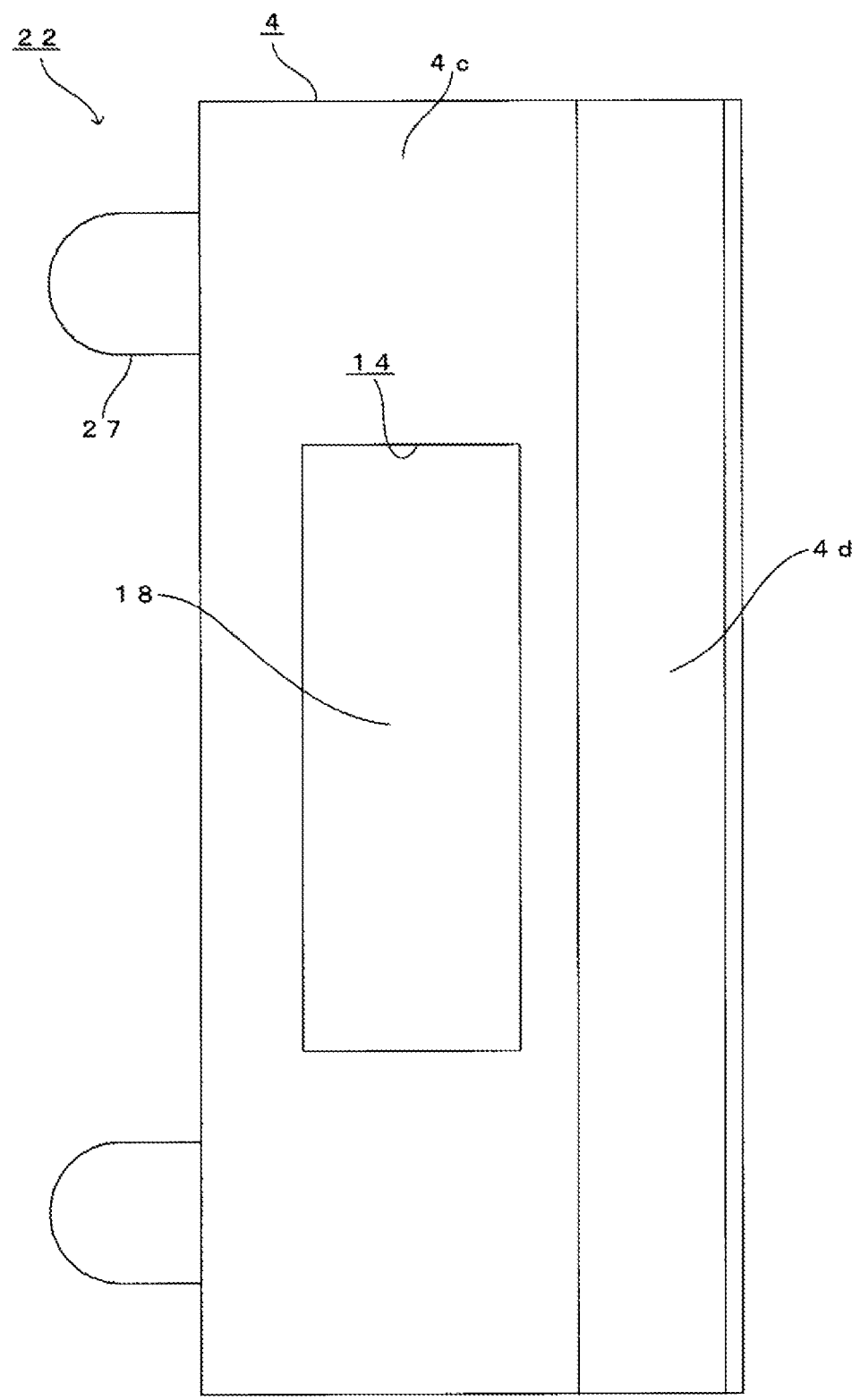
FIG. 54 is a plan view of the lens array shown in FIG. 53.

FIG. 53 is a configurational diagram schematically showing an overview of optical module 21 in this variation together with a longitudinal sectional view of lens array 22 in this variation. FIG. 54 is a plan view of lens array 22 shown in FIG. 53.

Figure 55:
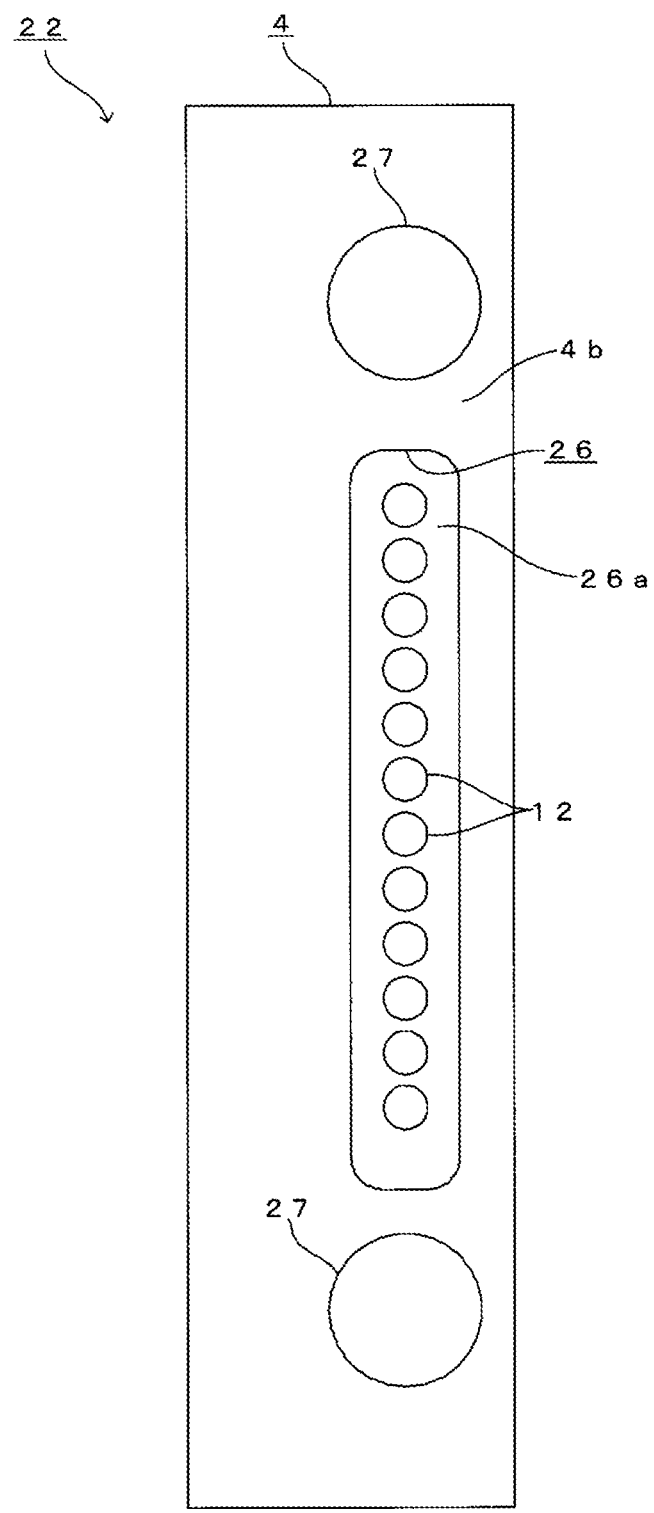
FIG. 55 is a left side view of FIG. 54.
Figure 56:
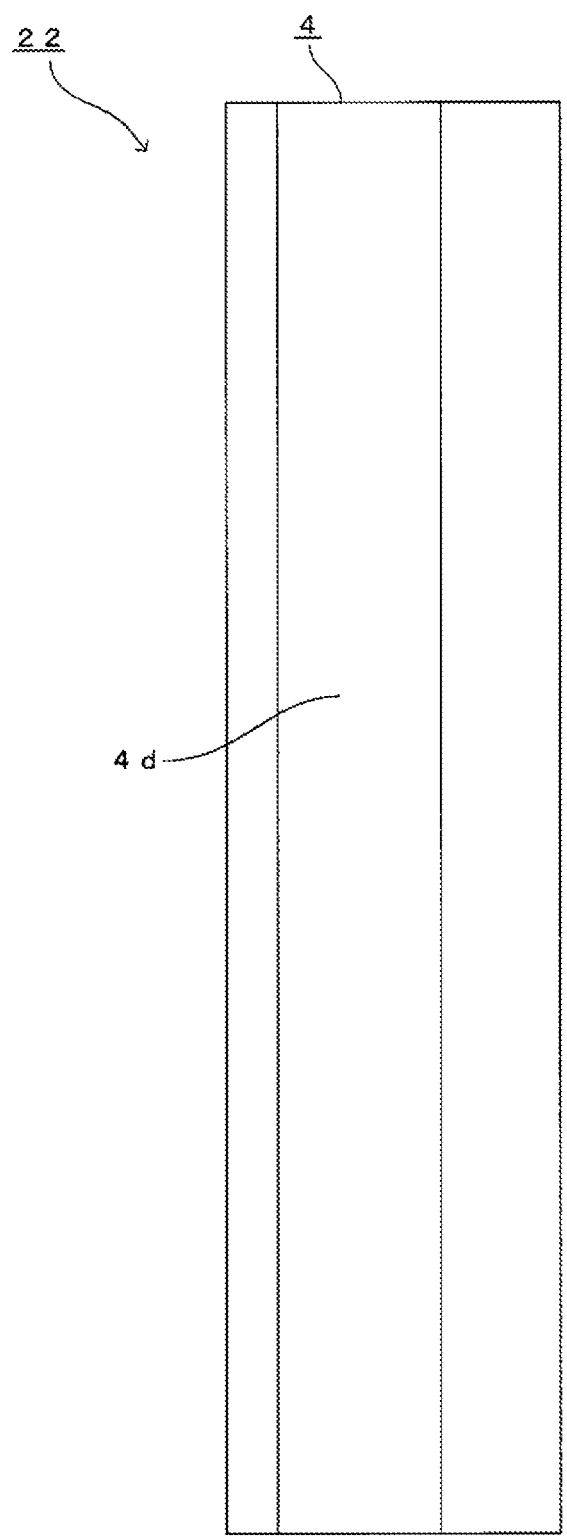
FIG. 56 is a right side view of FIG. 54.
Figure 57:
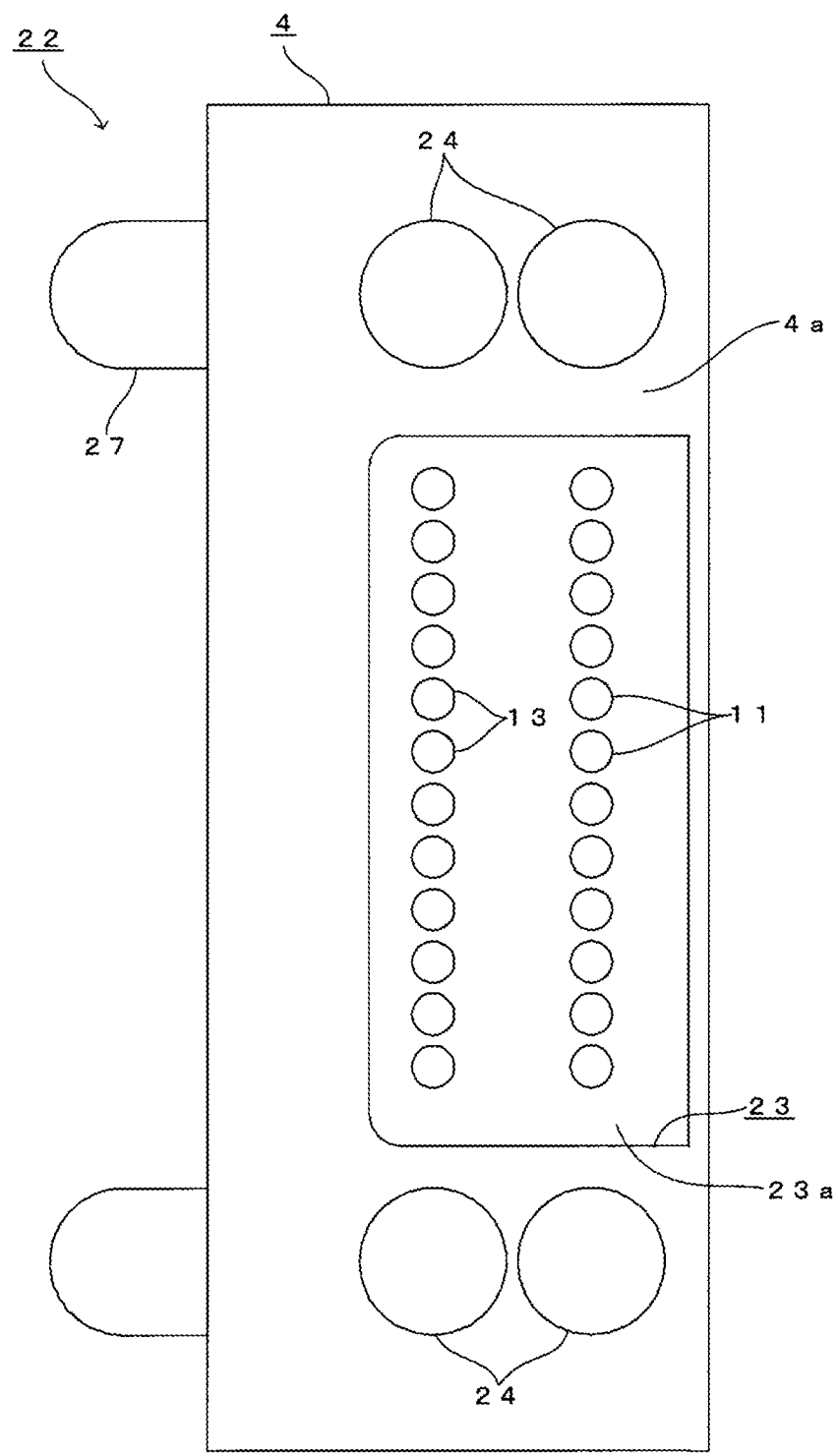
FIG. 57 is a bottom view of FIG. 54

FIG. 55 is a left side view of FIG. 54. FIG. 56 is a right side view of FIG. 54. FIG. 57 is a bottom view of FIG. 54.

In this variation, as a difference from the configuration in FIG. 48, means is adopted for mechanically positioning optoelectric converting device 3 and optical fibers 5 when fixing optoelectric converting device 3 and optical fibers 5 to lens array 22.

More specifically, as shown in FIGS. 53 and 57, in this variation, first lens surfaces 11 and second lens surfaces 12 are formed on bottom surface 23a of first counter-bore part 23 (first surface in this variation) provided with a dent in bottom face 4a of lens array body 4. Bottom surface 23a of first counter-bore part 23 is formed parallel to bottom face 4a. As shown in FIG. 57, first counter-bore part 23 is formed to have such a width in the longitudinal direction in FIG. 57 (hereinafter, referred to as the lens alignment direction) that the widthwise edges of first counter-bore part 23 are disposed slightly outwardly from lens surfaces 11 and 13 that are arranged outermost in the lens alignment direction. In this variation, lens array body 4 is formed wider in the lens alignment direction than the width of first counter-bore part 23 in the lens alignment direction. In accordance with this, as shown in FIG. 57, bottom face 4a includes portions that extend outwardly in the lens alignment direction from both ends of first counter-bore part 23. As shown in FIG. 57, at the both extended portions of bottom face 4a that extend outwardly in the lens alignment direction from both ends of first counter-bore part 23, two pairs, four in total, of plano-convex fitting holes 24 are formed so as to be disposed across first counter-bore part 23 as a structure for positioning optoelectric converting device 3. Fitting holes 24 are fitted with fitting pins, not shown, penetrating through semiconductor substrate 6 in the state where semiconductor substrate 6 is in contact with extended portions of bottom face 4a. This allows optoelectric converting device 3 to be mechanically positioned when optoelectric converting device 3 is fixed to lens array 22.

As shown in FIGS. 53 and 55, in this variation, second lens surfaces 12 are formed on bottom surface 26a (second surface in this variation) of second counter-bore part 26 provided with a dent in left end face 4b of lens array 4. Bottom surface 26a of second counter-bore part 26 is formed parallel to left end face 4b. As shown in FIG. 55, second counter-bore part 26 is formed to have such a width in lens alignment direction that the widthwise edges of second counter-bore part 26 are disposed slightly outwardly from lens surfaces 12 arranged outermost in the lens alignment direction. As shown in FIG. 55, in this variation, left end face 4b includes portions that extend outwardly in the lens alignment direction from both ends of second counter-bore part 26. As shown in FIG. 55, at the both extended portions of left end face 4b, a pair, two in total, of fitting pins 27 are formed so as to be disposed across second counter-bore part 26 in a protruding manner as a structure for positioning optical fibers 5. Fitting pins 27 are fitted into fitting holes, not shown, formed in connector 10 in the state where connector 10 is in contact with the extended portions of left end face 4b. This allows optical fibers 5 to be mechanically positioned when optical fibers 5 are fixed to lens array 22.

The configuration of this variation can also exert excellent working-effect similar to those in FIG. 48. Furthermore, in this variation, optoelectric converting device 3 and optical fiber 5 can be simply positioned with respect to lens array 22 using fitting holes 24 and fitting pins 27. This allows optoelectric converting device 3 and optical fiber 5 to be simply fixed to lens array 22.

As shown in FIG. 53, in this variation, the side surface of concave part 14 is formed to extend vertically upward from the upper ends of first and second optical surfaces 14a and 14b.

Instead of aforementioned fitting holes 24, through holes each having the same diameter as that of fitting hole 24 and penetrating lens array body 4 may be formed. As the structure for positioning optical fiber 5, fitting holes or through holes may be formed on the side of lens array body 4 and fitting pins may be formed on the side of optical fiber 5. Likewise, as the structure for positioning optoelectric converting device 3, fitting pins may be formed on the side of lens array body 4 and fitting holes or through holes may be formed on the side of optoelectric converting device 3. The positioning of optical fiber 5 and optoelectric converting device 3 is not limited to mechanical positioning. Instead, for instance, the positioning may be performed according to an optical method by optically recognizing a mark formed on lens array body 4.

Although not shown, in a variation other than such a variation, reflecting/transmitting layer 17 may be formed on the surface of first optical plate 15 on the side of filler 18. In this case, first optical plate 15 is disposed in the state where it is in closely contact with first optical surface 14a, and reflecting/transmitting layer 17 is disposed adjacent to first optical surface 14a.

In the configuration in FIG. 48, an anti-reflection film (AR coating) may be formed on the surface of first optical plate 15 on the side of filler 18.

Embodiment 13

Embodiment 13 of a lens array and an optical module provided therewith according to the present invention will now be described mainly on difference from Embodiment 12 with reference to FIG. 58.

In this embodiment, elements having configurations identical or similar to those in FIGS. 48 to 57 will be described using the same reference signs.

Figure 58:
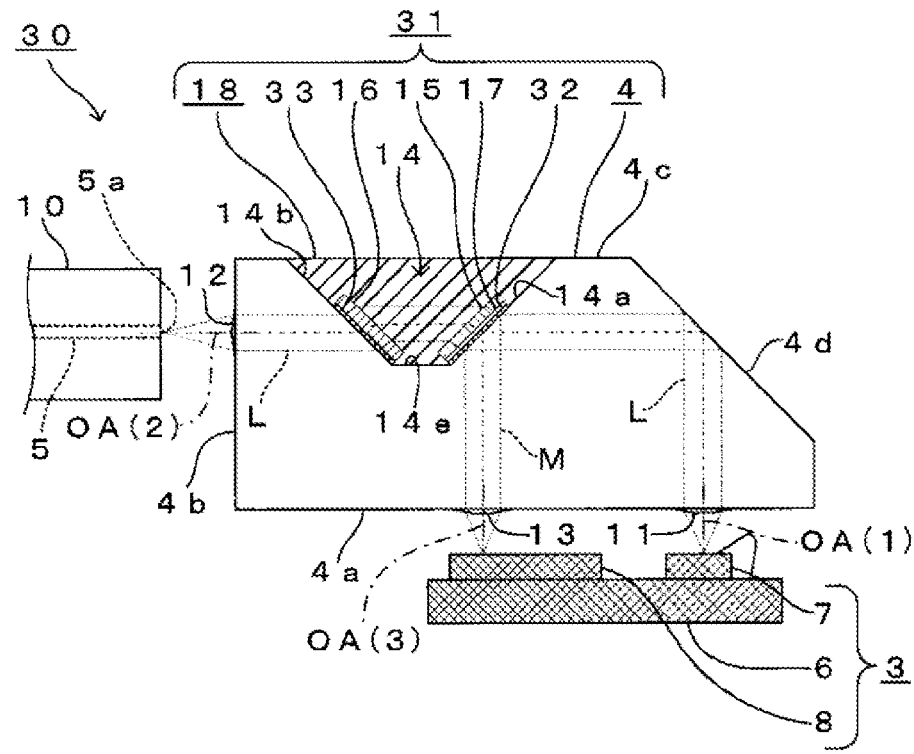
FIG. 58 is a configurational diagram schematically showing an overview of an optical module together with a longitudinal sectional view of a lens array in Embodiment 13 of the lens array and the optical module provided therewith according to the present invention.

FIG. 58 is a configurational diagram schematically showing an overview of optical module 30 in this embodiment together with a longitudinal sectional view of lens array 31 in this embodiment.

As shown in FIG. 58, this embodiment is different from Embodiment 12 in that first optical plate 15 is bonded on first optical surface 14a via first adhesive sheet 32 that has a uniform thickness and a predetermined refractive index, and second optical plate 16 is bonded on second optical surface 14b via second adhesive sheet 33 that has a uniform thickness and the refractive index as that of first adhesive sheet 32. In this embodiment, first reflecting/transmitting layer 17 is arranged adjacent to first optical surface 14a in the state where first reflecting/transmitting layer 17 is located between first optical plate 15 and first adhesive sheet 32. In this embodiment, first adhesive sheet 32 and second adhesive sheet 33 are formed to have the same air-converted length.

This configuration allows first optical plate 15 and second optical plate 16 to be fixed more stably to lens array body 4. First adhesive sheet 32 and second adhesive sheet 33 are formed to have the same refractive index. Accordingly, the adverse effect of refraction when laser light L from each light emitting element 7 is incident on first adhesive sheet 32 can be corrected by refraction when laser light L from each light emitting element 7 is incident on second adhesive sheet 33. Accordingly, as with Embodiment 12, the linearity between the optical path of laser light L from each light emitting element 7 between total reflection surface 4d and first optical surface 14a and the optical path on the emitting side from second optical surface 14b can be secured.

Furthermore, preferably, first adhesive sheet 32 and second adhesive sheet 33 are configured such that the difference of refractive index from lens array body 4 is 0.35 or less (more preferably, 0). This configuration can suppress Fresnel reflection of laser light L from each light emitting element 7 on the interface between lens array body 4 and first adhesive sheet 32 and the interface between lens array body 4 and second adhesive sheet 33. This can suppress occurrence of stray light and reduction in coupling efficiency.

For instance, adhesive thin (e.g. 20 μm) refractive index matching film, such as Fitwell made by Tomoegawa, can be adopted as first adhesive sheet 32 and second adhesive sheet 33.

The variation applied to Embodiment 12 is also applicable to this embodiment as it is.

Embodiment 14

Embodiment 14 of a lens array and an optical module provided therewith according to the present invention will now be described mainly on difference from Embodiment 12 with reference to FIGS. 59 and 60.

In this embodiment, elements having configurations identical or similar to those in FIGS. 48 to 57 will be described using the same reference signs.

Figure 59:
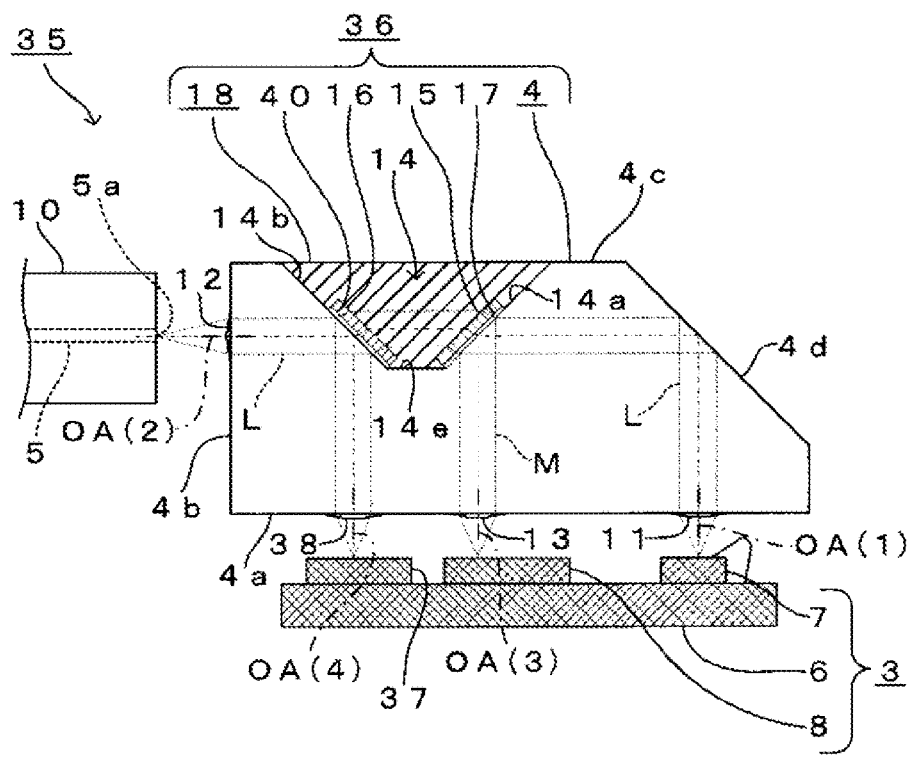
FIG. 59 is a configurational diagram schematically showing an overview of an optical module together with a longitudinal sectional view of a lens array in Embodiment 14 of the lens array and the optical module provided therewith according to the present invention.

FIG. 59 is a configurational diagram schematically showing an overview of optical module 35 in this embodiment together with a longitudinal sectional view of lens array 36 in this embodiment. FIG. 60 is a bottom view of lens array 36 shown in FIG. 59.

Figure 60:
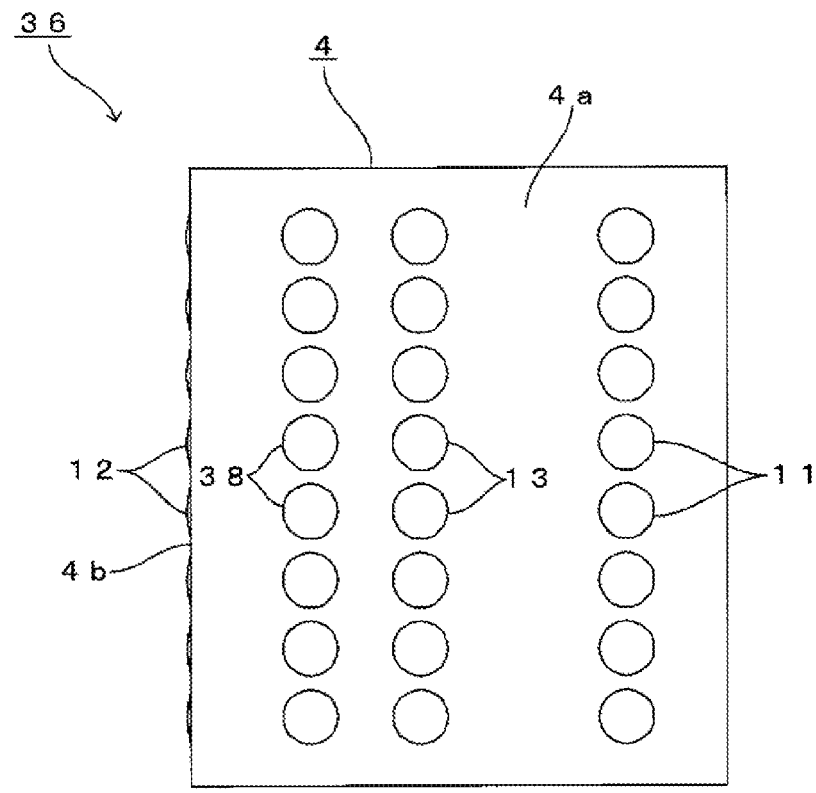
FIG. 60 is a bottom view of the lens array shown in FIG. 59.

As shown in FIGS. 59 and 60, this embodiment is different in configuration from Embodiment 12 in that the configuration in this embodiment is applicable not only to transmission of optical signals but also to reception of optical signals.

More specifically, in this embodiment, laser light having the same wavelength is emitted from end face 5a of each optical fiber 5 toward lens array 36. The laser light emitted from each optical fiber 5 has a wavelength different from that of laser light L from each light emitting element 7. As more specific means, the plurality of light emitting elements, not shown, equal in number to optical fibers 5 are disposed at the end faces of optical fibers 5 on the side opposite to end faces 5a, and light emitted from the light emitting elements are incident on respective optical fibers 5 corresponding to the light emitting elements.

The laser light having thus emitted from each optical fiber 5 enters second lens surface 12 corresponding to the optical fiber.

As shown in FIG. 59, in this embodiment, optoelectric converting device 3 includes a plurality of second light receiving elements 37 that are on a surface of semiconductor substrate 6 facing lens array 36 at left adjacent positions of first light receiving elements 8 in FIG. 59 and receive laser light emitted from respective optical fibers 5. The plurality of second light receiving elements 37 are arranged equal in number and pitch to second lens surfaces 12 along the same direction as the alignment direction of second lens surfaces 12. Each second light receiving element 37 may be a photodetector.

Furthermore, as shown in FIGS. 59 and 60, at positions facing second light receiving elements 37 at bottom face 4a, a plurality of respective fourth lens surfaces 38 are formed that emit laser light, having been emitted from optical fibers 5 and incident from the inside of lens array body 4, toward second light receiving elements 37. The plurality of fourth lens surfaces 38 are provided equal in number and pitch to second lens surfaces 12, along the same direction as the alignment direction (longitudinal direction in FIG. 60) of second lens surfaces 12.

Moreover, as shown in FIG. 59, second reflecting/transmitting layer 40 is disposed between second optical surface 14b and second optical plate 16. Second reflecting/transmitting layer 40 is formed over the entire surface of second optical plate 16 (undersurface in FIG. 59), and in closely contact with second optical surface 14b.

Here, laser light having been emitted from each optical fiber 5 and incident on second lens surface 12 is incident on second reflecting/transmitting layer 40. Second reflecting/transmitting layer 40 reflects the incident laser light at a predetermined reflectance toward fourth lens surfaces 38 side while allowing the light to pass through at a predetermined transmittance.

According to such a configuration, the laser light emitted from each optical fiber 5 passes through second lens surface 12, second reflecting/transmitting layer 40 and fourth lens surface 38 and is coupled to second light receiving element 37. Accordingly, bidirectional optical communication can be effectively supported.

Second reflecting/transmitting layer 40 may be formed using the same material and method as those of first reflecting/transmitting layer 17.

In terms of facilitation of design, optical axis OA(4) on fourth lens surface 38 is preferably perpendicular to bottom face 4a.

(Variation)

A variation of this embodiment will now be described mainly on difference from the configuration in FIG. 59 with reference to FIG. 61.

Figure 61:
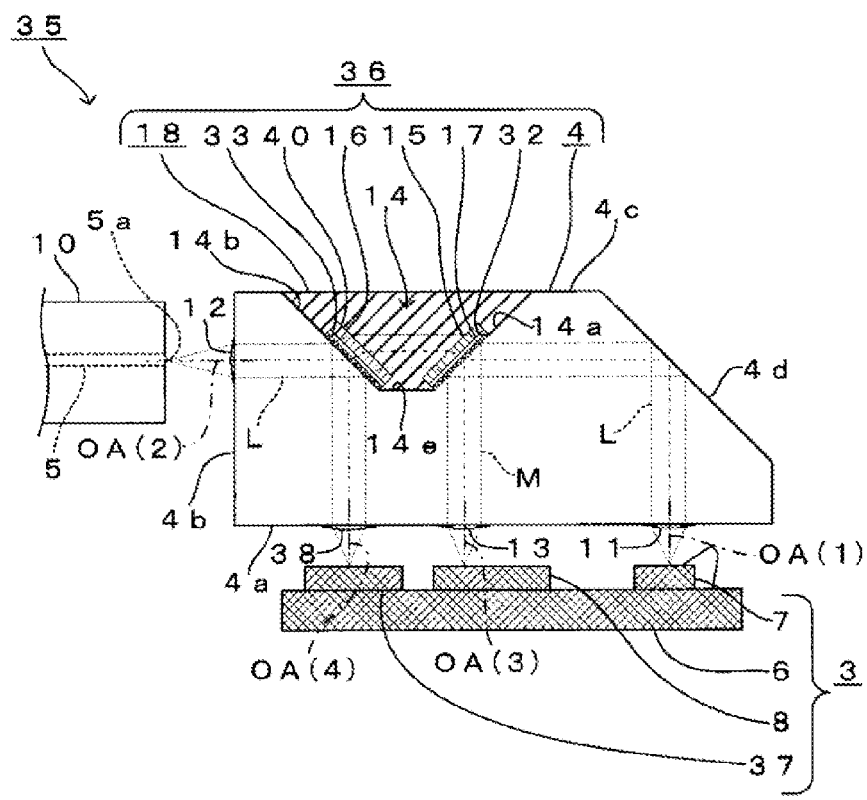
FIG. 61 is a configurational diagram schematically showing an overview of an optical module together with a longitudinal sectional view of a lens array in a variation of Embodiment 14.

As shown in FIG. 61, the configuration of this variation is different from the configuration in FIG. 59 in that first optical plate 15 is bonded on first optical surface 14a via first adhesive sheet 32 and second optical plate 16 is bonded on second optical surface 14b via second adhesive sheet 33, as with Embodiment 13.

Besides that, the variation applied to Embodiment 12 is applicable also to this embodiment as it is.

The present invention is not limited to the aforementioned embodiments, and can be modified variously in such an extent that the characteristics of the present invention is not degraded.

For instance, lens array body 4 may be formed using light-transmitting material (e.g. glass) other than resin material.

The present invention is applicable to optical transmission members other than optical fibers 5, such as sheet-shaped optical waveguides.

The disclosure of Japanese Patent Application No. 2009-291067 filed on Dec. 22, 2009, Japanese Patent Application No. 2010-55929 filed on Mar. 12, 2010, Japanese Patent Application No. 2010-195737 filed on Sep. 1, 2010, Japanese Patent Application No. 2009-295278 filed on Dec. 25, 2009, and Japanese Patent Application No. 2010-2928 filed on Jan. 8, 2010 including the specification, drawing and abstract, is incorporated herein by reference in their entirety.

The invention claimed is:

1. A lens array disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array comprising:

a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces;

a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body;

at least one third lens surface for emitting the monitor light incident from an inside of the lens array body toward the light receiving element, the third lens surface being formed on the first surface of the lens array body;

a concave part formed in the lens array body in a reentrant manner so that optical paths connecting the first lens surfaces and the second lens surfaces pass through in the concave part;

a first optical surface that is formed as a part of an inner surface of the concave part and formed to have a predetermined inclining angle to the second surface, the first optical surface receiving, in an incident direction perpendicular to the second surface, the light that is emitted from each of the plurality of light emitting elements and incident on the first lens surfaces;

a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface;

a prism that is disposed in a space formed by the concave part, formed to have a refractive index identical to that of the lens array body, and forms an optical path of the light from each of the plurality of light emitting elements having been incident on the first optical surface and subsequently moved forth toward the second lens surface side;

a first prism surface that forms a part of a surface of the prism and is disposed at a position adjacent to the first optical surface;

a second prism surface that is a part of the surface of the prism, forms a portion opposed to the first prism surface, and is disposed parallel to the second optical surface at a position facing the second optical surface;

a reflecting/transmitting layer for reflecting the light that is emitted from each of the plurality of light emitting elements and incident on the first optical surface at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer intervening between the first optical surface and the first prism surface; and a filler that is inserted between the second optical surface and the second prism surface and has a predetermined refractive index.

2. The lens array according to claim 1, wherein the reflecting/transmitting layer is applied to the first prism surface or the first optical surface.

3. The lens array according to claim 1, wherein a difference of refractive indices between the filler and the lens array body is a predetermined value or less.

4. The lens array according to claim 1, wherein:

a second optical transmission member for emitting light toward the lens array body is disposed adjacent to the optical transmission member;

the optoelectric converting device includes a second light receiving element for receiving the light emitted from the second optical transmission member;

a fifth lens surface on which the light emitted from the second optical transmission member is incident is formed at a position that is adjacent to the second lens surface on the second surface in a direction orthogonal to an alignment direction thereof and faces an end face of the second optical transmission member, a fourth lens surface for emitting light having been incident on the fifth lens surface toward the second light receiving element, the fourth lens surface being formed at a position on the first surface facing the second light receiving element; and a second concave part is formed in a reentrant manner in the lens array body at a position at which optical paths connecting the first lens surfaces and the second lens surfaces pass through the second concave part and at a position closer to the second surface with respect to the concave part;

an inner surface of the second concave part including:

a second total reflection surface for totally reflecting the light having been incident on the fifth lens surface toward the fourth lens surface side;

a third optical surface that is formed parallel to the second surface and on which the light from the plurality of light emitting elements having been incident on the second optical surface and subsequently moved forth toward the second lens surface side is perpendicularly incident; and a fourth optical surface that is formed parallel to the second surface and on which the light from the plurality of light emitting elements having been incident on the third optical surface and subsequently moved forth toward the second lens surface side is perpendicularly incident.

5. The lens array according to claim 1, wherein:
the filler is made of light-transmitting adhesive; and
the prism is bonded to the concave part with the filler.

6. The lens array according to claim 1, further comprising a total reflection surface for totally reflecting the light from the plurality of light emitting elements having been incident on the first lens surfaces toward the first optical surface, the total reflection surface lying in optical paths of the light from the plurality of light emitting elements between the first lens surfaces and the first optical surface in the lens array body.

7. The lens array according to claim 6, wherein:
the first surface and the second surface are formed perpendicular to each other;
the concave part is formed on a third surface opposed to the first surface in the lens array body;
the total reflection surface is formed to have an inclining angle of 45° with reference to the first surface where an end on a side of the third surface is located closer to the concave part with respect to an end on a side of the first surface;
the first optical surface is formed to have an inclining angle of 45° with reference to the first surface where the end on the side of the third surface is located closer to the total reflection surface with respect to the end on the side of the first surface;
an optical axis on the first lens surface and an optical axis on the third lens surface are formed perpendicular to the first surface; and
an optical axis on the second lens surface is formed perpendicular to the second surface.

8. A lens array disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array comprising:

a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces;

a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body;

at least one third lens surface for emitting the monitor light incident from an inside of the lens array body toward the light receiving element, the third lens surface being formed on the first surface of the lens array body;

a concave part formed in the lens array body in a reentrant manner so that optical paths connecting the first lens surfaces and the second lens surfaces pass through in the concave part;

a first optical surface that is formed as a part of an inner surface of the concave part and formed to be parallel to the second surface, the first optical surface receiving, in an incident direction perpendicular to the second surface, the light that is emitted from each of the plurality of light emitting elements and incident on the first lens surfaces;

a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface;

a prism that is disposed in a space formed by the concave part and forms an optical path of the light from each of the plurality of light emitting elements having been incident on the first optical surface and subsequently moved forth toward the second lens surface side;

a first prism surface that forms a part of a surface of the prism and is disposed to have a predetermined inclining angle to the second surface at a position facing the first optical surface;

a second prism surface that is a part of the surface of the prism, forms a portion opposed to the first prism surface, and is disposed parallel to the second surface at a position facing the second optical surface;

a reflecting/transmitting layer for reflecting the light that is emitted from each of the plurality of light emitting elements and incident on the first optical surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being formed on the first prism surface; and a filler that is inserted between the first optical surface and the reflecting/transmitting layer, and has a refractive index identical to that of the prism.

9. The lens array according to claim 8, wherein the reflecting/transmitting layer is applied to the first prism surface.

10. A lens array disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array comprising:

a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces;

a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body;

at least one third lens surface for emitting the monitor light incident from an inside of the lens array body toward the light receiving element, the third lens surface being formed on the first surface of the lens array body;

a concave part formed in the lens array body in a reentrant manner so that optical paths connecting the first lens surfaces and the second lens surfaces pass through in the concave part;

a first optical surface that is formed as a part of an inner surface of the concave part and formed to be parallel to the second surface, the first optical surface receiving, in an incident direction perpendicular to the second surface, the light that is emitted from each of the plurality of light emitting elements and incident on the first lens surfaces;

a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface;

a prism that is disposed in a space formed by the concave part and forms an optical path of the light from each of the plurality of light emitting elements having been incident on the first optical surface and subsequently moved forth toward the second lens surface side;

a first prism surface that forms a part of a surface of the prism and is disposed to have a predetermined inclining angle to the second surface at a position facing the first optical surface;

a second prism surface that is a part of the surface of the prism, forms a portion opposed to the first prism surface, and is disposed to have a predetermined inclining angle to the second surface at a position facing the second optical surface;

a reflecting/transmitting layer for reflecting the light that is emitted from each of the plurality of light emitting elements and incident on the first lens surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being formed on the first prism surface; and a filler that is inserted between the first optical surface and the reflecting/transmitting layer and between the second optical surface and the second prism surface, and has a refractive index identical to that of the prism.

11. The lens array according to claim 10, wherein:

the optical transmission member is formed to emit light toward the lens array body, and formed to allow the light emitted from the optical transmission member is incident on the second lens surface;

the optoelectric converting device includes a second light receiving element for receiving the light emitted from the optical transmission member;

a fourth lens surface for emitting the light having been emitted from the optical transmission member and incident on the lens array body from an inside thereof toward the second light receiving element, the fourth lens surface being formed at a position facing the second light receiving element on the first surface; and a second reflecting/transmitting layer is formed on the second prism surface, the second reflecting/transmitting layer reflecting the light having been emitted from the optical transmission member and incident on the second lens surface toward the fourth lens surface side at a predetermined reflectance and allowing the light to pass through at a predetermined transmittance.

12. A lens array disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array comprising:

a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces;

a plurality of second lens surfaces for emitting light incident on each of the plurality of first lens surfaces from each of the plurality of light emitting elements toward the end face of the optical transmission member, the second lens surfaces being formed to be arranged in line along the alignment direction of the first lens surfaces on a second surface facing the end face of the optical transmission member in the lens array body;

at least one third lens surface for emitting the monitor light incident from an inside of the lens array body toward the light receiving element, the third lens surface being formed on the first surface of the lens array body;

a concave part formed in the lens array body in a reentrant manner so that optical paths connecting the first lens surfaces and the second lens surfaces pass through in the concave part;

a first optical surface that is formed as a part of an inner surface of the concave part and formed to have a predetermined slight inclining angle to the second surface, the first optical surface receiving, in an incident direction perpendicular to the second surface, the light that is emitted from each of the plurality of light emitting elements and incident on the first lens surfaces;

a second optical surface that is a part of the inner surface of the concave part, formed as a portion opposed to the first optical surface and formed to have a predetermined slight inclining angle to the second surface, the light from each of the plurality of light emitting elements having been incident on the first optical surface and subsequently moved forth toward the second lens surface side being incident on the second optical surface perpendicularly to the second surface;

a prism that is disposed in a space formed by the concave part, formed to have a refractive index identical to that of the lens array body, and forms an optical path of the light from each of the plurality of light emitting elements having been incident on the first optical surface and subsequently moved forth toward the second lens surface side;

a first prism surface that forms a part of a surface of the prism and is disposed to have a predetermined inclining angle to the second surface at a position facing the first optical surface;

a second prism surface that is a part of the surface of the prism, forms a portion opposed to the first prism surface, and is disposed to have a predetermined inclining angle to the second surface at a position facing the second optical surface;

a reflecting/transmitting layer for reflecting the light that is emitted from each of the plurality of light emitting elements and incident on the first lens surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being formed on the first prism surface; and a filler that is inserted between the first optical surface and the reflecting/transmitting layer and between the second optical surface and the second prism surface, and has a refractive index identical to that of the prism.

13. An optical module, comprising:
the lens array according to claim 1; and
an optoelectric converting device corresponding thereto.

14. A lens array disposed between an optoelectric converting device and an optical transmission member, the optoelectric converting device including a plurality of light emitting elements formed therein in line and at least one light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array comprising:

a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces;

a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body;

at least one third lens surface for emitting the monitor light incident from an inside of the lens array body toward the light receiving element, the third lens surface being formed on the first surface of the lens array body;

a concave part formed in the lens array body in a reentrant manner so that optical paths connecting the first lens surfaces and the second lens surfaces pass through in the concave part;

a first optical surface that is formed as a part of an inner surface of the concave part and formed to have a predetermined inclining angle to the second surface, the first optical surface receiving, in an incident direction perpendicular to the second surface, the light that is emitted from each of the plurality of light emitting elements and incident on the first lens surfaces;

a second optical surface that is a part of the inner surface of the concave part, formed as a portion opposed to the first optical surface and formed to be parallel to the second surface, the light from each of the plurality of light emitting elements having been incident on the first optical surface and subsequently moved forth toward the second lens surface side being perpendicularly incident on the second optical surface;

a prism that is disposed in a space formed by the concave part, formed to have a refractive index identical to that of the lens array body, and forms an optical path of the light from each of the plurality of light emitting elements having been incident on the first optical surface and subsequently moved forth toward the second lens surface side;

a first prism surface that forms a part of a surface of the prism and is disposed parallel to the first optical surface at a position facing the first optical surface;

a second prism surface that is a part of the surface of the prism, forms a portion opposed to the first prism surface, and is disposed parallel to the second optical surface at a position facing the second optical surface;

a reflecting/transmitting layer for reflecting the light that is emitted from each of the plurality of light emitting elements and incident on the first optical surfaces at a predetermined reflectance toward the third lens surface side and allowing the light to pass through at a predetermined transmittance toward the prism side, while reflecting at least one beam of the light from the plurality of light emitting elements as the monitor light, the reflecting/transmitting layer being disposed on the first prism surface or the first optical surface;

an adhesive sheet that is disposed between the reflecting/transmitting layer on the first prism surface and the first optical surface or between the first prism surface and the reflecting/transmitting layer on the first optical surface, and has a predetermined refractive index for bonding the prism on the lens array body; and a filler that is inserted between the second optical surface and the second prism surface and has a predetermined refractive index.

15. The lens array according to claim 14, wherein a difference of refractive indices between the adhesive sheet and the lens array body is a predetermined value or less.

16. The lens array according to claim 14, wherein a difference of refractive indices between the filler and the lens array body is a predetermined value or less.

17. The lens array according to claim 14, further comprising a total reflection surface for totally reflecting the light from the plurality of light emitting elements having been incident on the first lens surface toward the first optical surface, the total reflection surface lying in optical paths of light from the plurality of light emitting elements between the first lens surface and the first optical surface in the lens array body.

18. An optical module, comprising:
the lens array according to claim 14; and
an optoelectric converting device corresponding thereto.

19. A lens array disposed between an optoelectric converting device and an optical transmission member, the optoelectric converting device including a plurality of light emitting elements formed therein in line and at least one first light receiving element formed therein for receiving monitor light, the monitor light being used for monitoring light emitted from at least one of the plurality of light emitting elements, the lens array being able to optically couple the plurality of light emitting elements with an end face of the optical transmission member, the lens array comprising:
- a plurality of first lens surfaces that are formed to align in a predetermined alignment direction corresponding to the plurality of light emitting elements on a first surface facing the optoelectric converting device in a lens array body, the first lens surfaces each receiving light that is emitted from each of the plurality of light emitting elements and incident on the first lens surfaces;
- a plurality of second lens surfaces for emitting light incident on each of the plurality of first lens surfaces from each of the plurality of light emitting elements toward the end face of the optical transmission member, the second lens surfaces being formed to align along the alignment direction of the first lens surfaces on a second surface facing the end face of the optical transmission member in the lens array body;
- at least one third lens surface for emitting the monitor light incident from an inside of the lens array body toward the first light receiving element, the third lens surface being formed on the first surface of the lens array body;
- a concave part formed in the lens array body in a reentrant manner so that optical paths connecting the first lens surfaces and the second lens surfaces pass through in the concave part;
- a first optical surface that is formed as a part of an inner surface of the concave part and formed to have a predetermined inclining angle to the second surface, the first optical surface receiving, in an incident direction perpendicular to the second surface, the light that is emitted from each of the plurality of light emitting elements and incident on the first lens surfaces;
- a second optical surface that is a part of the inner surface of the concave part, formed as a portion opposed to the first optical surface and formed to have a predetermined inclining angle to the second surface, the light from each of the plurality of light emitting elements having been incident on the first optical surface and subsequently moved forth toward the second lens surface side being incident on the second optical surface;
- a first reflecting/transmitting layer for reflecting the light that is emitted from each of the plurality of light emitting elements and incident on the first optical surfaces at a predetermined reflectance toward the third lens surface side and allowing the light to pass through at a predetermined transmittance toward the second optical surface side, while reflecting at least one beam of the light from the plurality of light emitting elements as the monitor light, the reflecting/transmitting layer being disposed on the first optical surface or adjacent thereto; and
- a filler that fills a space formed by the concave part and has a refractive index identical to that of the lens array body, wherein an optical path of the light emitted from each of the plurality of light emitting elements in an predetermined range on an incident side onto the first optical surface, and an optical path of the light emitted from each of the plurality of light emitting elements on an emitting side from the second optical surface are located on an identical line.

20. The lens array according to claim 19, wherein:
the optical transmission member is formed to emit light toward the lens array body, and
formed to allow the light emitted from the optical transmission member is incident on the second lens surface;
the optoelectric converting device includes a second light receiving element for receiving the light emitted from the optical transmission member;
a fourth lens surface for emitting the light having been emitted from the optical transmission member and incident on the lens array body from an inside thereof toward the second light receiving element is formed at a position facing the second light receiving element on the first surface; and
a second reflecting/transmitting layer is formed on the second prism surface or adjacent thereto, the second reflecting/transmitting layer reflecting the light having been emitted from the optical transmission member and incident on the second lens surface toward the fourth lens surface side at a predetermined reflectance and allowing the light to pass through at a predetermined transmittance.

21. The lens array according to claim 19, wherein:
provided that the inclining angle of the first optical surface is θ[°], the inclining angle of the second optical surface is represented as 180−θ[°];
the first reflecting/transmitting layer is formed on a first optical plate that is parallel to the first optical surface and has a predetermined refractive index; and
a second optical plate that is parallel to the second optical surface and has a refractive index identical to that of the first optical plate is disposed on the second optical surface or adjacent thereto;
the second optical plate adjusts the optical path such that the optical path on an emitting side from the second optical surface is located on the same line as the optical path in the predetermined range on the incident side onto the first optical surface by correcting a deviation in a direction orthogonal to an optical path length direction between an optical path of light from each of the plurality of light emitting elements in the filler and the optical path in the predetermined range on the incident side onto the first optical surface, which is caused by refraction when the light from each of the plurality of light emitting elements is incident on the first optical plate.

22. The lens array according to claim 20, wherein:
provided that the inclining angle of the first optical surface is θ[°], the inclining angle of the second optical surface is represented as 180−θ[°];
the first reflecting/transmitting layer is formed on the first optical plate that is parallel to the first optical surface and has a predetermined refractive index; and
the second reflecting/transmitting layer is formed on the second optical plate that is parallel to the second optical surface and has a refractive index identical to that of the first optical plate;
the second optical plate adjusts the optical path such that the optical path on the emitting side from the second optical surface is located on the same line as the optical path in the predetermined range on the incident side onto the first optical surface by correcting a deviation in a direction orthogonal to the optical path length direction between the optical path of light from each of the plurality of light emitting elements in the filler and the optical path in a predetermined range on the incident side onto the first optical surface, which is caused by refraction when the light from each of the plurality of light emitting elements is incident on the first optical plate.

23. The lens array according to claim 21, wherein:
the first optical plate is bonded on the first optical surface via a first adhesive sheet having a predetermined refractive index; and
the second optical plate is bonded on the second optical surface via a second adhesive sheet having a refractive index identical to that of the first adhesive sheet.

24. An optical module, comprising:
the lens array according to claim 19; and
an optoelectric converting device corresponding thereto.

* * * * *